United States Patent
Iriba

(10) Patent No.: US 11,827,140 B2
(45) Date of Patent: Nov. 28, 2023

(54) VEHICLE DETECTING DEVICE, VEHICLE LAMP SYSTEM, VEHICLE DETECTING METHOD, LIGHT DISTRIBUTION CONTROLLING DEVICE, AND LIGHT DISTRIBUTION CONTROLLING METHOD

(71) Applicant: KOITO MANUFACTURING CO., LTD., Tokyo (JP)

(72) Inventor: Takehito Iriba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/183,347

(22) Filed: Mar. 14, 2023

(65) Prior Publication Data

US 2023/0219489 A1    Jul. 13, 2023

Related U.S. Application Data

(63) Continuation of application No. 17/829,501, filed on Jun. 1, 2022, now Pat. No. 11,628,762, which is a (Continued)

(30) Foreign Application Priority Data

Dec. 4, 2019   (JP) ................................ 2019-219598
Jan. 7, 2020   (JP) ................................ 2020-000677
(Continued)

(51) Int. Cl.
*B60Q 1/08*      (2006.01)
*B60Q 1/14*      (2006.01)
*B60R 11/04*     (2006.01)

(52) U.S. Cl.
CPC ............. *B60Q 1/143* (2013.01); *B60Q 1/085* (2013.01); *B60R 11/04* (2013.01);
(Continued)

(58) Field of Classification Search
CPC ................................. B60Q 1/085; B60Q 1/143
(Continued)

(56) References Cited

U.S. PATENT DOCUMENTS 11,208,032 B2    12/2021  Park et al.
2019/0095726 A1   3/2019  Kawamata et al.
(Continued)

FOREIGN PATENT DOCUMENTS

DE   102011081396 A1   2/2013
JP     2005085621 A    3/2005
(Continued)

OTHER PUBLICATIONS

Extended European Search Report dated Dec. 21, 2022, issued in corresponding European Application No. 20895823.1. (11 pages).
(Continued)

*Primary Examiner* — Christopher M Raabe
(74) *Attorney, Agent, or Firm* — BUCHANAN INGERSOLL & ROONEY PC

(57) ABSTRACT

A vehicle detecting device includes: a camera that includes an image sensor and a first filter, the image sensor including a plurality of imaging elements including a first imaging element group and a second imaging element group, the first filter keeping an amount of light entering the first imaging element group lower than an amount of light entering the second imaging element group; an image generating unit that generates a first image based on information obtained from the first imaging element group and a second image based on information obtained from the second imaging element group; and a detecting unit that detects a front vehicle based on the first image and the second image.

6 Claims, 24 Drawing Sheets

Related U.S. Application Data continuation of application No. PCT/JP2020/044728, filed on Dec. 1, 2020.

(30) Foreign Application Priority Data

Jan. 23, 2020 (JP) ................................ 2020-009060
Jan. 23, 2020 (JP) ................................ 2020-009061

(52) U.S. Cl.
CPC ...... *B60Q 2300/41* (2013.01); *B60Q 2300/42* (2013.01); *B60Q 2300/45* (2013.01)

(58) Field of Classification Search
USPC ........................................................ 362/466
See application file for complete search history.

(56) References Cited

U.S. PATENT DOCUMENTS

| | | | |
|---|---|---|---|
| 2020/0108766 A1 | 4/2020 | Shibata | |
| 2020/0238892 A1 | 7/2020 | Maruyama et al. | |
| 2020/0333182 A1* | 10/2020 | Ahmed | B60Q 9/00 |
| 2022/0289101 A1 | 9/2022 | Iriba | |
| 2022/0390082 A1* | 12/2022 | Tang | F21S 41/635 |
| 2023/0050600 A1* | 2/2023 | Namyslo | H04N 7/185 |
| 2023/0104992 A1* | 4/2023 | McGuire | G01S 7/4802 |
| | | | 356/4.01 |

FOREIGN PATENT DOCUMENTS

| | | |
|---|---|---|
| JP | 2008201280 A | 9/2008 |
| JP | 2008299538 A | 12/2008 |
| JP | 2010272067 A | 12/2010 |
| JP | 2012222533 A | 11/2012 |
| JP | 2015064964 A | 4/2015 |
| JP | 2016088224 A | 5/2016 |
| JP | 2017036047 A | 2/2017 |
| JP | 2019055756 A | 4/2019 |
| JP | 2019077204 A | 5/2019 |
| WO | 2018225684 A1 | 12/2018 |
| WO | 2018225710 A1 | 12/2018 |

OTHER PUBLICATIONS

Extended European Search Report dated Nov. 14, 2022, issued in corresponding European Application No. 22186169.3. (9 pages).
International Preliminary Report on Patentability Chapter I (PCT/IB/373 and PCT/ISA237) with translation dated May 17, 2022 by The International Bureau of WIPO in corresponding International Patent Application No. PCT/JP2020/044728. (16 pages).
International Search Report (PCT/ISA/210) with translation dated Feb. 9, 2021, by the Japan Patent Office as the International Searching Authority for International Application No. PCT/JP2020/044728. (12 pages).

* cited by examiner

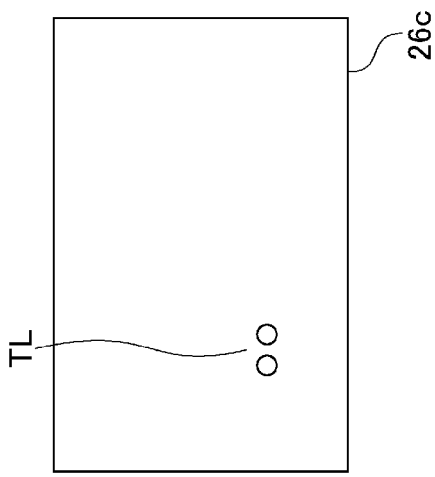
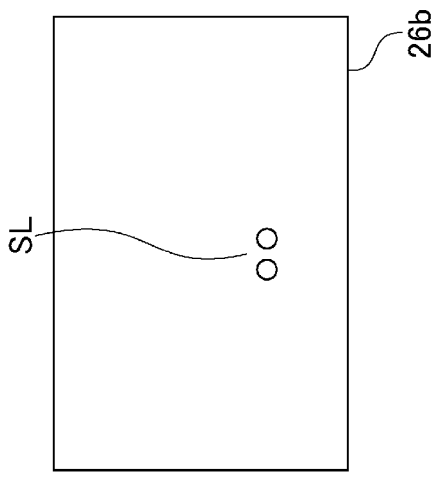
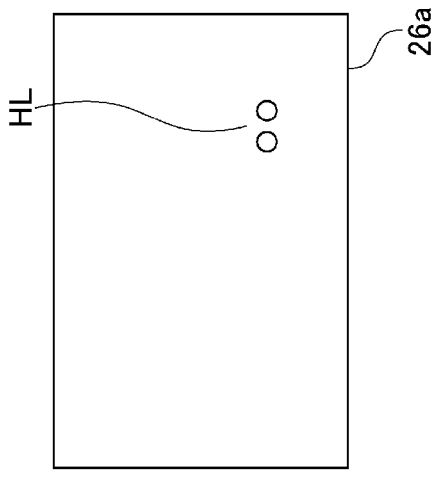

FIG. 8

VEHICLE DETECTING DEVICE, VEHICLE LAMP SYSTEM, VEHICLE DETECTING METHOD, LIGHT DISTRIBUTION CONTROLLING DEVICE, AND LIGHT DISTRIBUTION CONTROLLING METHOD

CROSS-REFERENCE TO RELATED APPLICATIONS

This application is a continuation of U.S. application Ser. No. 17/829,501, filed Jun. 1, 2022 which is based upon and claims the benefit of priority from the prior Japanese Patent Application No. 2019-219598, filed on Dec. 4, 2019, the prior Japanese Patent Application No. 2020-000677, filed on Jan. 7, 2020, the prior Japanese Patent Application No. 2020-009060, filed on Jan. 23, 2020, the prior Japanese Patent Application No. 2020-009061, filed on Jan. 23, 2020, and International Patent Application No. PCT/JP2020/044728, filed on Dec. 1, 2020, the entire content of each of which is incorporated herein by reference.

BACKGROUND

Field of the Invention

The present invention relates to vehicle detecting devices, vehicle lamp systems, vehicle detecting methods, light distribution controlling devices, and light distribution controlling methods.

Description of the Related Art

Vehicle lamps play an important role in safe driving at night or inside tunnels. If, with the priority on the visibility of the driver, vehicle lamps brightly illuminate a wide range of the region ahead of the vehicle, this creates a problem of causing glare to the driver of a preceding vehicle or an oncoming vehicle present ahead of the host vehicle.

Adaptive driving beam (ADB) control has been proposed in recent years, and this ADB control dynamically and adaptively controls a high beam light distribution pattern based on the situation surrounding the vehicle (see, for example, patent documents 1, 2). ADB control, by use of a camera, detects the presence of a target that is located ahead of the host vehicle and should not be illuminated with high luminance light. Then, ADB control dims or turns off the light for the region corresponding to this target.

Meanwhile, research and development are ongoing in recent years in advanced driver-assistance systems (ADAS) or automatic driving technologies as emerging technologies for assisting drivers in their driving operations. In ADAS or automatic driving technologies, the situation surrounding the host vehicle is grasped by use of an imaging device, such as a camera, serving as machine vision, and vehicle control suitable for the situation is executed.
Patent document 1: JP2015-064964
Patent document 2: JP2016-088224
1. The ADB control described above can improve the visibility of the driver of the host vehicle while preventing glare caused to front vehicles, such as preceding vehicles or oncoming vehicles. This provides improved vehicle driving safety for both the host vehicle and the other vehicles. Meanwhile, there exists a constant demand for further improving vehicle driving safety by further improving the accuracy of ADB control.
2. Dimming targets include front vehicles, including preceding vehicles and oncoming vehicles. When the light for illuminating a region corresponding to a front vehicle is dimmed or turned off, glare caused to the driver of the front vehicle can be reduced. Dimming targets also include high reflectance reflective objects, including roadside delineators, signboards, or road signs. When the light for illuminating a region corresponding to such a reflective object is dimmed, glare that the driver of the host vehicle experiences due to the light reflected by the reflective object can be reduced. In particular, vehicle lamps are increasingly becoming of higher luminance in recent years, and the intensity of light reflected by reflective objects is becoming higher. This has created a demand for a measure against glare caused by reflective objects.

In ADB control, a light distribution pattern is switched successively in accordance with the movement of a dimming target. Therefore, a light distribution pattern needs to be switched rapidly in ADB control. However, if the communication speed of a vehicle lamp system is increased in order to achieve the rapid switching in the light distribution pattern, this increases the cost needed for ADB control.

3. Dimming targets include front vehicles, including preceding vehicles and oncoming vehicles. When the light for illuminating a region corresponding to a front vehicle is dimmed or turned off, glare caused to the driver of the front vehicle can be reduced. Dimming targets also include high reflectance reflective objects, including roadside delineators or road signs. When the light for illuminating a region corresponding to such a reflective object is dimmed, glare that the driver of the host vehicle experiences due to the light reflected by the reflective object can be reduced. In particular, vehicle lamps are increasingly becoming of higher luminance in recent years, and the intensity of light reflected by reflective objects is becoming higher. This has created a demand for a measure against glare caused by reflective objects. After diligent study on ADB control, the present inventor has found a technique that can keep the visibility of the driver of a host vehicle and the drivers of front vehicles from decreasing in a situation in which both front vehicles and reflective objects are present.

4. In order to execute ADB control, ADAS, automatic driving technologies, or the like described above with high accuracy, an image of a region ahead of a host vehicle needs to be captured with high accuracy by an imaging device.

SUMMARY OF THE INVENTION

1. One aspect of the present invention has been made in view of such circumstances, and one object is to provide a technique that increases vehicle driving safety.
2. One aspect of the present invention has been made in view of such circumstances, and one object is to provide a technique that increases the speed of switching a light distribution pattern while keeping the cost from increasing.
3. One aspect of the present invention has been made in view of such circumstances, and one object is to provide a technique that keeps the visibility of the driver of a host vehicle and the drivers of front vehicles from decreasing.
4. One aspect of the present invention has been made in view of such circumstances, and one object is to provide a technique that increases the imaging accuracy of an imaging device.

1. An aspect of the present invention provides a vehicle detecting device that detects a front vehicle located in a region ahead of a vehicle. This device includes a camera, an image generating unit, and a detecting unit. The camera includes an image sensor and a first filter and captures an image of the region ahead of the vehicle. The image sensor includes a plurality of imaging elements including a first imaging element group and a second imaging element group. The first filter keeps an amount of light entering the first imaging element group lower than an amount of light entering the second imaging element group. The image generating unit generates a first image based on information obtained from the first imaging element group and a second image based on information obtained from the second imaging element group. The detecting unit detects the front vehicle based on the first image and the second image.

Another aspect of the present invention provides a vehicle lamp system. This system includes a light distribution variable lamp, the vehicle detecting device according to the aspect above, and a light distribution controlling device. The light distribution variable lamp is capable of illuminating a region ahead of a vehicle with a visible light beam of a variable intensity distribution. The light distribution controlling device controls the light distribution variable lamp based on a detection result of the vehicle detecting device.

Yet another aspect of the present invention provides a vehicle detecting method of detecting a front vehicle located in a region ahead of a vehicle. This method includes capturing an image of the region ahead of the vehicle with a camera that includes an image sensor and a first filter, the image sensor including a plurality of imaging elements including a first imaging element group and a second imaging element group, the first filter keeping an amount of light entering the first imaging element group lower than an amount of light entering the second imaging element group; generating a first image based on information obtained from the first imaging element group and a second image based on information obtained from the second imaging element group; and detecting the front vehicle based on the first image and the second image.

2. An aspect of the present invention provides a light distribution controlling device that, based on information obtained from an imaging device that captures an image of a region ahead of a vehicle, controls a light distribution variable lamp capable of illuminating the region ahead of the vehicle with a visible light beam of a variable intensity distribution. This device includes a luminance analyzing unit and a lamp controlling unit. The luminance analyzing unit, based on information obtained from the imaging device, analyzes a luminance of each of a plurality of individual regions arrayed ahead of a host vehicle. The lamp controlling unit, based on an analysis result of the luminance analyzing unit, determines a light distribution pattern to be formed in the region ahead of the vehicle by determining an illuminance of light for illuminating each individual region, and controls the light distribution variable lamp so as to form the determined light distribution pattern. The lamp controlling unit forms a reference light distribution pattern periodically at non-overlapping timings in a first individual region group and a second individual region group each included in the plurality of individual regions, and the reference light distribution pattern includes at least in part a fixed illuminance region that is not dependent on a luminance of the region ahead of the vehicle. The lamp controlling unit also updates a partial light distribution pattern to be formed in an individual region group where the reference light distribution pattern is formed, based on a luminance held while the reference light distribution pattern is formed, and retains a partial light distribution pattern to be formed in an individual region group where the reference light distribution pattern is not formed.

Another aspect of the present invention provides a vehicle lamp system. This system includes a light distribution variable lamp, an imaging device, and the light distribution controlling device according to the aspect above. The light distribution variable lamp is capable of illuminating a region ahead of a vehicle with a visible light beam of a variable intensity distribution. The imaging device captures an image of the region ahead of the vehicle.

Yet another aspect of the present invention provides a light distribution controlling method. This method is a light distribution controlling method that, based on information obtained from an imaging device that captures an image of a region ahead of a vehicle, controls a light distribution variable lamp capable of illuminating the region ahead of the vehicle with a visible light beam of a variable intensity distribution. The method includes forming a reference light distribution pattern periodically at non-overlapping timings in a first individual region group and a second individual region group each included in a plurality of individual regions arrayed ahead of a host vehicle, the reference light distribution pattern being not dependent on a luminance of the region ahead of the vehicle; and updating a partial light distribution pattern to be formed in an individual region group where the reference light distribution pattern is formed, based on a luminance held while the reference light distribution pattern is formed, and retaining a partial light distribution pattern to be formed in an individual region group where the reference light distribution pattern is not formed.

3. An aspect of the present invention provides a light distribution controlling device. This device includes a pattern determining unit and a lamp controlling unit. The pattern determining unit determines a light distribution pattern based on a visible light image and an infrared image. The visible light image is obtained from a visible light imaging unit that has a sensitivity to a visible light range and captures an image of a region ahead of a vehicle. The infrared image is obtained from an infrared imaging unit that has a sensitivity to an infrared range and captures an image of the region ahead of the vehicle. The lamp controlling unit controls the light distribution variable lamp so as to form the light distribution pattern in the region ahead of the vehicle. The light distribution variable lamp is capable of illuminating the region ahead of the vehicle with a visible light beam of a variable intensity distribution. The pattern determining unit sets a first low illuminance portion having an illuminance lower than an illuminance of a remaining portion based on a luminous point included in the visible light image, and generates a first precursor pattern that includes the first low illuminance portion; sets a second low illuminance portion having an illuminance that is lower than an illuminance of a remaining portion but higher than the illuminance of the first low illuminance portion based on a luminous point included in the infrared image captured while the region ahead of the vehicle is illuminated with infrared radiation from an infrared illuminator, and generates a second precursor pattern that includes the second low illuminance portion; and determines the light distribution pattern that includes the first low illuminance portion and the second low illuminance portion by combining the first precursor pattern and the second precursor pattern.

Another aspect of the present invention provides a vehicle lamp system. This system includes a light distribution variable lamp, an infrared illuminator, an imaging device, and the light distribution controlling device according to the aspect above. The light distribution variable lamp is capable of illuminating a region ahead of a vehicle with a visible light beam of a variable intensity distribution. The infrared illuminator is capable of illuminating the region ahead of the vehicle with infrared radiation. The imaging device includes a visible light imaging unit and an infrared imaging unit. The visible light imaging unit has a sensitivity to a visible light range and captures an image of the region ahead of the vehicle. The infrared imaging unit has a sensitivity to an infrared range and captures an image of the region ahead of the vehicle.

Yet another aspect of the present invention provides a light distribution controlling method. This method includes determining a light distribution pattern based on a visible light image and an infrared image, the visible light image obtained from a visible light imaging unit that has a sensitivity to a visible light range and captures an image of a region ahead of a vehicle, the infrared image obtained from an infrared imaging unit that has a sensitivity to an infrared range and captures an image of the region ahead of the vehicle; and controlling a light distribution variable lamp so as to form the light distribution pattern in the region ahead of the vehicle, the light distribution variable lamp being capable of illuminating the region ahead of the vehicle with a visible light beam of a variable intensity distribution. The determining of the light distribution pattern includes setting a first low illuminance portion having an illuminance lower than an illuminance of a remaining portion based on a luminous point included in the visible light image, and generating a first precursor pattern that includes the first low illuminance portion; setting a second low illuminance portion having an illuminance that is lower than an illuminance of a remaining portion but higher than the illuminance of the first low illuminance portion based on a luminous point included in the infrared image captured while the region ahead of the vehicle is illuminated with infrared radiation from an infrared illuminator, and generating a second precursor pattern that includes the second low illuminance portion, and determining the light distribution pattern that includes the first low illuminance portion and the second low illuminance portion by combining the first precursor pattern and the second precursor pattern.

4. An aspect of the present invention provides a vehicle lamp system. This system includes a vehicle lamp that illuminates a region ahead of a vehicle with light, an imaging device that captures an image of the region ahead of the vehicle, a housing that houses the vehicle lamp and the imaging device, and a lamp controlling unit that controls on and off of the vehicle lamp. The lamp controlling unit turns off the vehicle lamp while the imaging device is capturing an image and turns on the vehicle lamp while the imaging device is not capturing an image.

Any optional combination of the above constituent elements or an embodiment obtained by converting what is expressed by the present invention among a method, an apparatus, a system, and so on is also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

Figures 3A, 3B, 3C, 3D:
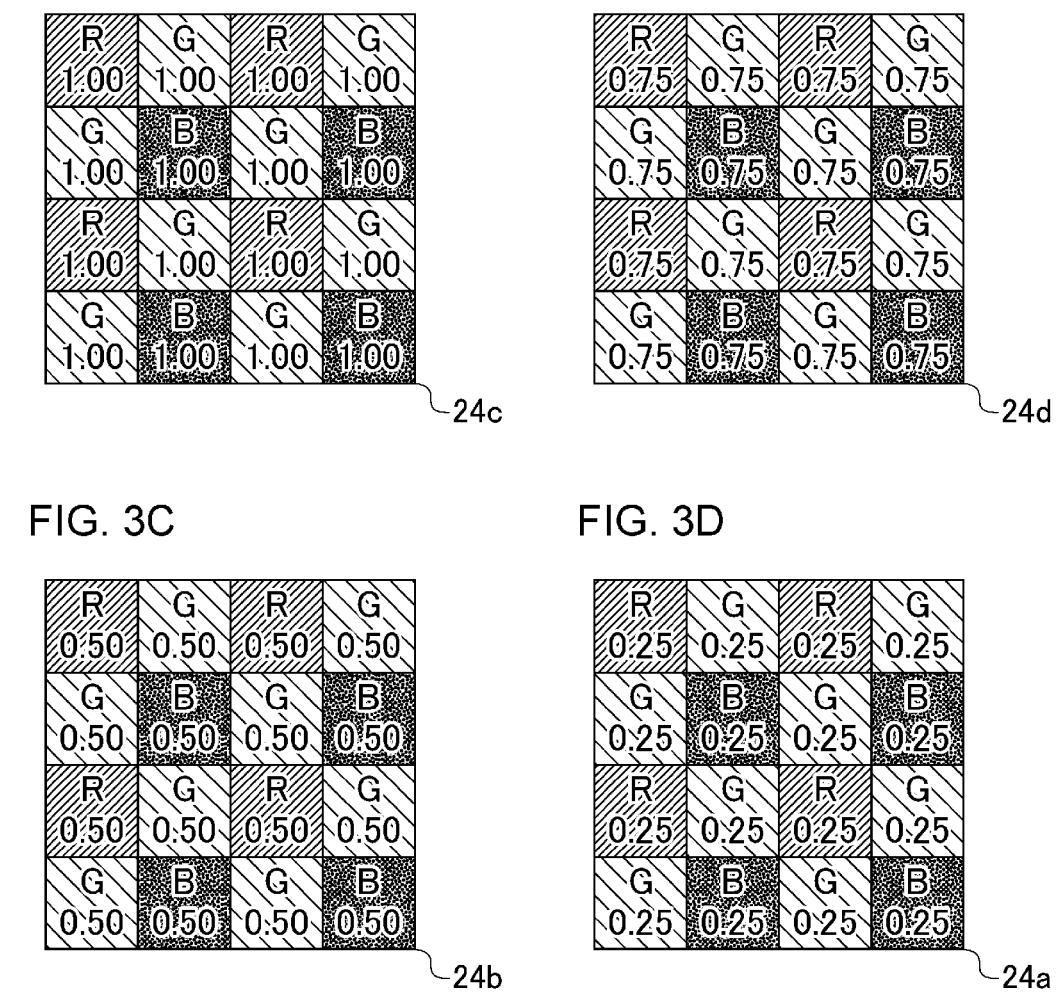

FIG. 3A to FIG. 3D are each a model diagram of a RAW image generated by an image generating unit.

FIG. 5A illustrates a first image, FIG. 5B illustrates a second image, and FIG. 5C illustrates a third image.

FIG. 8 is a schematic diagram of filters according to Variation 1.

DETAILED DESCRIPTION OF THE INVENTION

Figure 1:
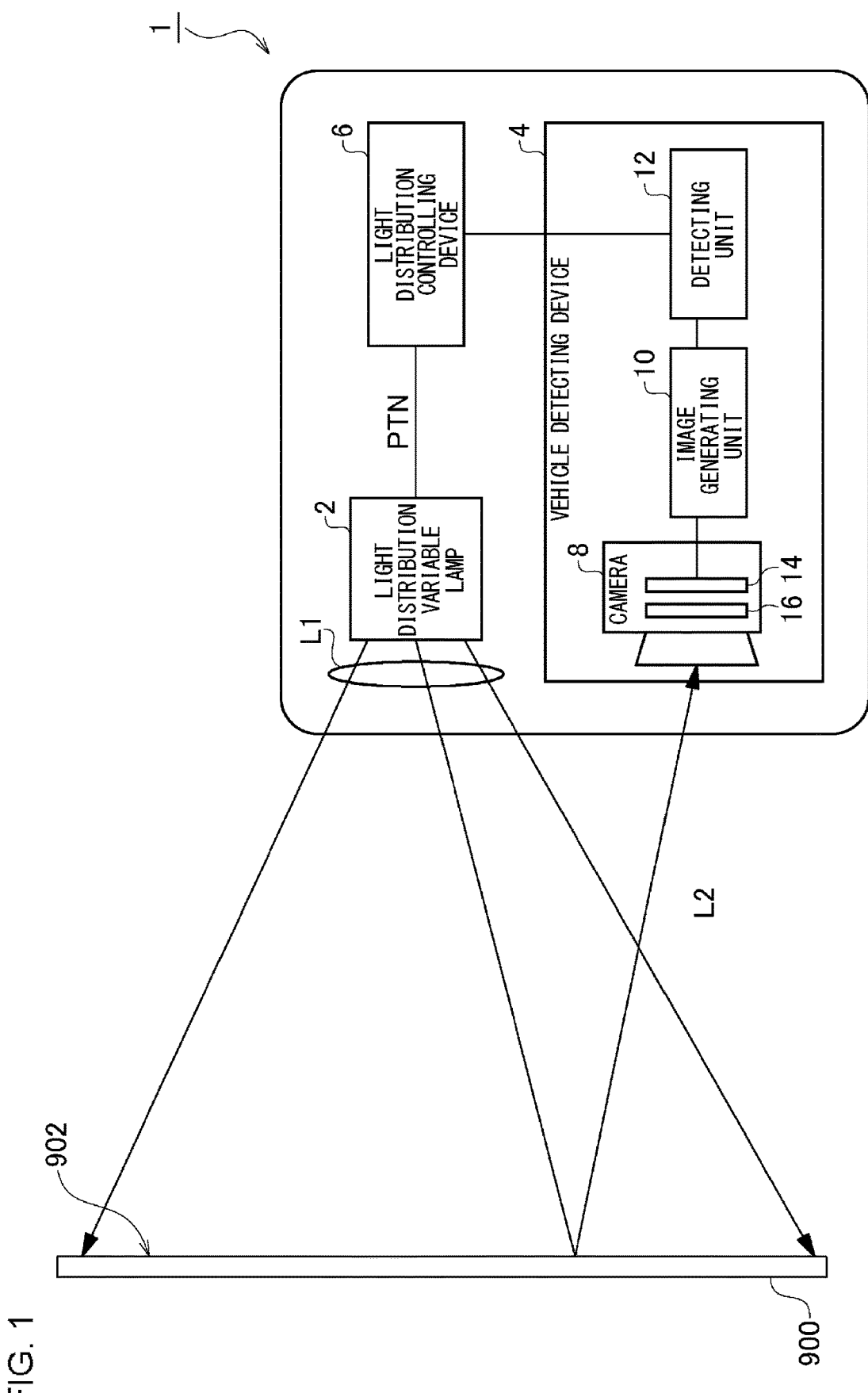
FIG. 1 is a block diagram of a vehicle lamp system according to Embodiment 1.

Hereinafter, the present invention will be described based on some exemplary embodiments and with reference to the drawings. The embodiments are illustrative in nature and are not intended to limit the invention. Not all the features and combinations thereof described according to the embodiments are necessarily essential to the invention. Identical or equivalent constituent elements, members, and processes illustrated in the drawings are given identical reference characters, and duplicate description thereof will be omitted, as appropriate.

The scales and the shapes of the components illustrated in the drawings are set merely for convenience in order to facilitate an understanding of the description and are not to be interpreted as limiting the invention, unless specifically indicated otherwise. When terms such as "first" and "second" are used in the present specification or in the claims, these terms do not indicate the order or the levels of importance in any way and are merely used to differentiate a given configuration from another configuration, unless specifically indicated otherwise. The part of a member that is not important in describing the embodiments is omitted from the drawings.

Embodiment 1

FIG. 1 is a block diagram of a vehicle lamp system according to Embodiment 1. FIG. 1 depicts some of the constituent elements of a vehicle lamp system 1 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, a vehicle detecting device 4, and a light distribution controlling device 6. These components may all be embedded within a single housing, or some of these components may be provided outside a housing, that is, provided in the vehicle. When the light distribution variable lamp 2 and a camera 8 (described later) of the vehicle detecting device 4 are disposed within the same housing, the parallax between the two components can be reduced in a simpler manner.

The light distribution variable lamp 2 is a white light source that can illuminate a region ahead of a vehicle with a visible light beam L1 of a variable intensity distribution. The light distribution variable lamp 2 receives data indicating a light distribution pattern PTN from the light distribution controlling device 6 and emits a visible light beam L1 having an intensity distribution corresponding to the light distribution pattern PTN. Thus, the light distribution pattern PTN is formed ahead of the vehicle. A light distribution pattern PTN can be regarded as a two-dimensional illuminance distribution of an illumination pattern 902 that the light distribution variable lamp 2 forms on an imaginary vertical screen 900 located ahead of the host vehicle. There is no particular limitation on the configuration of the light distribution variable lamp 2, and the light distribution variable lamp 2 may include, for example, a semiconductor light source, such as a light emitting diode (LED), a laser diode (LD), or an organic or inorganic electroluminescence (EL) device, and a lighting circuit that drives the semiconductor light source to turn it on.

In order to form an illuminance distribution corresponding to a given light distribution pattern PTN, the light distribution variable lamp 2 may include, for example, a pattern forming device of a matrix type, such as a digital mirror device (DMD) or a liquid crystal device, or a pattern forming device of a scan optics type that scans a region ahead of the host vehicle with light from a light source.

The vehicle detecting device 4 detects a front vehicle located in a region ahead of the vehicle. A front vehicle includes an oncoming vehicle and a preceding vehicle. The vehicle detecting device 4 includes a camera 8, an image generating unit 10, and a detecting unit 12. The image generating unit 10 and the detecting unit 12 can each be formed by a digital processor. The image generating unit 10 and the detecting unit 12 may each be formed, for example but not limited to, by a combination of a microcomputer including a CPU and a software program or by a field programmable gate array (FPGA) or an application specific integrated circuit (ASIC). These components each operate as an integrated circuit constituting the component executes a program stored in a memory. The same description applies to the light distribution controlling device 6.

The camera 8 has a sensitivity to a visible light range and captures an image of a region ahead of the vehicle. The camera 8 captures an image of reflected light L2 of a visible light beam L1 reflected by a target located ahead of the vehicle. The camera 8 includes an image sensor 14 and a plurality of filters 16 for light control.

Figure 2:
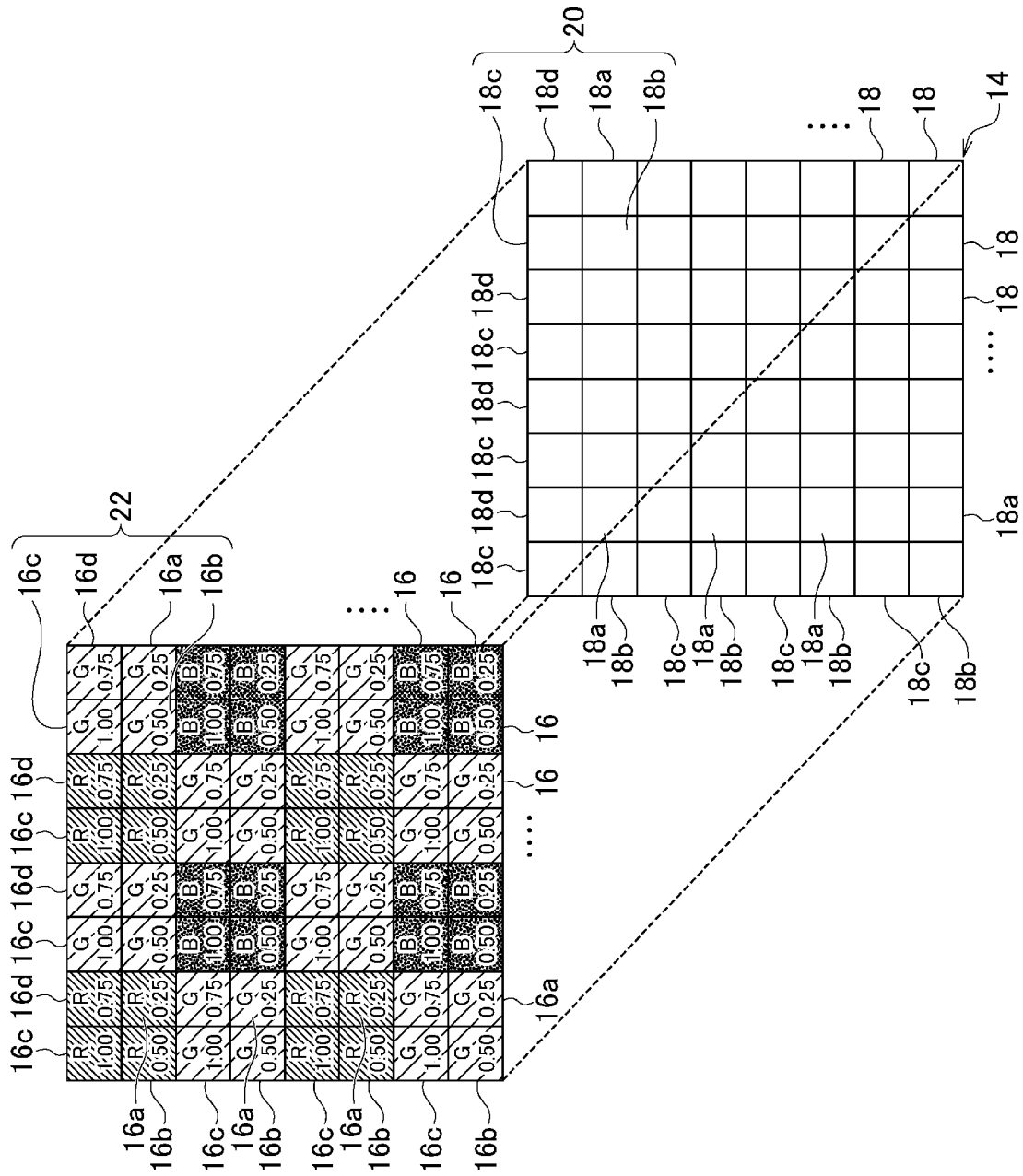
FIG. 2 is a schematic diagram of an image sensor and filters.

FIG. 2 is a schematic diagram of the image sensor 14 and the filters 16. The image sensor 14 includes a plurality of imaging elements 18 arrayed in a matrix. The imaging elements 18 according to the present embodiment include a first imaging element group 18a, a second imaging element group 18b, a third imaging element group 18c, and a fourth imaging element group 18d. The first imaging element group 18a to the fourth imaging element group 18d are provided with the respective filters 16 of different optical transmittance. Four imaging elements 18 consisting of one each selected from the first imaging element group 18a to the fourth imaging element group 18d form an element unit 20 where the four imaging elements 18 are arrayed in a two by two matrix, and a plurality of element units 20 are arrayed in a matrix. For the sake of description, the imaging elements 18 belonging to the first imaging element group 18a are each given the reference character 18a in FIG. 2. The same applies to the imaging elements 18 in the second imaging element group 18b to the fourth imaging element group 18d.

The filters 16 are disposed on the front of the respective imaging elements 18 and control the amount of light that enters the respective imaging elements 18. The filters 16 according to the present embodiment include first filters 16a, second filters 16b, third filters 16c, and fourth filters 16d. The first filters 16a are provided on the respective imaging elements 18 belonging to the first imaging element group 18a. The second filters 16b are provided on the respective imaging elements 18 belonging to the second imaging element group 18b. The third filters 16c are provided on the respective imaging elements 18 belonging to the third imaging element group 18c. The fourth filters 16d are provided on the respective imaging elements 18 belonging to the fourth imaging element group 18d.

The first filters 16a to the fourth filters 16d have mutually different optical transmittance. Specifically, the first filters 16a keep the amount of light entering the first imaging element group 18a lower than the amount of light entering the second imaging element group 18b to the fourth imaging element group 18d. The second filters 16b keep the amount of light entering the second imaging element group 18b lower than the amount of light entering the third imaging element group 18c or the fourth imaging element group 18d. The fourth filters 16d keep the amount of light entering the fourth imaging element group 18d lower than the amount of light entering the third imaging element group 18c. In one example, the optical transmittance of the first filters 16a is 0.25 (25%), the optical transmittance of the second filters 16b is 0.50 (50%), the optical transmittance of the third filters 16c is 1.00 (100%), and the optical transmittance of the fourth filters 16d is 0.75 (75%).

The first filters 16a to the fourth filters 16d can vary the amount of light entering the first imaging element group 18a to the fourth imaging element group 18d. Four filters 16 consisting of one each selected from the first filters 16a to the fourth filters 16d form a filter unit 22 where the four filters 16 are arrayed in a two by two matrix, and a plurality of filter units 22 are arrayed in a matrix. The filter units 22 correspond to the respective element units 20.

The first filters 16a include a red filter (R) that transmits red light and blocks blue light and green light, a green filter (G) that transmits green light and blocks red light and blue light, and a blue filter (B) that transmits blue light and blocks red light and green light. In a similar manner, the second filters 16b, the third filters 16c, and the fourth filters 16d each include a red filter, a green filter, and a blue filter. Each filter unit 22 includes a first filter 16a, a second filter 16b, a third filter 16c, and a fourth filter 16d of the same color.

The image sensor 14 photoelectrically converts the light transmitted through the filters 16 by the respective imaging elements 18 to generate an electric signal and transmits the generated electric signal to the image generating unit 10. The image generating unit 10 generates image data based on information obtained from the first imaging element group 18a to the fourth imaging element group 18d.

FIG. 3A to FIG. 3D are each a model diagram of a RAW image generated by the image generating unit 10. The image generating unit 10 extracts information obtained from the first imaging element group 18a and generates a first RAW image 24a illustrated in FIG. 3D. The image generating unit 10 extracts information obtained from the second imaging element group 18b and generates a second RAW image 24b illustrated in FIG. 3C. The image generating unit 10 extracts information obtained from the third imaging element group 18c and generates a third RAW image 24c illustrated in FIG. 3A. Although a fourth RAW image 24d is not used in a vehicle detecting process performed by the detecting unit 12 described later, the image generating unit 10 can extract information obtained from the fourth imaging element group 18d and generate the fourth RAW image 24d illustrated in FIG. 3B.

The image generating unit 10 generates the first RAW image 24a, the second RAW image 24b, the third RAW image 24c, and the fourth RAW image 24d based on information obtained from the first imaging element group 18a, the second imaging element group 18b, the third imaging element group 18c, and the fourth imaging element group 18d, respectively, in a single instance of exposure. In this case, the exposure time is set such that the third imaging element group 18c can capture an image of tail lamps TL, which have the lowest luminance among the tail lamps TL, stop lamps SL, and headlamps HL.

Figure 4C:
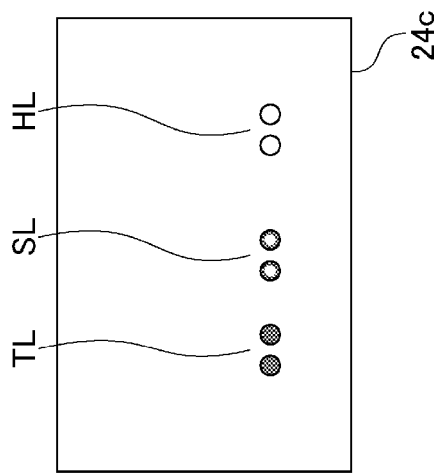
FIG. 4A to FIG. 4C each illustrate an actual RAW image generated by the image generating unit.
Figure 4B:
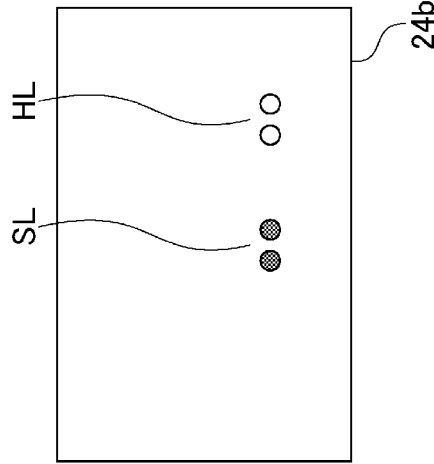
Figure 4A:
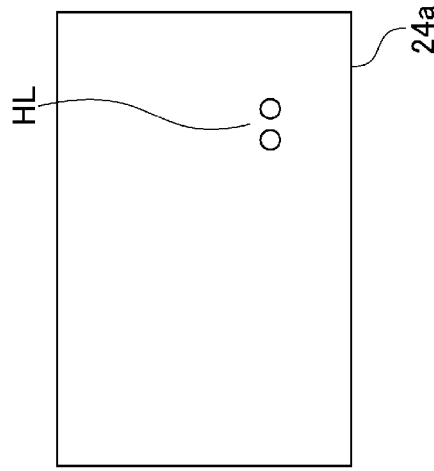

FIG. 4A to FIG. 4C each illustrate an actual RAW image generated by the image generating unit 10. The image illustrated in FIG. 4A is an example of the first RAW image 24a actually obtained. The image illustrated in FIG. 4B is an example of the second RAW image 24b actually obtained. The image illustrated in FIG. 4C is an example of the third RAW image 24c actually obtained.

The first RAW image 24a is generated from light transmitted through the first filters 16a having the lowest optical transmittance. The second RAW image 24b is generated from light transmitted through the second filters 16b having the second lowest optical transmittance. The third RAW image 24c is generated from light transmitted through the third filters 16c having the highest optical transmittance.

Hence, the third RAW image 24c includes luminous points of lower luminance than those in the first RAW image 24a or the second RAW image 24b. Meanwhile, the second RAW image 24b includes luminous points of lower luminance than those in the first RAW image 24a.

When there are a preceding vehicle and an oncoming vehicle ahead of the host vehicle, the luminance becomes higher in order from the tail lamps TL of the preceding vehicle to the stop lamps SL of the preceding vehicle to the headlamps HL of the oncoming vehicle. Therefore, as illustrated in FIG. 4A, the first RAW image 24a includes the luminous points corresponding to the headlamps HL but includes neither the luminous points corresponding to the tail lamps TL nor the luminous points corresponding to the stop lamps SL. Meanwhile, as illustrated in FIG. 4B, the second RAW image 24b includes the luminous points corresponding to the stop lamps SL and the luminous points corresponding to the headlamps HL but does not include the luminous points corresponding to the tail lamps TL. As illustrated in FIG. 4C, the third RAW image 24c includes the luminous points corresponding to the tail lamps TL, the luminous points corresponding to the stop lamps SL, and the luminous points corresponding to the headlamps HL.

When information obtained from the first imaging element group 18a to the fourth imaging element group 18d is added in a variety of combinations, not only the images of 4 brightness types, namely the first RAW image 24a to the fourth RAW image 24d, but also images of a maximum of 15 brightness types can be generated.

The image generating unit 10 generates a first image 26a based on information obtained from the first imaging element group 18a, generates a second image 26b based on information obtained from the second imaging element group 18b, and generates a third image 26c based on information obtained from the third imaging element group 18c. FIG. 5A illustrates the first image 26a, FIG. 5B illustrates the second image 26b, and FIG. 5C illustrates the third image 26c.

Specifically, the image generating unit 10 extracts luminous points corresponding to the headlamps HL from the first RAW image 24a by performing a binarization process on the first RAW image 24a by use of a predetermined threshold for luminance and generates the first image 26a. The image generating unit 10 extracts luminous points corresponding to the stop lamps SL from the second RAW image 24b by performing a binarization process on the second RAW image 24b by use of a predetermined threshold for red and generates the second image 26b. The image generating unit 10 extracts luminous points corresponding to the tail lamps TL from the third RAW image 24c by performing a binarization process on the third RAW image 24c by use of a predetermined threshold for red and generates the third image 26c.

The stop lamps SL included in the third RAW image 24c are white-clipped due to the length of the exposure time. Therefore, the stop lamps SL as well as the headlamps HL can be removed from the third RAW image 24c through the binarization with respect to red. Meanwhile, since the second filters 16b have a lower optical transmittance than the third filters 16c, white-clipping of the stop lamps SL is suppressed in the second RAW image 24b even with the same exposure time. Therefore, the stop lamps SL and the headlamps HL can be differentiated therebetween in the second RAW image 24b through the binarization with respect to red.

As described above, the image generating unit 10 generates the first RAW image 24a to the fourth RAW image 24d in a single instance of exposure. Therefore, the image generating unit 10 can generate the first image 26a, the second image 26b, and the third image 26c in a single instance of exposure. The image generating unit 10 sends information on the generated first image 26a to third image 26c to the detecting unit 12.

The detecting unit 12 detects a front vehicle or front vehicles based on the first image 26a, the second image 26b, and the third image 26c. Specifically, the detecting unit 12 detects the headlamps HL of the oncoming vehicle based on the luminous points included in the first image 26a. The detecting unit 12 detects the stop lamps SL of the preceding vehicle based on the luminous points included in the second image 26b. The detecting unit 12 detects the tail lamps TL of the preceding vehicle based on the luminous points included in the third image 26c.

The detecting unit 12 can detect the preceding vehicle based on the tail lamps TL and/or the stop lamps SL. The detecting unit 12 can detect the oncoming vehicle based on the headlamps HL. The detecting unit 12 can detect the preceding vehicle and the oncoming vehicle by use of a known method, including algorithm recognition or deep learning. The detecting unit 12 transmits a signal indicating the detection result to the light distribution controlling device 6.

Figure 6:
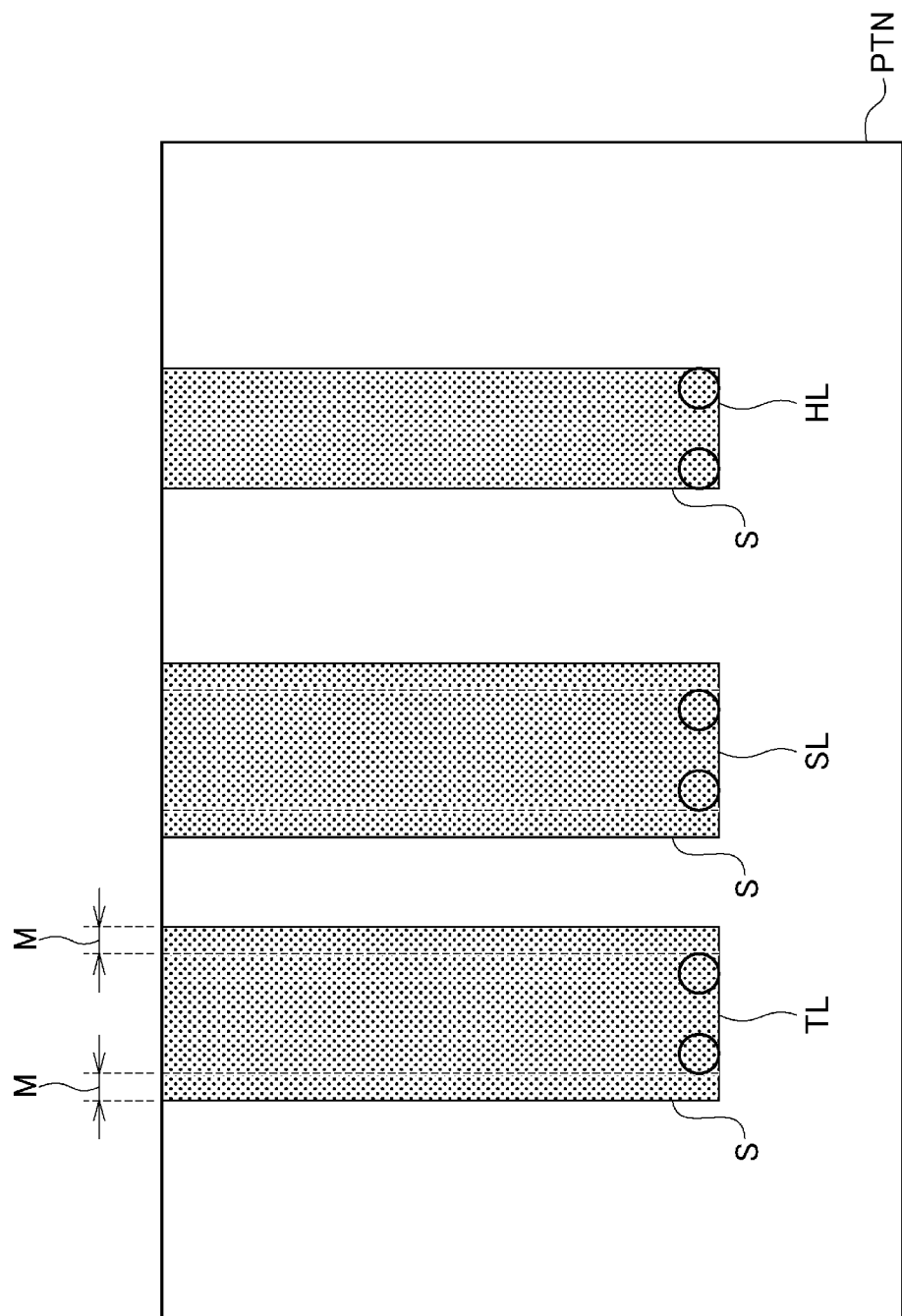
FIG. 6 illustrates an example of a light distribution pattern determined by a light distribution controlling device.

The light distribution controlling device 6 controls the light distribution variable lamp 2 based on the detection result of the vehicle detecting device 4. FIG. 6 illustrates an example of a light distribution pattern PTN determined by the light distribution controlling device 6. The light distribution controlling device 6 determines a light distribution pattern PTN that includes a non-illumination portion S based on the detection result of the detecting unit 12. The non-illumination portion S is set based on the luminous points corresponding to the tail lamps TL, the luminous points corresponding to the stop lamps SL, or the luminous points corresponding to the headlamps HL. Forming a light distribution pattern PTN that includes a non-illumination portion S can help reduce glare caused to the preceding vehicle or the oncoming vehicle. "Not illuminating a certain portion" includes a case where the luminance (the illuminance) of that portion is lowered as well as a case where the illuminance (the illuminance) of that portion is brought absolutely to zero.

When the light distribution controlling device 6 sets a non-illumination portion S for the preceding vehicle based on the tail lamps TL, the light distribution controlling device 6 sets, as a range of the non-illumination portion S in the widthwise direction of the vehicle, a region including a predetermined margin M extending outward in the widthwise direction of the vehicle from of each of the two luminous points corresponding to the respective tail lamps TL. The size of each margin M is set such that the margins M include, for example, the respective sideview mirrors of the preceding vehicle. In one example, the light distribution controlling device 6 sets, as a range of the non-illumination portion S in the vertical direction, a region extending upward from the two luminous points corresponding to the respective tail lamps TL.

Setting the non-illumination portion S that is wider in the widthwise direction of the vehicle by the margins M than the region defined by the two luminous points corresponding to the tail lamps TL can keep the driver of the preceding vehicle from being illuminated by light via the sideview mirrors. This configuration can suppress glare caused to the driver of the preceding vehicle more reliably.

In a similar manner, when the light distribution controlling device 6 sets a non-illumination portion S for the preceding vehicle based on the stop lamps SL, the light distribution controlling device 6 sets, as the non-illumination portion S, a region including a margin M extending outward in the widthwise direction of the vehicle from each of the luminous points corresponding to the respective stop lamps SL. Meanwhile, when the light distribution controlling device 6 sets a non-illumination portion S for the oncoming vehicle based on the headlamps HL, the light distribution controlling device 6 sets, as the non-illumination portion S, a region spanning between the one and the other luminous points corresponding to the headlamps HL without adding any margin M.

The light distribution controlling device 6 controls the light distribution variable lamp 2 such that the light distribution variable lamp 2 emits a visible light beam L1 having an intensity distribution corresponding to the determined light distribution pattern PTN. For example, in a case where the light distribution variable lamp 2 includes a DMD, the light distribution controlling device 6 controls the on and off of the light source and the on/off switching of each mirror element forming the DMD. This control can form the light distribution pattern PTN having a non-illumination portion S that overlaps a front vehicle and increase the visibility of the driver of the host vehicle without causing glare to the driver of the front vehicle.

According to the present embodiment, a preceding vehicle and an oncoming vehicle are detected based on a plurality of types of images generated in a single instance of exposure. Therefore, as compared to a case where images are captured in multiple instances with the exposure time varied in accordance with the luminance of each lamp, the position of a fast-moving preceding vehicle or oncoming vehicle can be captured with high accuracy.

Figure 7:
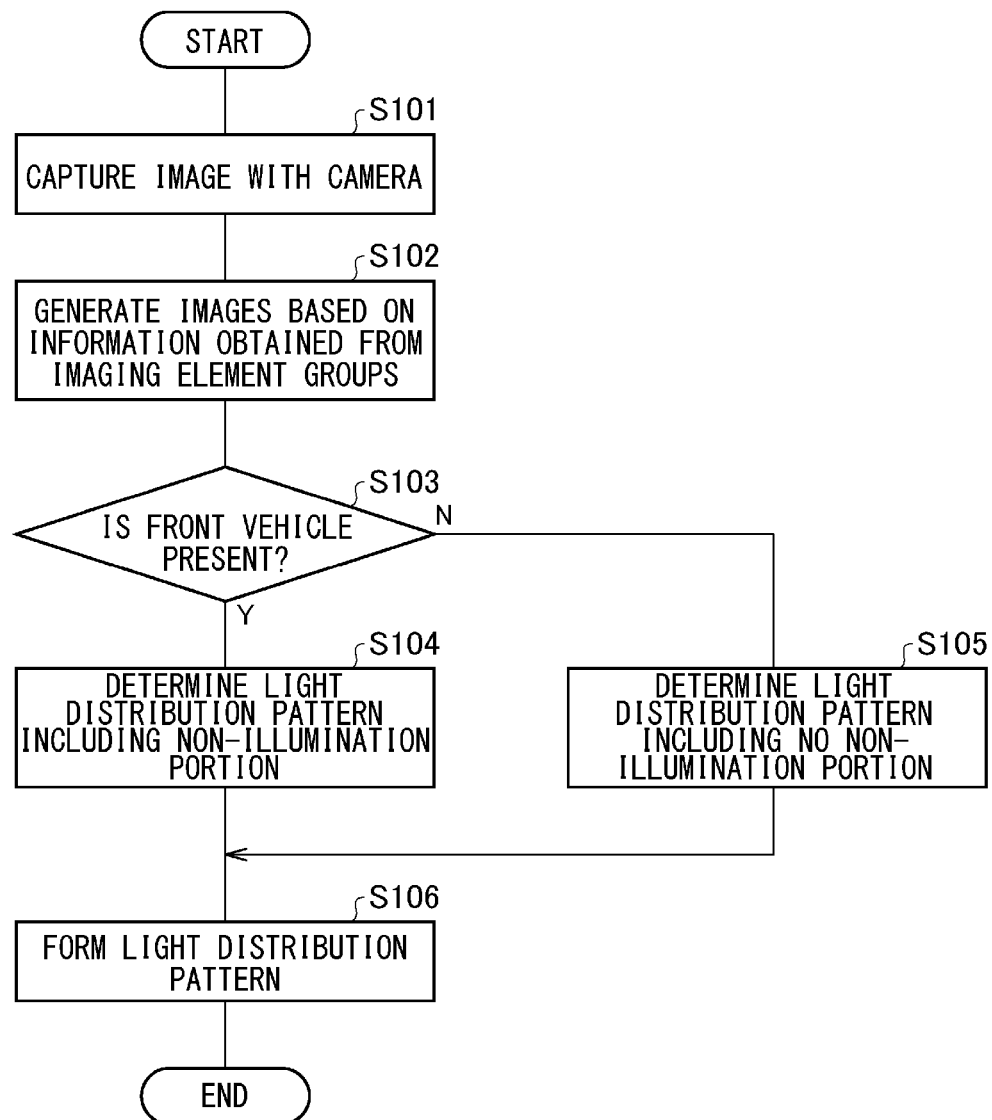
FIG. 7 is a flowchart illustrating an example of ADB control executed by a vehicle lamp system.

FIG. 7 is a flowchart illustrating an example of ADB control executed by the vehicle lamp system 1. This flow is executed repeatedly at predetermined timings, for example, when the vehicle lamp system 1 is instructed to execute the ADB control via a light switch (not illustrated) and when the ignition is on. First, an image of a region ahead of the vehicle is captured with the camera 8 (S101). Then, a first RAW image 24a to a third RAW image 24c are generated based on information obtained from the respective imaging element groups of the image sensor 14. Moreover, a first image 26a to a third image 26c are generated from the first RAW image 24a to the third RAW image 24c (S102).

Next, the presence or absence of a front vehicle is determined based on the first image 26a to the third image 26c (S103). If a front vehicle is present (Y at S103), a light distribution pattern PTN that includes a non-illumination portion S is determined (S104). If no front vehicle is present (N at S103), a light distribution pattern PTN that includes no non-illumination portion S is determined (S105). Thereafter, the determined light distribution pattern PTN is formed (S106), and this routine is terminated.

Figure 8:
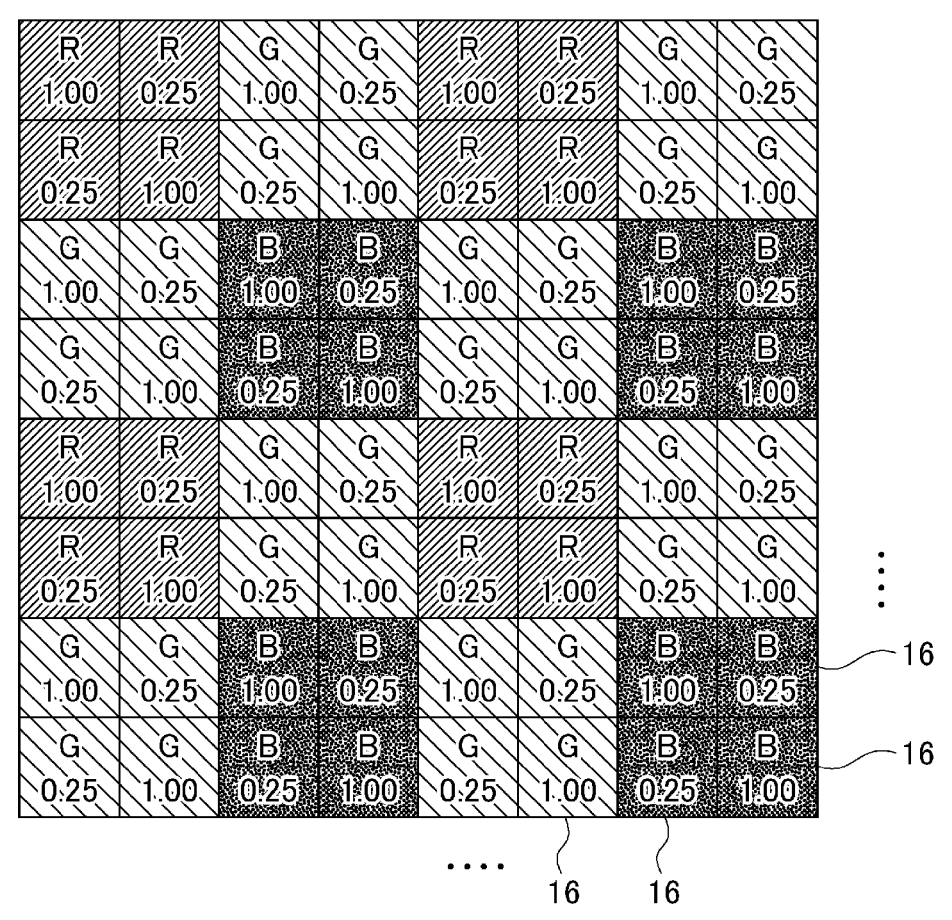

For example, as in Variation 1 illustrated in FIG. 8, the camera 8 may include only two types of filters 16 of different optical transmittance. FIG. 8 is a schematic diagram of filters 16 according to Variation 1. Even in this case, images of at least two brightness types can be generated in a single instance of exposure, and thus the positions of a plurality of targets of different luminance can be captured with high accuracy.

For example, first filters 16a having an optical transmittance of 0.25 and third filters 16c having an optical transmittance of 1.00 may be provided on the image sensor 14.

Then, a first image 26*a* that includes headlamps HL and a third image 26*c* that includes tail lamps TL can be obtained. This configuration can detect an oncoming vehicle based on the first image 26*a* and detect a preceding vehicle based on the third image 26*c*.

The third filters 16*c* having an optical transmittance of 1.00 can be omitted. In other words, no filter 16 may be provided for the third imaging element group 18*c*. Even in this case, the presence of the first filters 16*a* (i.e., the filters 16 of a single optical transmittance) enables at least the tail lamps TL and the headlamps HL to be extracted. In a case where only the first filters 16*a* are provided, the imaging elements 18 other than those in the first imaging element group 18*a* for which the first filters 16*a* are provided can be reworded as the second imaging element group 18*b*. Meanwhile, the presence of the first filters 16*a* and the second filters 16*b* (i.e., the filters 16 of two optical transmittance) enables the tail lamps TL, the stop lamps SL, and the headlamps HL to be extracted. The filters 16 may be of three different optical transmittance or five or more different optical transmittance.

As described above, the vehicle detecting device 4 according to the present embodiment includes the camera 8, the image generating unit 10, and the detecting unit 12. The camera 8 includes the image sensor 14 and the first filters 16*a* and captures an image of a region ahead of the vehicle. The image sensor 14 includes the plurality of imaging elements 18 including the first imaging element group 18*a* and the second imaging element group 18*b*. The first filters 16*a* keep the amount of light entering the first imaging element group 18*a* lower than the amount of light entering the second imaging element group 18*b*. The image generating unit 10 generates a first image 26*a* based on information obtained from the first imaging element group 18*a* and generates a second image 26*b* based on information obtained from the second imaging element group 18*b*. The detecting unit 12 detects a front vehicle based on the first image 26*a* and the second image 26*b*.

The vehicle lamp system 1 according to the present embodiment includes the light distribution variable lamp 2, the vehicle detecting device 4, and the light distribution controlling device 6. The light distribution variable lamp 2 is capable of illuminating a region ahead of the vehicle with a visible light beam L1 of a variable intensity distribution. The light distribution controlling device 6 controls the light distribution variable lamp 2 based on the detection result of the vehicle detecting device 4.

The first filters 16*a* may be provided for at least the first imaging element group 18*a*. Then, the image generating unit 10 can generate a first image 26*a* and a second image 26*b* of different brightness based on information obtained from, respectively, the first imaging element group 18*a* and the second imaging element group 18*b* in a single instance of exposure.

If a plurality of images of different brightness are generated in multiple instances of imaging with different exposure times, the position of a fast-moving preceding vehicle or oncoming vehicle changes as the imaging is repeated. This makes it difficult to superpose a non-illumination portion S on a preceding vehicle or an oncoming vehicle with high accuracy. In contrast, when a plurality of images of different brightness are generated in a single instance of exposure, the position of a preceding vehicle or an oncoming vehicle can be captured with high accuracy. This configuration can improve the accuracy of ADB control and increase vehicle driving safety. The above configuration can capture not only the position of a front vehicle but also the positions of a plurality of targets of different luminance with high accuracy. A target to be extracted can be selected by controlling the optical transmittance of the first filters 16*a*.

The image sensor 14 according to the present embodiment includes the third imaging element group 18*c*. The camera 8 includes the second filters 16*b* that keep the amount of light entering the second imaging element group 18*b* lower than the amount of light entering the third imaging element group 18*c*. The image generating unit 10 generates a third image 26*c* based on information obtained from the third imaging element group 18*c*. The detecting unit 12 detects a front vehicle based on the first image 26*a*, the second image 26*b*, and the third image 26*c*. This configuration can further improve the accuracy of ADB control.

The detecting unit 12 detects headlamps HL of an oncoming vehicle based on luminous points included in the first image 26*a*, detects stop lamps SL of a preceding vehicle based on luminous points included in the second image 26*b*, and detects tail lamps TL of the preceding vehicle based on luminous points included in the third image 26*c*. This configuration can differentiate between a preceding vehicle and an oncoming vehicle with higher accuracy. In ADB control, when a preceding vehicle and an oncoming vehicle can be differentiated from each other, a non-illumination portion S can be set for the preceding vehicle so as to include its sideview mirrors and set for the oncoming vehicle so as not to include its sideview mirrors. This makes it possible to achieve both prevention of glare caused to the front vehicle and improvement in the visibility of the host vehicle at a higher level.

Thus far, Embodiment 1 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also effective as an aspect of the present invention. Hatching added along a section in the drawings does not limit the material of the component with hatching.

The invention according to Embodiment 1 described above may be identified through the item indicated below.

[Item 1]

A vehicle detecting method of detecting a front vehicle located in a region ahead of a vehicle, the vehicle detecting method comprising:

imaging a region ahead of a vehicle with a camera (8) that includes an image sensor (14) and a first filter (16*a*), the image sensor (14) including a plurality of imaging elements (18) including a first imaging element group (18*a*) and a second imaging element group (18*b*), the first filter (16*a*) keeping an amount of light entering the first imaging element group (18*a*) lower than an amount of light entering the second imaging element group (18*b*);

generating a first image (26a) based on information obtained from the first imaging element group (18a) and a second image (26b) based on information obtained from the second imaging element group; and detecting the front vehicle based on the first image (26a) and the second image (26b).

Embodiment 2

Figure 9:
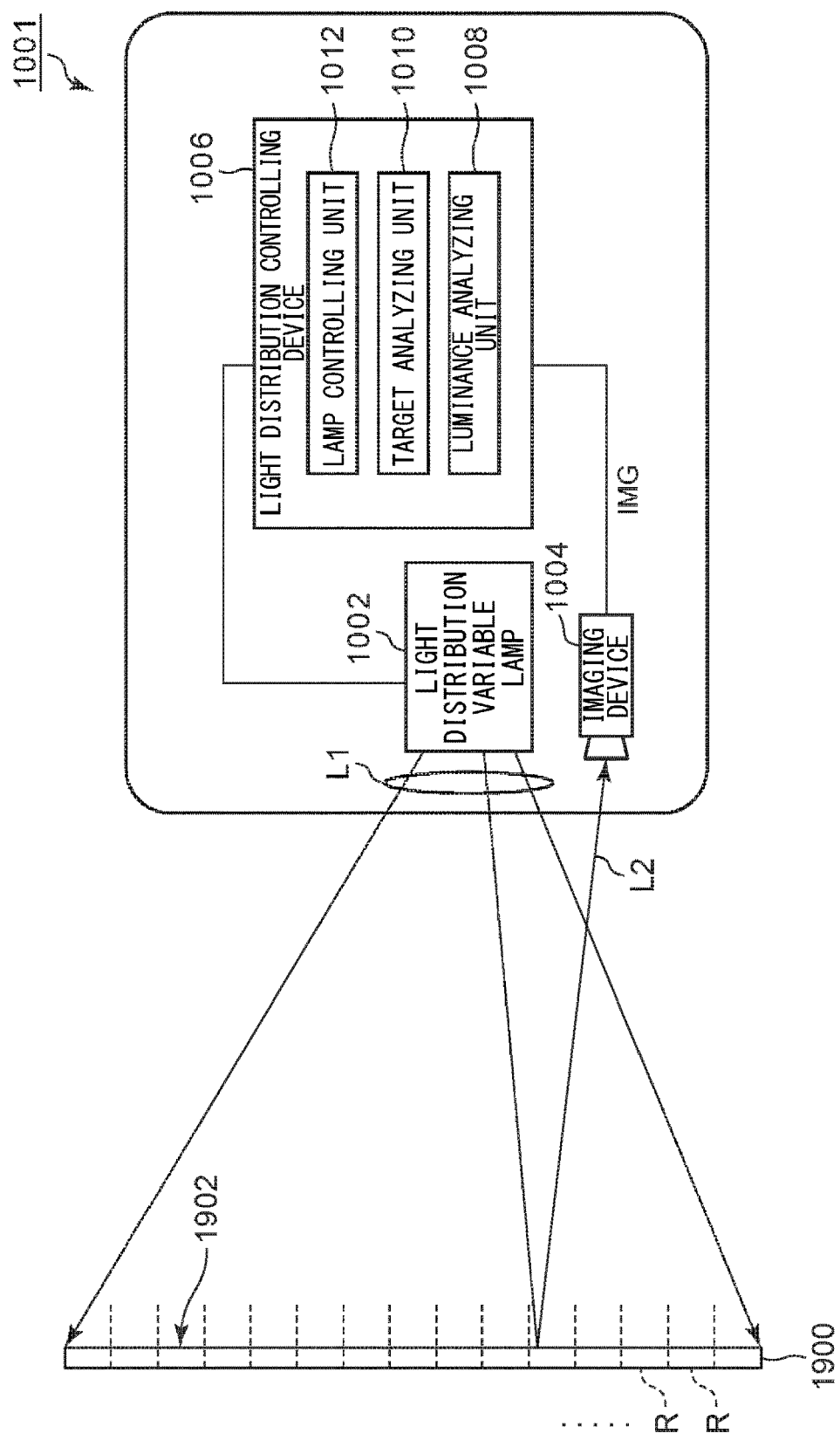
FIG. 9 is a block diagram of a vehicle lamp system according to Embodiment 2.

FIG. 9 is a block diagram of a vehicle lamp system according to Embodiment 2. FIG. 9 depicts some of the constituent elements of a vehicle lamp system 1001 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1001 includes a light distribution variable lamp 1002, an imaging device 1004, and a light distribution controlling device 1006. These components may all be embedded within a single housing, or some of these components may be provided outside a housing, that is, provided in the vehicle.

The light distribution variable lamp 1002 can control the luminous intensity of light for illuminating each of a plurality of individual regions R arrayed ahead of a host vehicle independently of each other. In other words, the light distribution variable lamp 1002 can illuminate a region ahead of the vehicle with a visible light beam L1 of a variable intensity distribution. The plurality of individual regions R are arrayed in a matrix, for example. The light distribution variable lamp 1002 receives data pertaining to a light distribution pattern PTN from the light distribution controlling device 1006 and emits a visible light beam L1 having an intensity distribution corresponding to the light distribution pattern PTN. Thus, the light distribution pattern PTN is formed ahead of the vehicle. A light distribution pattern PTN can be regarded as a two-dimensional illuminance distribution of an illumination pattern 1902 that the light distribution variable lamp 1002 forms on an imaginary vertical screen 1900 located ahead of the host vehicle.

There is no particular limitation on the configuration of the light distribution variable lamp 1002, and the light distribution variable lamp 1002 includes, for example, a plurality of light sources arrayed in a matrix and a lighting circuit that drives the light sources to turn them on independently of each other. Some preferred examples of such a light source include a semiconductor light source, such as an LED, an LD, or an organic or inorganic EL device. The individual regions R are mapped to the respective light sources, and each individual region R is illuminated individually with the light from the corresponding light source.

In order to form an illuminance distribution corresponding to a given light distribution pattern PTN, the light distribution variable lamp 1002 may include, for example, a pattern forming device of a matrix type, such as a DMD or a liquid crystal device, or a pattern forming device of a scan optics type that scans a region ahead of the host vehicle with light from a light source. The resolving power (the resolution) of the light distribution variable lamp 1002 is, for example, from 1,000 pixels to 1,300,000 pixels. The time required for the light distribution variable lamp 1002 to form a single light distribution pattern PTN is, for example, from 0.1 ms to 5 ms.

The imaging device 1004 has a sensitivity to a visible light range and captures an image of a region ahead of the vehicle. The imaging device 1004 captures an image of reflected light L2 of a visible light beam L1 reflected by an object located ahead of the vehicle. An image IMG that the imaging device 1004 acquires is sent to the light distribution controlling device 1006.

The light distribution controlling device 1006 executes ADB control of controlling the light distribution variable lamp 1002 and dynamically and adaptively controlling a light distribution pattern PTN based on information obtained from the imaging device 1004, that is, based on an image IMG. The light distribution controlling device 1006 can be formed by a digital processor. The light distribution controlling device 1006 may be formed, for example but not limited to, by a combination of a microcomputer including a CPU and a software program or by an FPGA or an ASIC.

The light distribution controlling device 1006 includes a luminance analyzing unit 1008, a target analyzing unit 1010, and a lamp controlling unit 1012. Now, a basic operation of each unit of the light distribution controlling device 1006 will be described. These units each operate as an integrated circuit constituting the unit executes a program stored in a memory.

The luminance analyzing unit 1008 analyzes the luminance of each individual region R based on an image IMG obtained from the imaging device 1004. The luminance analysis executed by the luminance analyzing unit 1008 includes binarizing the luminance value of each pixel in the image IMG by use of a predetermined luminance threshold. The luminance analyzing unit 1008 sends the analysis result to the lamp controlling unit 1012. The luminance threshold can be set as appropriate based on an experiment or a simulation conducted by the designer.

The target analyzing unit 1010 detects a predetermined target present ahead of the host vehicle based on an image IMG obtained from the imaging device 1004. The predetermined target to be detected by the target analyzing unit 1010 is, for example, a self-luminous object, and specific examples include a front vehicle, such as an oncoming vehicle or a preceding vehicle. The target analyzing unit 1010 can detect a target by use of a known method, including algorithm recognition or deep learning. For example, the target analyzing unit 1010 holds in advance feature points indicating a front vehicle. Then, when image data captured by the imaging device 1004 includes data that includes feature points indicating a front vehicle, the target analyzing unit 1010 recognizes the position of the front vehicle. "A feature point indicating a front vehicle" mentioned above is, for example, a luminous point having a luminous intensity no lower than a predetermined luminous intensity and appearing in a region where the headlamps of an oncoming vehicle, the tail lamps of a preceding vehicle, or the stop lamps of a preceding vehicle are estimated to appear. The target analyzing unit 1010 sends target information in a region ahead of the host vehicle to the lamp controlling unit 1012.

The lamp controlling unit 1012 sets the illuminance of light for illuminating each individual region R based on the analysis result of the luminance analyzing unit 1008 and determines a light distribution pattern PTN to be formed in the region ahead of the vehicle. The lamp controlling unit 1012 sends data pertaining to the determined light distribution pattern PTN to the light distribution variable lamp 1002 and controls the light distribution variable lamp 1002 so as to form the light distribution pattern PTN. For example, in a case where the light distribution variable lamp 1002 includes a DMD, the lamp controlling unit 1012 controls the on and off of the light source and the on/off switching of each mirror element forming the DMD. Thus, the light distribution pattern PTN is formed ahead of the host vehicle.

When determining the light distribution pattern PTN to be formed, the lamp controlling unit 1012 forms a reference light distribution pattern periodically at non-overlapping timings in a first individual region group and a second individual region group each included in the plurality of individual regions R. A reference light distribution pattern includes at least in part a fixed illuminance region that is not dependent on the luminance of the region ahead of the vehicle.

The lamp controlling unit 1012 updates a partial light distribution pattern formed in the individual region group where a reference light distribution pattern is formed based on the luminance held while the reference light distribution pattern is formed and retains a partial light distribution pattern formed in the individual region group where the reference light distribution pattern is not formed.

In other words, the lamp controlling unit 1012 divides the plurality of individual regions R into at least a first individual region group and a second individual region group, forms a first partial light distribution pattern in the first individual region group, and forms a second partial light distribution pattern in the second individual region group. The lamp controlling unit 1012 forms a reference light distribution pattern periodically at non-overlapping timings in the first individual region group and the second individual region group.

Then, when the lamp controlling unit 1012 has formed a reference light distribution pattern in the first individual region group, the lamp controlling unit 1012 updates the first partial light distribution pattern based on the luminance of the first individual region group held while the reference light distribution pattern is formed. The lamp controlling unit 1012 retains the second partial light distribution pattern as it is at the timing when the first partial light distribution pattern is updated. Meanwhile, when the lamp controlling unit 1012 has formed a reference light distribution pattern in the second individual region group, the lamp controlling unit 1012 updates the second partial light distribution pattern based on the luminance of the second individual region group held while the reference light distribution pattern is formed. The lamp controlling unit 1012 retains the first partial light distribution pattern as it is at the timing when the second partial light distribution pattern is updated. Accordingly, the first partial light distribution pattern and the second partial light distribution pattern are updated in different cycles.

Now, light distribution control (ADB control) executed by the light distribution controlling device 1006 will be described. FIG. 10A to FIG. 10H, FIG. 11A to FIG. 11H, and FIG. 12A to FIG. 12D are schematic diagrams for describing the light distribution control executed by the light distribution controlling device 1006. FIG. 10A, FIG. 10E, FIG. 11A, FIG. 11E, and FIG. 12A are each an image IMG obtained from the imaging device 1004. FIG. 10B, FIG. 10F, FIG. 11B, FIG. 11F, and FIG. 12B are each a non-illumination pattern PTNb generated by the light distribution controlling device 1006. FIG. 10C, FIG. 10G, FIG. 11C, FIG. 11G, and FIG. 12C are each a reference light distribution pattern PTNa. FIG. 10D, FIG. 10H, FIG. 11D, FIG. 11H, and FIG. 12D are each a light distribution pattern PTN determined by the light distribution controlling device 1006.

Figure 10A:
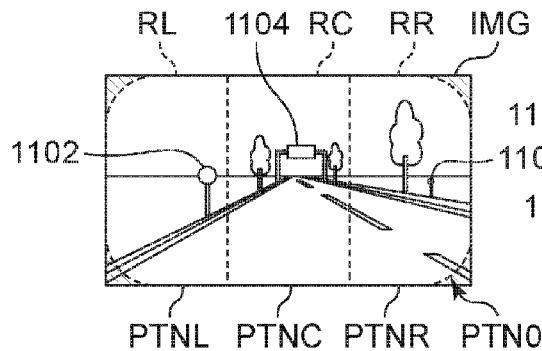
FIG. 10A to FIG. 10H are schematic diagrams for describing light distribution control executed by a light distribution controlling device.

When ADB control is started, first, the lamp controlling unit 1012 controls the light distribution variable lamp 1002 so as to form a light distribution pattern PTN0. The light distribution pattern PTN0 is a pattern formed initially in the ADB control, and in one example, a reference light distribution pattern PTNa is used. The lamp controlling unit 1012 holds in advance information regarding the reference light distribution pattern PTNa. When the light distribution pattern PTN0 is formed, an image IMG reflecting the situation ahead of the host vehicle observed while the light distribution pattern PTN0 is formed is obtained by the imaging device 1004, as illustrated in FIG. 10A.

The light distribution pattern PTN0 is a pattern of a fixed illuminance that is not dependent on the luminance of the region ahead of the host vehicle. For example, the light distribution pattern PTN0 is formed of a light distribution pattern that the driver has selected in accordance with the traveling environment of the host vehicle before the start of the light distribution control or selected by the vehicle lamp system 1001. In one example, the light distribution pattern PTN0 is formed of either a low beam light distribution pattern or a high beam light distribution pattern.

If the host vehicle is traveling in a city area, a low beam light distribution pattern is often selected as a light distribution pattern to be formed while ADB control is not executed. In this case, the light distribution pattern PTN0 is a low beam light distribution pattern. Meanwhile, if the host vehicle is traveling in a suburb, a high beam light distribution pattern is often selected as a light distribution pattern to be formed while ADB control is not executed. In this case, the light distribution pattern PTN0 is a high beam light distribution pattern. FIG. 10A illustrates a high beam light distribution pattern as the light distribution pattern PTN0.

According to the present embodiment, the plurality of individual regions R are divided into three groups: a left individual region group RL, a center individual region group RC, and a right individual region group RR. Accordingly, the light distribution pattern PTN0 is formed of a left partial light distribution pattern PTNL that overlaps the left individual region group RL, a center partial light distribution pattern PTNC that overlaps the center individual region group RC, and a right partial light distribution pattern PTNR that overlaps the right individual region group RR.

Figure 10E:
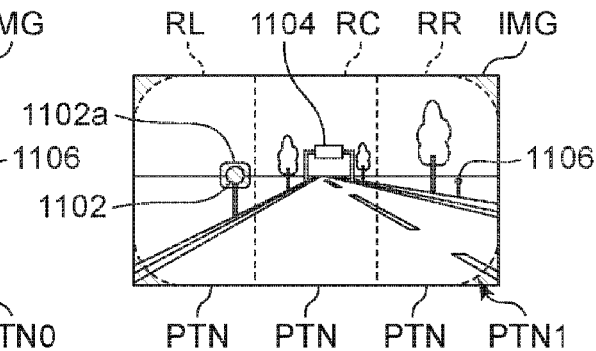
Figure 10B:
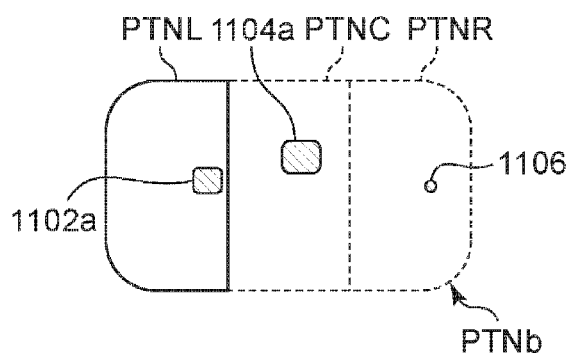

As illustrated in FIG. 10B, the luminance analyzing unit 1008 analyzes the luminance of each individual region R based on the image IMG that the imaging device 1004 has captured while the light distribution pattern PTN0 is formed. Then, the lamp controlling unit 1012 generates a non-illumination pattern PTNb based on the analysis result of the luminance analyzing unit 1008. For example, the luminance analyzing unit 1008 performs a binarization process on the luminance values of the image IMG. Then, the lamp controlling unit 1012 generates a non-illumination pattern PTNb by inverting the luminance value of each pixel in the image subjected to the binarization process. In other words, the lamp controlling unit 1012 determines a light distribution pattern in which the illuminance of light for illuminating an individual region R having a luminance higher than a predetermined threshold is set lower than the illuminance of light for illuminating an individual region R having a luminance lower than the threshold. The non-illumination pattern PTNb includes a left partial light distribution pattern PTNL, a center partial light distribution pattern PTNC, and a right partial light distribution pattern PTNR.

In the example illustrated in FIG. 10A, a first sign 1102 is present in the left individual region group RL, a second sign 1104 is present in the center individual region group RC, and a delineator 1106 is present in the right individual region group RR. The first sign 1102, the second sign 1104, and the delineator 1106 illuminated with the light distribution pattern PTN0 are each captured as a high luminance object in the image IMG. Therefore, the left partial light distribution pattern PTNL of the non-illumination pattern PTNb includes a low illuminance region 1102a corresponding to the first sign 1102. The center partial light distribution pattern PTNC includes a low illuminance region 1104a corresponding to the second sign 1104. The right partial light distribution pattern PTNR includes a low illuminance region 1106a corresponding to the delineator 1106. The illuminance of each of the low illuminance regions 1102a, 1104a, and 1106a is, for example, zero.

The target analyzing unit 1010 detects the presence or absence of, for example, a front vehicle as a predetermined target based on the image IMG captured while the light distribution pattern PTN0 is formed. No front vehicle is present in the example illustrated in FIG. 10A. Therefore, no target is detected by the target analyzing unit 1010, and the reference light distribution pattern PTNa remains being formed, as illustrated in FIG. 10C.

The reference light distribution pattern PTNa includes at least in part a fixed illuminance region 1014 that is not dependent on the luminance of the region ahead of the host vehicle. Since no front vehicle is present ahead of the host vehicle in the example illustrated in FIG. 10A, the entirety of the reference light distribution pattern PTNa is formed of the fixed illuminance region 1014. The illuminance of the fixed illuminance region 1014 conforms to the regulatory defined illuminance of a high beam light distribution pattern if the reference light distribution pattern PTNa is, for example, a high beam light distribution pattern. The reference light distribution pattern PTNa is formed of a left partial light distribution pattern PTNL, a center partial light distribution pattern PTNC, and a right partial light distribution pattern PTNR.

Figure 10F:
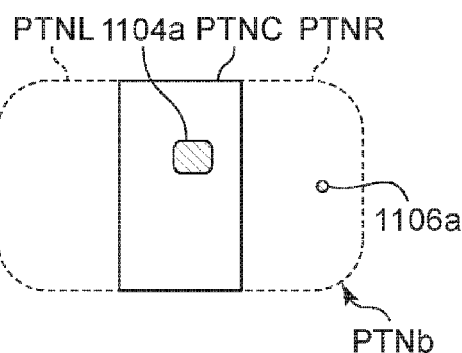
Figure 10C:
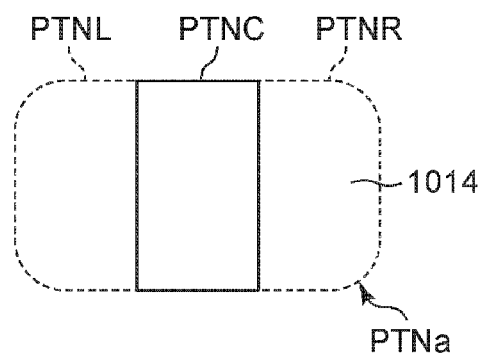
Figure 10G:
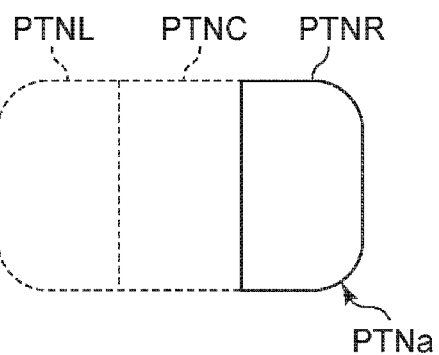
Figure 10D:
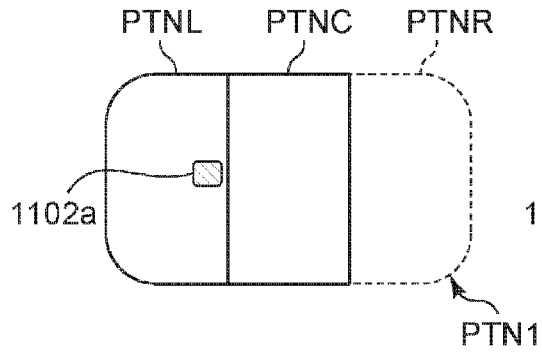

Next, the lamp controlling unit 1012 determines a light distribution pattern PTN1 to be formed next based on the generated non-illumination pattern PTNb and the reference light distribution pattern PTNa, as illustrated in FIG. 10D.

In one example, the lamp controlling unit 1012 updates each partial light distribution pattern in order from the left partial light distribution pattern PTNL to the center partial light distribution pattern PTNC to the right partial light distribution pattern PTNR. Hence, the lamp controlling unit 1012 sets the left partial light distribution pattern PTNL of the non-illumination pattern PTNb into a left partial light distribution pattern PTNL of the light distribution pattern PTN1. The partial light distribution pattern to be updated next is the center partial light distribution pattern PTNC. Hence, the lamp controlling unit 1012 sets the center partial light distribution pattern PTNC of the reference light distribution pattern PTNa into a center partial light distribution pattern PTNC of the light distribution pattern PTN1. A right partial light distribution pattern PTNR of the light distribution pattern PTN1 is retained to the right partial light distribution pattern PTNR of the light distribution pattern PTN0 formed last time. Thus, the light distribution pattern PTN1 to be formed next turns out to be a pattern in which the left partial light distribution pattern PTNL includes the low illuminance region 1102a.

The lamp controlling unit 1012 transfers, to the light distribution variable lamp 1002, data pertaining to, of the determined light distribution pattern PTN1, the left partial light distribution pattern PTNL and the center partial light distribution pattern PTNC, excluding the right partial light distribution pattern PTNR to be retained from the last light distribution pattern PTN0. Thus, the light distribution pattern PTN1 is formed ahead of the host vehicle, as illustrated in FIG. 10E. Then, an image IMG representing the situation ahead of the host vehicle observed while the light distribution pattern PTN1 is formed is generated by the imaging device 1004.

Next, as illustrated in FIG. 10F, the luminance analyzing unit 1008 performs a luminance analysis on the obtained image IMG. Then, the lamp controlling unit 1012 generates a non-illumination pattern PTNb. A left partial light distribution pattern PTNL to be formed in the left individual region group RL includes the low illuminance region 1102a that overlaps the first sign 1102. The first sign 1102 is not a self-luminous object. Therefore, the first sign 1102 is not captured as a high luminance object in the obtained image IMG. Meanwhile, a center partial light distribution pattern PTNC to be formed in the center individual region group RC is derived from the reference light distribution pattern PTNa, and a right partial light distribution pattern PTNR to be formed in the right individual region group RR is derived from the light distribution pattern PTN0. Therefore, the second sign 1104 and the delineator 1106 are each captured as a high luminance object in the image IMG.

Hence, the left partial light distribution pattern PTNL of the generated non-illumination pattern PTNb does not include the low illuminance region 1102a. Meanwhile, the center partial light distribution pattern PTNC includes the low illuminance region 1104a. The right partial light distribution pattern PTNR includes the low illuminance region 1106a. The target analyzing unit 1010 performs target detection based on the image IMG captured while the light distribution pattern PTN1 is formed. As a result, the reference light distribution pattern PTNa is retained, as illustrated in FIG. 10G.

Figure 10H:
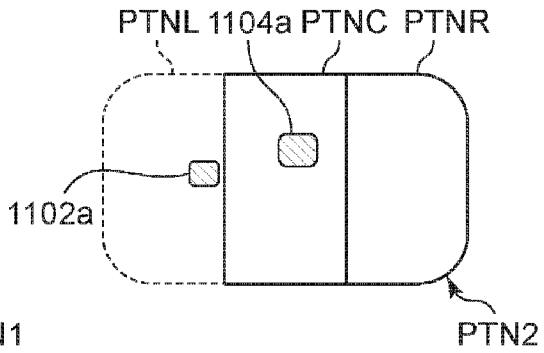

Next, the lamp controlling unit 1012 determines a light distribution pattern PTN2 to be formed next based on the generated non-illumination pattern PTNb and the reference light distribution pattern PTNa, as illustrated in FIG. 10H. Since the center partial light distribution pattern PTNC is to be updated this time, the lamp controlling unit 1012 sets the center partial light distribution pattern PTNC of the non-illumination pattern PTNb into a center partial light distribution pattern PTNC of the light distribution pattern PTN2. The partial light distribution pattern to be updated next is the right partial light distribution pattern PTNR. Hence, the lamp controlling unit 1012 sets the right partial light distribution pattern PTNR of the reference light distribution pattern PTNa into a right partial light distribution pattern PTNR of the light distribution pattern PTN2. A left partial light distribution pattern PTNL of the light distribution pattern PTN2 is retained to the left partial light distribution pattern PTNL of the light distribution pattern PTN1 formed last time. Thus, the light distribution pattern PTN2 to be formed next turns out to be a pattern in which the left partial light distribution pattern PTNL includes the low illuminance region 1102a and the center partial light distribution pattern PTNC includes the low illuminance region 1104a.

Figure 11A:
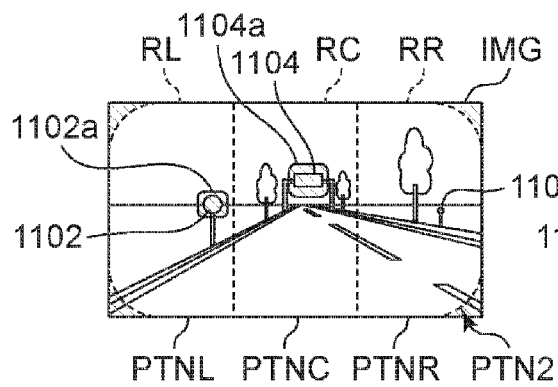
FIG. 11A to FIG. 11H are schematic diagrams for describing light distribution control executed by the light distribution controlling device.

The lamp controlling unit 1012 transfers, to the light distribution variable lamp 1002, data pertaining to, of the determined light distribution pattern PTN2, the center partial light distribution pattern PTNC and the right partial light distribution pattern PTNR, excluding the left partial light distribution pattern PTNL to be retained from the last light distribution pattern PTN1. Thus, the light distribution pattern PTN2 is formed ahead of the host vehicle, as illustrated in FIG. 11A. Then, an image IMG representing the situation ahead of the host vehicle observed while the light distribution pattern PTN2 is formed is generated by the imaging device 1004.

Figure 11E:
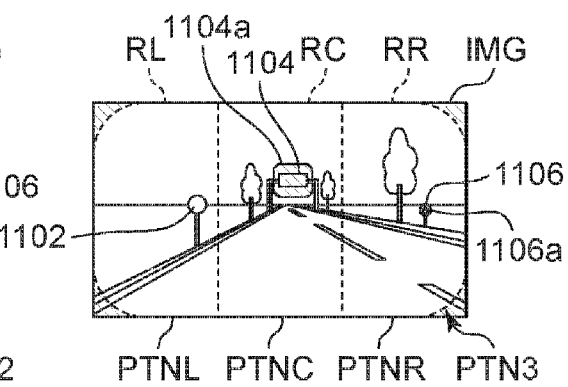
Figure 11B:
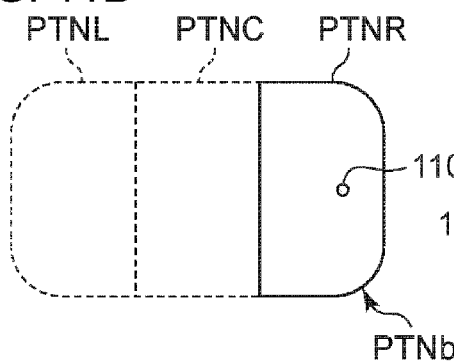

Next, as illustrated in FIG. 11B, the luminance analyzing unit 1008 performs a luminance analysis on the image IMG. Then, the lamp controlling unit 1012 generates a non-illumination pattern PTNb. The left partial light distribution pattern PTNL includes the low illuminance region 1102a, and the center partial light distribution pattern PTNC includes the low illuminance region 1104a. Neither the first sign 1102 nor the second sign 1104 is a self-luminous object. Therefore, neither the first sign 1102 nor the second sign 1104 is captured as a high luminance object in the image IMG. Meanwhile, the right partial light distribution pattern PTNR is derived from the reference light distribution pattern PTNa. Therefore, the delineator 1106 is captured as a high luminance object in the image IMG.

Hence, a left partial light distribution pattern PTNL of the generated non-illumination pattern PTNb does not include the low illuminance region 1102a, nor does a center partial light distribution pattern PTNC include the low illuminance region 1104a. Meanwhile, a right partial light distribution pattern PTNR includes the low illuminance region 1106a. The target analyzing unit 1010 performs target detection based on the image IMG captured while the light distribution pattern PTN2 is formed. As a result, the reference light distribution pattern PTNa is retained, as illustrated in FIG. 11C.

Figure 11F:
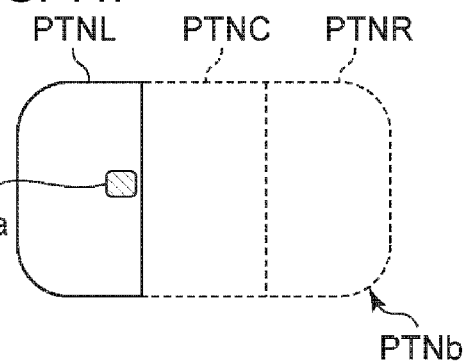
Figure 11C:
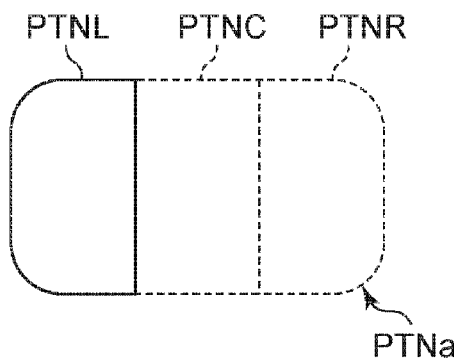
Figure 11G:
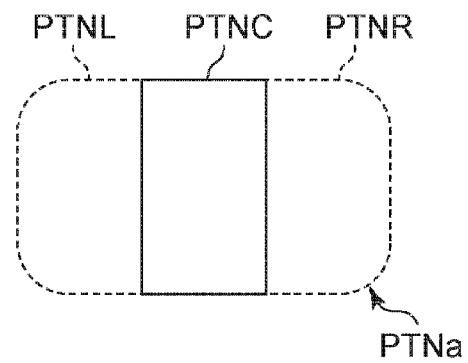
Figure 11D:
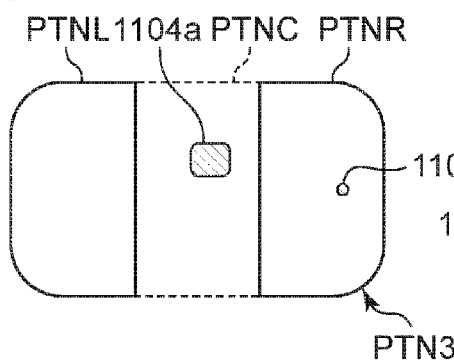

Next, the lamp controlling unit 1012 determines a light distribution pattern PTN3 to be formed next based on the generated non-illumination pattern PTNb and the reference light distribution pattern PTNa, as illustrated in FIG. 11D. Since the right partial light distribution pattern PTNR is to be updated this time, the lamp controlling unit 1012 sets the right partial light distribution pattern PTNR of the non-illumination pattern PTNb into a right partial light distribution pattern PTNR of the light distribution pattern PTN3. The partial light distribution pattern to be updated next is the left partial light distribution pattern PTNL. Hence, the lamp controlling unit 1012 sets the left partial light distribution pattern PTNL of the reference light distribution pattern PTNa into a left partial light distribution pattern PTNL of the light distribution pattern PTN3. A center partial light distribution pattern PTNC of the light distribution pattern PTN3 is retained to the center partial light distribution pattern PTNC of the light distribution pattern PTN2 formed last time. Thus, the light distribution pattern PTN3 to be formed next turns out to be a pattern in which the center partial light distribution pattern PTNC includes the low illuminance region 1104a and the right partial light distribution pattern PTNR includes the low illuminance region 1106a.

The lamp controlling unit 1012 transfers, to the light distribution variable lamp 1002, data pertaining to, of the determined light distribution pattern PTN3, the left partial light distribution pattern PTNL and the right partial light distribution pattern PTNR, excluding the center partial light distribution pattern PTNC to be retained from the last light distribution pattern PTN2. Thus, the light distribution pattern PTN3 is formed ahead of the host vehicle, as illustrated in FIG. 11E. Then, an image IMG representing the situation ahead of the host vehicle observed while the light distribution pattern PTN3 is formed is generated by the imaging device 1004.

Next, as illustrated in FIG. 11F, the luminance analyzing unit 1008 executes a luminance analysis on the obtained image IMG. Then, the lamp controlling unit 1012 generates a non-illumination pattern PTNb. The center partial light distribution pattern PTNC includes the low illuminance region 1104a, and the right partial light distribution pattern PTNR includes the low illuminance region 1106a. Neither the second sign 1104 nor the delineator 1106 is a self-luminous object. Therefore, neither the second sign 1104 nor the delineator 1106 is captured as a high luminance object in the image IMG. Meanwhile, the left partial light distribution pattern PTNL is derived from the reference light distribution pattern PTNa. Therefore, the first sign 1102 is captured as a high luminance object in the image IMG.

Hence, a center partial light distribution pattern PTNC of the generated non-illumination pattern PTNb does not include the low illuminance region 1104a, nor does a right partial light distribution pattern PTNR include the low illuminance region 1106a. Meanwhile, a left partial light distribution pattern PTNL includes the low illuminance region 1102a. The target analyzing unit 1010 performs target detection based on the image IMG captured while the light distribution pattern PTN3 is formed. As a result, the reference light distribution pattern PTNa is retained, as illustrated in FIG. 11G.

Figure 11H:
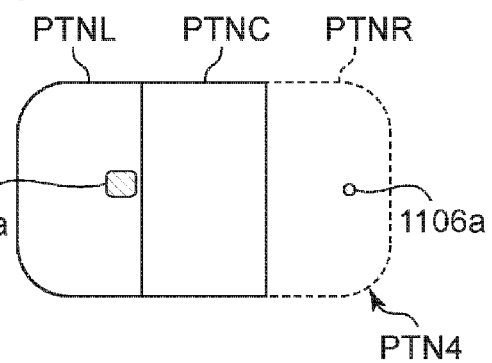

Next, the lamp controlling unit 1012 determines a light distribution pattern PTN4 to be formed next based on the generated non-illumination pattern PTNb and the reference light distribution pattern PTNa, as illustrated in FIG. 11H. Since the left partial light distribution pattern PTNL is to be updated this time, the lamp controlling unit 1012 sets the left partial light distribution pattern PTNL of the non-illumination pattern PTNb into a left partial light distribution pattern PTNL of the light distribution pattern PTN4. The partial light distribution pattern to be updated next is the center partial light distribution pattern PTNC. Hence, the lamp controlling unit 1012 sets the center partial light distribution pattern PTNC of the reference light distribution pattern PTNa into a center partial light distribution pattern PTNC of the light distribution pattern PTN4. A right partial light distribution pattern PTNR of the light distribution pattern PTN4 is retained to the right partial light distribution pattern PTNR of the light distribution pattern PTN3 formed last time. Thus, the light distribution pattern PTN4 to be formed next turns out to be a pattern in which the left partial light distribution pattern PTNL includes the low illuminance region 1102a and the right partial light distribution pattern PTNR includes the low illuminance region 1106a.

Figure 12A:
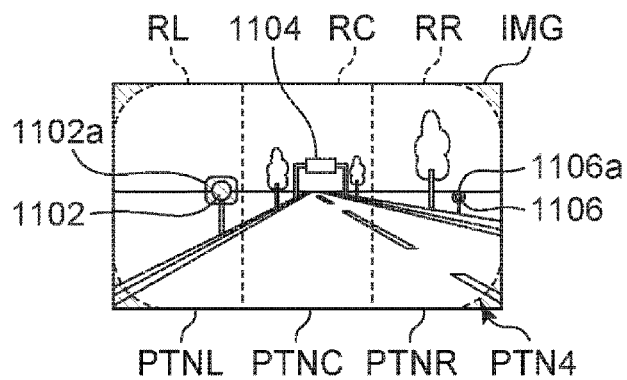
FIG. 12A to FIG. 12D are schematic diagrams for describing light distribution control executed by the light distribution controlling device.

The lamp controlling unit 1012 transfers, to the light distribution variable lamp 1002, data pertaining to, of the determined light distribution pattern PTN4, the left partial light distribution pattern PTNL and the center partial light distribution pattern PTNC, excluding the right partial light distribution pattern PTNR to be retained from the last light distribution pattern PTN3. Thus, the light distribution pattern PTN4 is formed ahead of the host vehicle, as illustrated in FIG. 12A. Then, an image IMG representing the situation ahead of the host vehicle observed while the light distribution pattern PTN4 is formed is generated by the imaging device 1004.

Figure 12B:
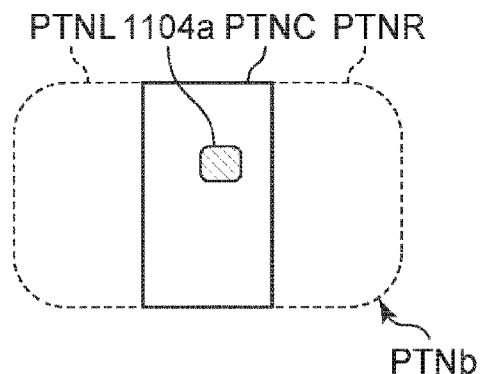

Next, as illustrated in FIG. 12B, the luminance analyzing unit 1008 performs a luminance analysis on the obtained image IMG. Then, the lamp controlling unit 1012 generates a non-illumination pattern PTNb. The left partial light distribution pattern PTNL includes the low illuminance region 1102a, and the right partial light distribution pattern PTNR includes the low illuminance region 1106a. Therefore, neither the first sign 1102 nor the delineator 1106 is captured as a high luminance object in the image IMG. Meanwhile, the center partial light distribution pattern PTNC is derived from the reference light distribution pattern PTNa. Therefore, the second sign 1104 is captured as a high luminance object in the image IMG.

Figure 12C:
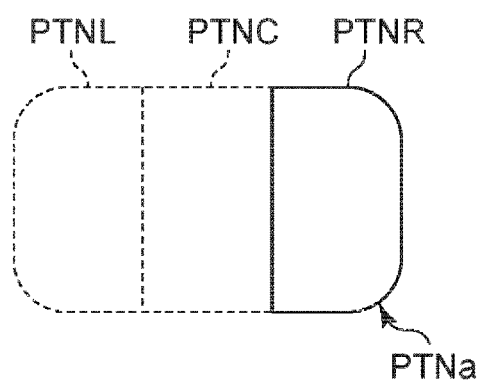

Hence, a left partial light distribution pattern PTNL of the generated non-illumination pattern PTNb does not include the low illuminance region 1102a, nor does a right partial light distribution pattern PTNR include the low illuminance region 1106a. Meanwhile, a center partial light distribution pattern PTNC includes the low illuminance region 1104a. The target analyzing unit 1010 performs target detection based on the image IMG captured while the light distribution pattern PTN4 is formed. As a result, the reference light distribution pattern PTNa is retained, as illustrated in FIG. 12C.

Figure 12D:
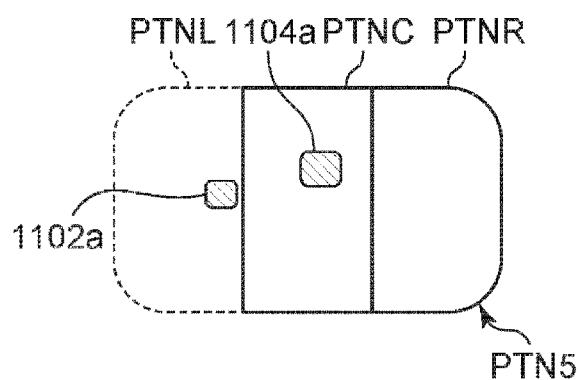

Next, the lamp controlling unit 1012 determines a light distribution pattern PTN5 to be formed next based on the generated non-illumination pattern PTNb and the reference light distribution pattern PTNa, as illustrated in FIG. 12D. The light distribution pattern PTN5 determined at this point is the same as the light distribution pattern PTN2 illustrated in FIG. 10H (the arrangement of the first sign 1102, the second sign 1104, and the delineator 1106 is the same). In other words, since the center partial light distribution pattern PTNC is to be updated this time, the lamp controlling unit 1012 sets the center partial light distribution pattern PTNC of the non-illumination pattern PTNb into a center partial light distribution pattern PTNC of the light distribution pattern PTN5. The partial light distribution pattern to be updated next is the right partial light distribution pattern PTNR. Hence, the lamp controlling unit 1012 sets the right partial light distribution pattern PTNR of the reference light distribution pattern PTNa into a right partial light distribution pattern PTNR of the light distribution pattern PTN5. A left partial light distribution pattern PTNL of the light distribution pattern PTN5 is retained to the left partial light distribution pattern PTNL of the light distribution pattern PTN4 formed last time. Thus, the light distribution pattern PTN5 to be formed next turns out to be the same pattern as the light distribution pattern PTN2.

The lamp controlling unit 1012 transfers, to the light distribution variable lamp 1002, data pertaining to, of the determined light distribution pattern PTN5, the center partial light distribution pattern PTNC and the right partial light distribution pattern PTNR, excluding the left partial light distribution pattern PTNL to be retained from the last light distribution pattern PTN4. Thus, the light distribution pattern PTN5 (the light distribution pattern PTN2) is formed ahead of the host vehicle, as illustrated in FIG. 11A. Thereafter, the control illustrated in FIG. 11A to FIG. 11H and FIG. 12A to FIG. 12D is repeated.

When a predetermined target, such as a self-luminous object, is present ahead of the host vehicle, the lamp controlling unit 1012 sets a specific illuminance value for a specific individual region R1 defined in accordance with the position where that target is present, based on the detection result of the target analyzing unit 1010. Then, the lamp controlling unit 1012 forms a reference light distribution pattern PTNa that includes a specific illuminance region 1108 having the specific illuminance value. Light distribution control to be performed when a predetermined target is present will be described below. In the following description, a front vehicle 1110, for example, serves as a predetermined target.

FIG. 13A to FIG. 13H, FIG. 14A to FIG. 14H, and FIG. 15A to FIG. 15D are schematic diagrams for describing the light distribution control executed by the light distribution controlling device 1006. FIG. 13A, FIG. 13E, FIG. 14A, FIG. 14E, and FIG. 15A are each an image IMG obtained from the imaging device 1004. FIG. 13B, FIG. 13F, FIG. 14B, FIG. 14F, and FIG. 15B are each a non-illumination pattern PTNb generated by the light distribution controlling device 1006. FIG. 13C, FIG. 13G, FIG. 14C, FIG. 14G, and FIG. 15C are each a reference light distribution pattern PTNa. FIG. 13D, FIG. 13H, FIG. 14D, FIG. 14H, and FIG. 15D are each a light distribution pattern PTN determined by the light distribution controlling device 1006.

Figure 13A:
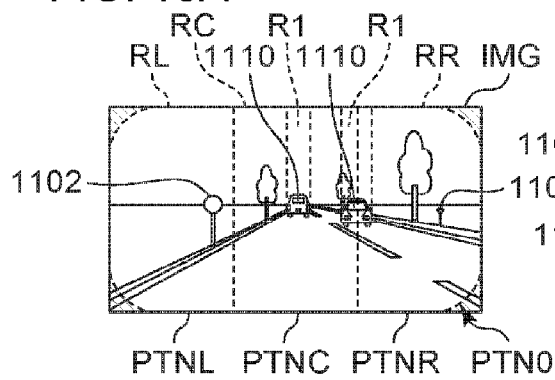
FIG. 13A to FIG. 13H are schematic diagrams for describing light distribution control executed by the light distribution controlling device.

When ADB control is started, first, the lamp controlling unit 1012 controls the light distribution variable lamp 1002 so as to form a light distribution pattern PTN0. In one example, a reference light distribution pattern PTNa is used as the light distribution pattern PTN0. Since no front vehicle 1110 has been detected at this stage, the reference light distribution pattern PTNa includes no specific illuminance region 1108. When the light distribution pattern PTN0 is formed, an image IMG reflecting the situation ahead of the host vehicle observed while the light distribution pattern PTN0 is formed is obtained by the imaging device 1004, as illustrated in FIG. 13A. FIG. 13A illustrates a high beam light distribution pattern as one example of the light distribution pattern PTN0.

Figure 13E:
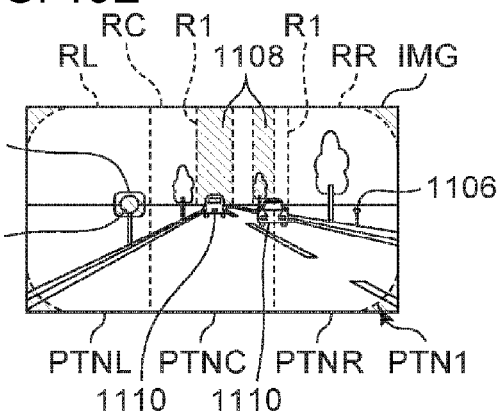
Figure 13B:
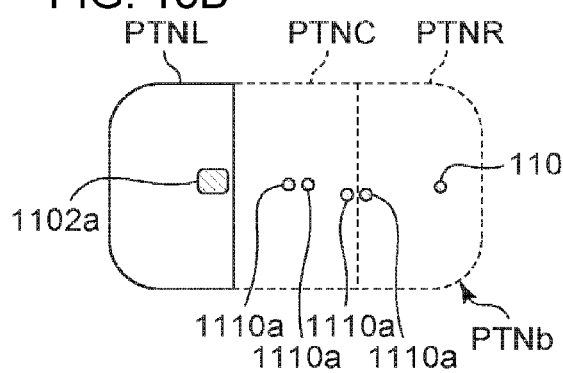

As illustrated in FIG. 13B, the luminance analyzing unit 1008 analyzes the luminance of each individual region R based on the image IMG that the imaging device 1004 has captured while the light distribution pattern PTN0 is formed. The lamp controlling unit 1012 generates a non-illumination pattern PTNb based on the analysis result of the luminance analyzing unit 1008. As described above, the luminance analysis includes a binarization process of the luminance values of the image IMG, and forming a pattern includes a luminance inverting process of a binary image.

In the example illustrated in FIG. 13A, a first sign 1102 is present in a left individual region group RL, and a delineator 1106 is present in a right individual region group RR. Two front vehicles 1110 are present ahead of the host vehicle. The front vehicle 1110 on the left is a preceding vehicle traveling in the same direction as the host vehicle, and the entirety of this front vehicle 1110 is included in a center individual region group RC. The front vehicle 1110 on the right is an oncoming vehicle traveling in the opposite direction from the host vehicle and is present across the center individual region group RC and the right individual region group RR.

The first sign 1102 and the delineator 1106 illuminated with the light distribution pattern PTN0 are each captured as a high luminance object in the image IMG. Lamps of the front vehicles 1110, that is, the headlamps of the preceding vehicle and the tail lamps or the stop lamps of the oncoming vehicle are each a luminous point where the lamp itself emits light and are thus each captured as a high luminance object in the image IMG. Hence, a left partial light distribution pattern PTNL of the non-illumination pattern PTNb includes a low illuminance region 1102a corresponding to the first sign 1102. A center partial light distribution pattern PTNC includes low illuminance regions 1110a corresponding to the luminous points from the front vehicles 1110. A right partial light distribution pattern PTNR includes a low illuminance region 1110a corresponding to the luminous point from one of the front vehicles 1110 and a low illuminance region 1106a corresponding to the delineator 1106. The illuminance of each of the low illuminance regions 1102a, 1106a, and 1110a is, for example, zero.

The target analyzing unit 1010 detects the front vehicles 1110 each as a predetermined target based on the image IMG captured while the light distribution pattern PTN0 is formed. The lamp controlling unit 1012 sets each specific individual region R1 based on the analysis result of the target analyzing unit 1010. For example, the lamp controlling unit 1012 selects a vertical distance b of a predetermined ratio set in advance with respect to a horizontal distance a between two luminous points derived from the lamps of a front vehicle 1110. Then, the lamp controlling unit 1012 sets individual regions R overlapping the range defined by the horizontal dimension a by the vertical dimension b as a specific individual region R1. The lower end of the specific individual region R1 includes individual regions R that overlap the luminous points corresponding to the front vehicle 1110. The specific individual region R1 also includes individual regions R that overlap the driver of the front vehicle 1110.

The lamp controlling unit 1012 sets a specific illuminance value to the portion of the reference light distribution pattern PTNa that overlaps the specific individual region R1. In a case where a predetermined target is a front vehicle 1110, the specific illuminance value of, for example, zero is set to the specific individual region R1. The lamp controlling unit 1012 sets an illuminance value that is not dependent on the luminance of the region ahead of the host vehicle, namely for example an illuminance value suitable for a high beam light distribution pattern, for the portion of the reference light distribution pattern PTNa that overlaps individual regions R excluding the specific individual region R1. Thus, as illustrated in FIG. 13C, the reference light distribution pattern PTNa is updated to a reference light distribution pattern PTNa that includes specific illuminance regions 1108 each having the specific illuminance value and a fixed illuminance region 1014 having an illuminance value that is not dependent on the luminance of the region ahead of the host vehicle.

Figure 13F:
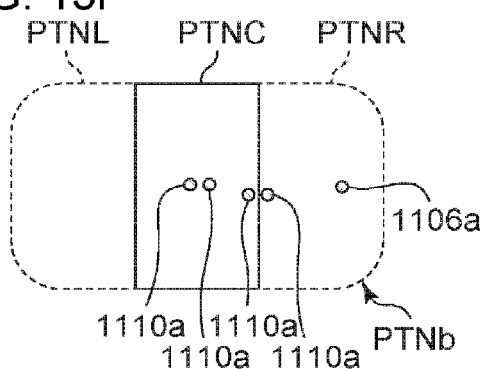
Figure 13C:
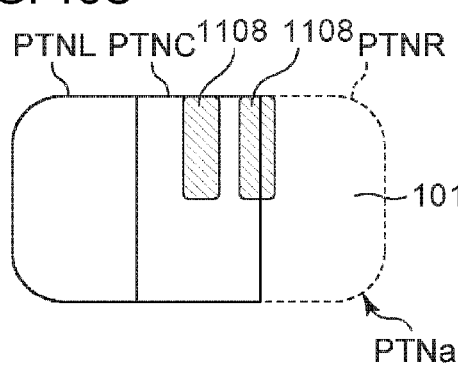
Figure 13G:
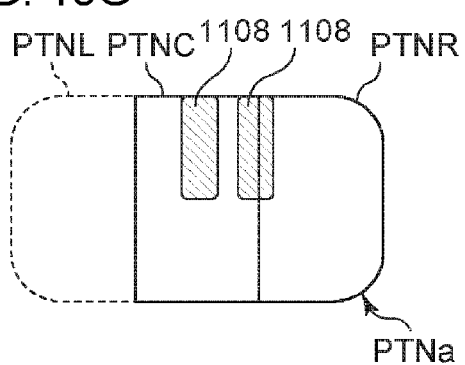
Figure 13D:
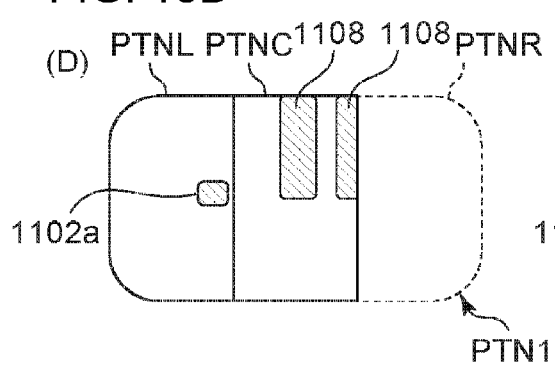

Next, the lamp controlling unit 1012 determines a light distribution pattern PTN1 to be formed next based on the generated non-illumination pattern PTNb and the updated reference light distribution pattern PTNa, as illustrated in FIG. 13D.

In one example, the lamp controlling unit 1012 updates the partial light distribution patterns in order from the left partial light distribution pattern PTNL to the center partial light distribution pattern PTNC to the right partial light distribution pattern PTNR. Hence, the lamp controlling unit 1012 sets, into a left partial light distribution pattern PTNL of the light distribution pattern PTN1, a pattern obtained by combining the left partial light distribution pattern PTNL of the non-illumination pattern PTNb and the left partial light distribution pattern PTNL of the reference light distribution pattern PTNa through, for example, an OR operation. With this combining, when a specific illuminance region 1108 is included in the left partial light distribution pattern PTNL of the reference light distribution pattern PTNa, the specific illuminance region 1108 can be included in the light distribution pattern PTN. In the light distribution control described with reference to FIG. 10A to FIG. 12D as well, a partial light distribution pattern to be updated may be combined with a reference light distribution pattern when the partial light distribution pattern is updated.

The partial light distribution pattern to be updated next is the center partial light distribution pattern PTNC. Hence, the lamp controlling unit 1012 sets the center partial light distribution pattern PTNC of the reference light distribution pattern PTNa into a center partial light distribution pattern PTNC of the light distribution pattern PTN1. A right partial light distribution pattern PTNR of the light distribution pattern PTN1 is retained to the right partial light distribution pattern PTNR of the light distribution pattern PTN0 formed last time. Thus, the light distribution pattern PTN1 to be formed next turns out to be a pattern in which the left partial light distribution pattern PTNL includes the low illuminance region 1102a and the center partial light distribution pattern PTNC includes the specific illuminance regions 1108.

The lamp controlling unit 1012 transfers, to the light distribution variable lamp 1002, data pertaining to, of the determined light distribution pattern PTN1, the left partial light distribution pattern PTNL and the center partial light distribution pattern PTNC, excluding the right partial light distribution pattern PTNR to be retained from the last light distribution pattern PTN0. Thus, the light distribution pattern PTN1 is formed ahead of the host vehicle, as illustrated in FIG. 13E. Then, an image IMG representing the situation ahead of the host vehicle observed while the light distribution pattern PTN1 is formed is generated by the imaging device 1004.

Next, as illustrated in FIG. 13F, the luminance analyzing unit 1008 performs a luminance analysis on the obtained image IMG. Then, the lamp controlling unit 1012 generates a non-illumination pattern PTNb. The left partial light distribution pattern PTNL formed in the left individual region group RL includes the low illuminance region 1102a overlapping the first sign 1102. Therefore, the first sign 1102 is not captured as a high luminance object in the obtained image IMG. Meanwhile, the right partial light distribution pattern PTNR formed in the right individual region group RR is derived from the light distribution pattern PTN0. Therefore, the delineator 1106 is captured as a high luminance object in the image IMG. The luminous points derived from the lamps of the front vehicles 1110 present in the center individual region group RC and the right individual region group RR are each captured as a high luminance object in the image IMG regardless of the shape of the illuminating light distribution pattern.

Hence, a left partial light distribution pattern PTNL of the generated non-illumination pattern PTNb does not include the low illuminance region 1102a. Meanwhile, a right partial light distribution pattern PTNR includes the low illuminance region 1106a. A center partial light distribution pattern PTNC and the right partial light distribution pattern PTNR include the low illuminance regions 1110a.

The target analyzing unit 1010 detects the front vehicles 1110 based on the image IMG captured while the light distribution pattern PTN1 is formed. The lamp controlling unit 1012 sets the specific individual regions R1 based on the analysis result of the target analyzing unit 1010 and updates the reference light distribution pattern PTNa, as illustrated in FIG. 13G. This configuration enables the specific illuminance regions 1108 to follow the movement of the front vehicles 1110.

Figure 13H:
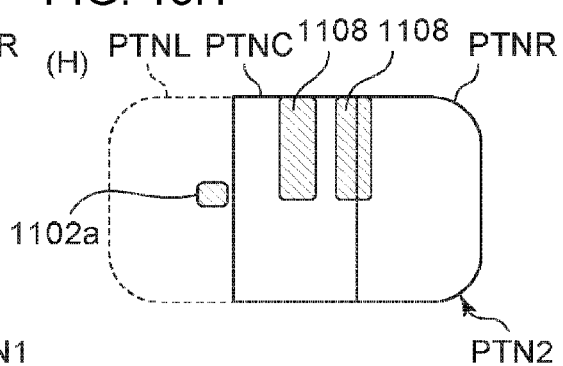

Next, the lamp controlling unit 1012 determines a light distribution pattern PTN2 to be formed next based on the generated non-illumination pattern PTNb and the updated reference light distribution pattern PTNa, as illustrated in FIG. 13H. Since the center partial light distribution pattern PTNC is to be updated this time, the lamp controlling unit 1012 sets, into a center partial light distribution pattern PTNC of the light distribution pattern PTN2, a pattern obtained by combining the center partial light distribution pattern PTNC of the non-illumination pattern PTNb and the center partial light distribution pattern PTNC of the reference light distribution pattern PTNa.

The partial light distribution pattern to be updated next is the right partial light distribution pattern PTNR. Hence, the lamp controlling unit 1012 sets the right partial light distribution pattern PTNR of the reference light distribution pattern PTNa into a right partial light distribution pattern PTNR of the light distribution pattern PTN2. A left partial light distribution pattern PTNL of the light distribution pattern PTN2 is retained to the left partial light distribution pattern PTNL of the light distribution pattern PTN1 formed last time. Thus, the light distribution pattern PTN2 to be formed next turns out to be a pattern in which the left partial light distribution pattern PTNL includes the low illuminance region 1102a and the center partial light distribution pattern PTNC and the right partial light distribution pattern PTNR include the specific illuminance regions 1108.

Figure 14A:
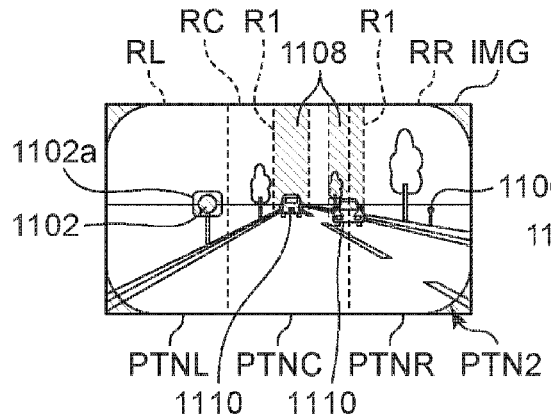
FIG. 14A to FIG. 14H are schematic diagrams for describing light distribution control executed by the light distribution controlling device.

The lamp controlling unit 1012 transfers, to the light distribution variable lamp 1002, data pertaining to, of the determined light distribution pattern PTN2, the center partial light distribution pattern PTNC and the right partial light distribution pattern PTNR, excluding the left partial light distribution pattern PTNL to be retained from the last light distribution pattern PTN1. Thus, the light distribution pattern PTN2 is formed ahead of the host vehicle, as illustrated in FIG. 14A. Then, an image IMG representing the situation ahead of the host vehicle observed while the light distribution pattern PTN2 is formed is generated by the imaging device 1004.

Figure 14E:
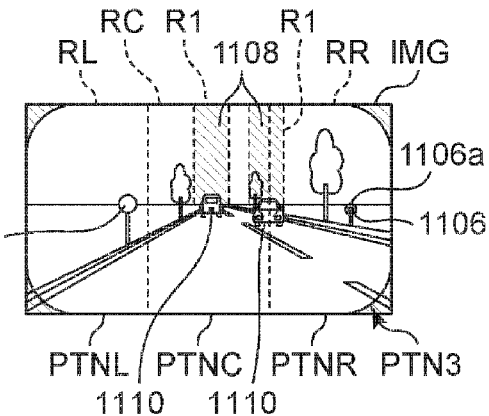
Figure 14B:
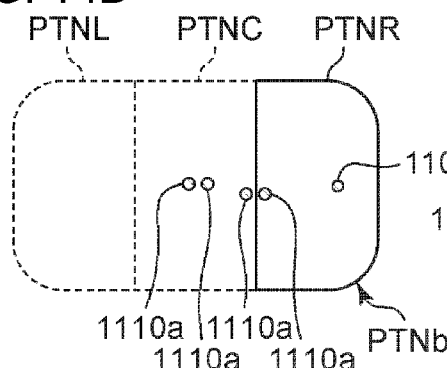

Next, as illustrated in FIG. 14B, the luminance analyzing unit 1008 performs a luminance analysis on the obtained image IMG. Then, the lamp controlling unit 1012 generates a non-illumination pattern PTNb. The left partial light distribution pattern PTNL includes the low illuminance region 1102a. Therefore, the first sign 1102 is not captured as a high luminance object in the image IMG. Meanwhile, the right partial light distribution pattern PTNR is derived from the reference light distribution pattern PTNa. Therefore, the delineator 1106 is captured as a high luminance object in the image IMG. The luminous points derived from the lamps of the front vehicles 1110 present in the center individual region group RC and the right individual region group RR are each captured as a high luminance object in the image IMG.

Hence, a left partial light distribution pattern PTNL of the generated non-illumination pattern PTNb does not include the low illuminance region 1102a. Meanwhile, a right partial light distribution pattern PTNR includes the low illuminance region 1106a. A center partial light distribution pattern PTNC and the right partial light distribution pattern PTNR include the low illuminance regions 1110a.

The target analyzing unit 1010 detects the front vehicles 1110 based on the image IMG captured while the light distribution pattern PTN2 is formed. The lamp controlling unit 1012 sets specific individual regions R1 based on the analysis result of the target analyzing unit 1010 and updates the reference light distribution pattern PTNa, as illustrated in FIG. 14C.

Figure 14F:
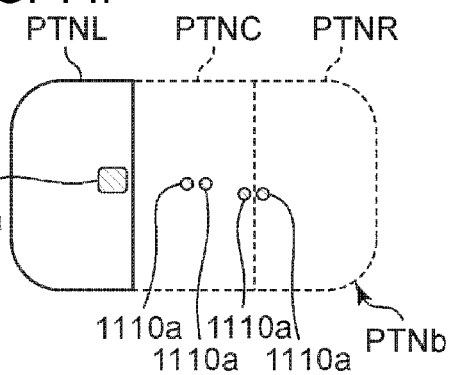
Figure 14C:
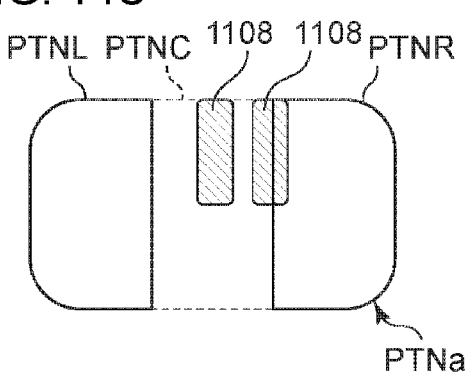
Figure 14G:
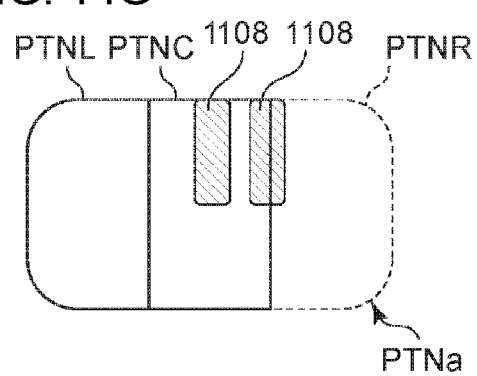
Figure 14D:
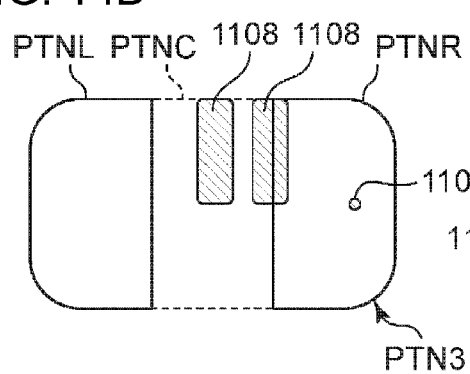

Next, the lamp controlling unit 1012 determines a light distribution pattern PTN3 to be formed next based on the generated non-illumination pattern PTNb and the updated reference light distribution pattern PTNa, as illustrated in FIG. 14D. Since the right partial light distribution pattern PTNR is to be updated this time, the lamp controlling unit 1012 sets, into a right partial light distribution pattern PTNR of the light distribution pattern PTN3, a pattern obtained by combining the right partial light distribution pattern PTNR of the non-illumination pattern PTNb and the right partial light distribution pattern PTNR of the reference light distribution pattern PTNa.

The partial light distribution pattern to be updated next is the left partial light distribution pattern PTNL. Hence, the lamp controlling unit 1012 sets the left partial light distribution pattern PTNL of the reference light distribution pattern PTNa into a left partial light distribution pattern PTNL of the light distribution pattern PTN3. A center partial light distribution pattern PTNC of the light distribution pattern PTN3 is retained to the center partial light distribution pattern PTNC of the light distribution pattern PTN2 formed last time. Thus, the light distribution pattern PTN3 to be formed next turns out to be a pattern in which the center partial light distribution pattern PTNC includes the specific illuminance regions 1108 and the right partial light distribution pattern PTNR includes the low illuminance region 1106a and the specific illuminance region 1108.

The lamp controlling unit 1012 transfers, to the light distribution variable lamp 1002, data pertaining to, of the determined light distribution pattern PTN3, the left partial light distribution pattern PTNL and the right partial light distribution pattern PTNR, excluding the center partial light distribution pattern PTNC to be retained from the last light distribution pattern PTN2. Thus, the light distribution pattern PTN3 is formed ahead of the host vehicle, as illustrated in FIG. 14E. Then, an image IMG representing the situation ahead of the host vehicle observed while the light distribution pattern PTN3 is formed is generated by the imaging device 1004.

Next, as illustrated in FIG. 14F, the luminance analyzing unit 1008 performs a luminance analysis on the obtained image IMG. Then, the lamp controlling unit 1012 generates a non-illumination pattern PTNb. The right partial light distribution pattern PTNR includes the low illuminance region 1106a. Therefore, the delineator 1106 is not captured as a high luminance object in the image IMG. Meanwhile, the left partial light distribution pattern PTNL is derived from the reference light distribution pattern PTNa. Therefore, the first sign 1102 is captured as a high luminance object in the image IMG. The luminous points derived from the lamps of the front vehicles 1110 present in the center individual region group RC and the right individual region group RR are each captured as a high luminance object in the image IMG.

Hence, a right partial light distribution pattern PTNR of the generated non-illumination pattern PTNb does not include the low illuminance region 1106a. Meanwhile, a left partial light distribution pattern PTNL includes the low illuminance region 1102a. A center partial light distribution pattern PTNC and the right partial light distribution pattern PTNR include the low illuminance regions 1110a.

The target analyzing unit 1010 detects the front vehicles 1110 based on the image IMG captured while the light distribution pattern PTN3 is formed. The lamp controlling unit 1012 sets specific individual regions R1 based on the analysis result of the target analyzing unit 1010 and updates the reference light distribution pattern PTNa, as illustrated in FIG. 14G. This configuration enables the specific illuminance regions 1108 to follow the movement of the front vehicles 1110.

Figure 14H:
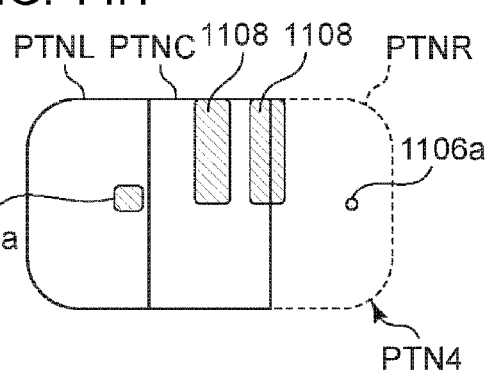

Next, the lamp controlling unit 1012 determines a light distribution pattern PTN4 to be formed next based on the generated non-illumination pattern PTNb and the updated reference light distribution pattern PTNa, as illustrated in FIG. 14H. Since the left partial light distribution pattern PTNL is to be updated this time, the lamp controlling unit 1012 sets, into a left partial light distribution pattern PTNL of the light distribution pattern PTN4, a pattern obtained by combining the left partial light distribution pattern PTNL of the non-illumination pattern PTNb and the left partial light distribution pattern PTNL of the reference light distribution pattern PTNa.

The partial light distribution pattern to be updated next is the center partial light distribution pattern PTNC. Hence, the lamp controlling unit 1012 sets the center partial light distribution pattern PTNC of the reference light distribution pattern PTNa into a center partial light distribution pattern PTNC of the light distribution pattern PTN4. A right partial light distribution pattern PTNR of the light distribution pattern PTN4 is retained to the right partial light distribution pattern PTNR of the light distribution pattern PTN3 formed last time. Thus, the light distribution pattern PTN4 to be formed next turns out to be a pattern in which the left partial light distribution pattern PTNL includes the low illuminance region 1102a, the center partial light distribution pattern PTNC includes the specific illuminance regions 1108, and the right partial light distribution pattern PTNR includes the low illuminance region 1106a and the specific illuminance region 1108.

Figure 15A:
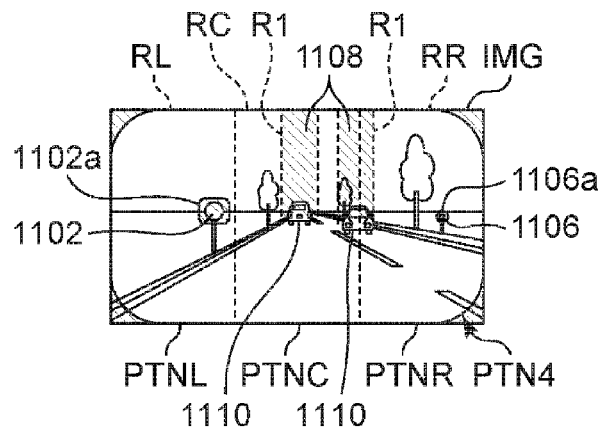
FIG. 15A to FIG. 15D are schematic diagrams for describing light distribution control executed by the light distribution controlling device.

The lamp controlling unit 1012 transfers, to the light distribution variable lamp 1002, data pertaining to, of the determined light distribution pattern PTN4, the left partial light distribution pattern PTNL and the center partial light distribution pattern PTNC, excluding the right partial light distribution pattern PTNR to be retained from the last light distribution pattern PTN3. Thus, the light distribution pattern PTN4 is formed ahead of the host vehicle, as illustrated in FIG. 15A. Then, an image IMG representing the situation ahead of the host vehicle observed while the light distribution pattern PTN4 is formed is generated by the imaging device 1004.

Figure 15B:
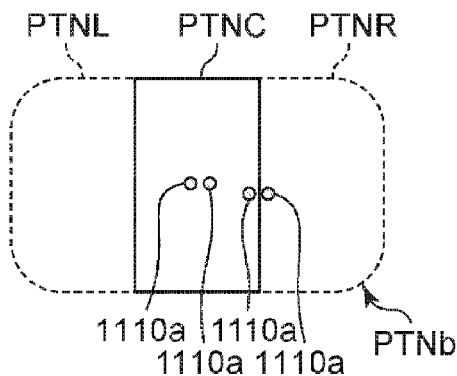

Next, as illustrated in FIG. 15B, the luminance analyzing unit 1008 performs a luminance analysis on the obtained image IMG. Then, the lamp controlling unit 1012 generates a non-illumination pattern PTNb. The left partial light distribution pattern PTNL includes the low illuminance region 1102a, and the right partial light distribution pattern PTNR includes the low illuminance region 1106a. Therefore, neither the first sign 1102 nor the delineator 1106 is captured as a high luminance object in the image IMG. The luminous points derived from the lamps of the front vehicles 1110 present in the center individual region group RC and the right individual region group RR are each captured as a high luminance object in the image IMG.

Hence, a left partial light distribution pattern PTNL of the generated non-illumination pattern PTNb does not include the low illuminance region 1102a, nor does a right partial light distribution pattern PTNR include the low illuminance region 1106a. Meanwhile, a center partial light distribution pattern PTNC and the right partial light distribution pattern PTNR include the low illuminance regions 1110a.

Figure 15C:
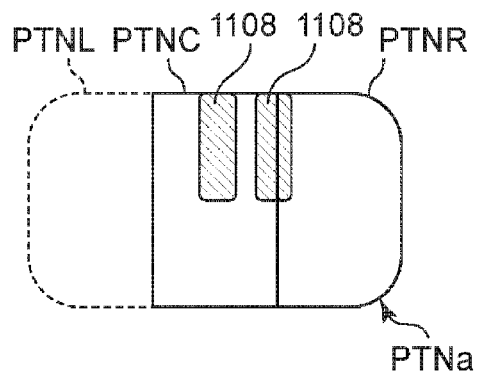

The target analyzing unit 1010 detects the front vehicles 1110 based on the image IMG captured while the light distribution pattern PTN4 is formed. The lamp controlling unit 1012 sets specific individual regions R1 based on the analysis result of the target analyzing unit 1010 and updates the reference light distribution pattern PTNa, as illustrated in FIG. 15C.

Figure 15D:
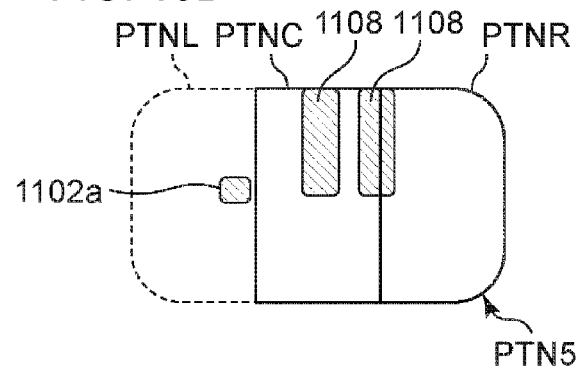

Next, the lamp controlling unit 1012 determines a light distribution pattern PTN5 to be formed next based on the generated non-illumination pattern PTNb and the updated reference light distribution pattern PTNa, as illustrated in FIG. 15D. The light distribution pattern PTN5 determined at this point is the same as the light distribution pattern PTN2 illustrated in FIG. 13H (the arrangement of the first sign 1102, the delineator 1106, and the front vehicles 1110 is the same). In other words, since the center partial light distribution pattern PTNC is to be updated this time, the lamp controlling unit 1012 sets, into a center partial light distribution pattern PTNC of the light distribution pattern PTN5, a pattern obtained by combining the center partial light distribution pattern PTNC of the non-illumination pattern PTNb and the center partial light distribution pattern PTNC of the reference light distribution pattern PTNa.

The partial light distribution pattern to be updated next is the right partial light distribution pattern PTNR. Hence, the lamp controlling unit 1012 sets the right partial light distribution pattern PTNR of the reference light distribution pattern PTNa into a right partial light distribution pattern PTNR of the light distribution pattern PTN5. A left partial light distribution pattern PTNL of the light distribution pattern PTN5 is retained to the left partial light distribution pattern PTNL of the light distribution pattern PTN4 formed last time. Thus, the light distribution pattern PTN5 to be formed next turns out to be the same pattern as the light distribution pattern PTN2.

The lamp controlling unit 1012 transfers, to the light distribution variable lamp 1002, data pertaining to, of the determined light distribution pattern PTN5, the center partial light distribution pattern PTNC and the right partial light distribution pattern PTNR, excluding the left partial light distribution pattern PTNL to be retained from the last light distribution pattern PTN4. Thus, the light distribution pattern PTN5 (the light distribution pattern PTN2) is formed ahead of the host vehicle, as illustrated in FIG. 14A. Thereafter, the control illustrated in FIG. 14A to FIG. 14H and FIG. 15A to FIG. 15D is repeated.

In the foregoing description, any two selected from the left individual region group RL, the center individual region group RC, and the right individual region group RR correspond to a first individual region group and a second individual region group. Any two selected from the left partial light distribution pattern PTNL, the center partial light distribution pattern PTNC, and the right partial light distribution pattern PTNR correspond to a first partial light distribution pattern and a second partial light distribution pattern. It is not a limitation that the plurality of individual regions R is divided into three, and the plurality of individual regions R may be divided into two or into four or more.

In the light distribution control described above, a reflective object, such as the first sign 1102, undergoes cycles of being illuminated and not being illuminated at predetermined timings. In this manner, as each reflective object is illuminated by light intermittently, the intensity of reflected light can be reduced as compared to a case where each reflective object is illuminated continuously. A specific illuminance region 1108 is formed continuously for a front vehicle 1110. This configuration can suppress glare caused to the driver of the front vehicle 1110.

For dimming light on reflective objects, specifically, light distribution patterns are updated sequentially for three individual region groups. Therefore, each individual region group is illuminated with a reference light distribution pattern PTNa at the rate of one out of three times in the updating cycle. As such, a reflective object, such as the first sign 1102, is kept from the light at the rate of two out of three times. This configuration can yield the dimming rate of approximately 66%. This dimming rate can be adjusted by including a step of waiting for the next update in the updating cycle.

For example, in the first step of the updating cycle, a left partial light distribution pattern PTNL is updated and also the center individual region group RC is illuminated with a reference light distribution pattern PTNa for updating a center partial light distribution pattern PTNC in the second step. In the second step, the center partial light distribution pattern PTNC is updated, and also the right individual region group RR is illuminated with the reference light distribution pattern PTNa for updating a right partial light distribution pattern PTNR in the third step.

In the third step, the right partial light distribution pattern PTNR is updated. However, illuminating the left individual region group RL with the reference light distribution pattern PTNa for updating in the fourth step is not performed, and the left individual region group RL is illuminated with the left partial light distribution pattern PTNL the same as that in the second step. Then, in the fifth step, the left individual region group RL is illuminated with the reference light distribution pattern PTNa, and the center individual region group RC and the right individual region group RR are illuminated with, respectively, the center partial light distribution pattern PTNC and the right partial light distribution pattern PTNR the same as those in the fourth step. Thus, the light on each reflective object is dimmed at the rate of three out of four times, and thus the dimming rate can be raised to 75%.

Figure 16:
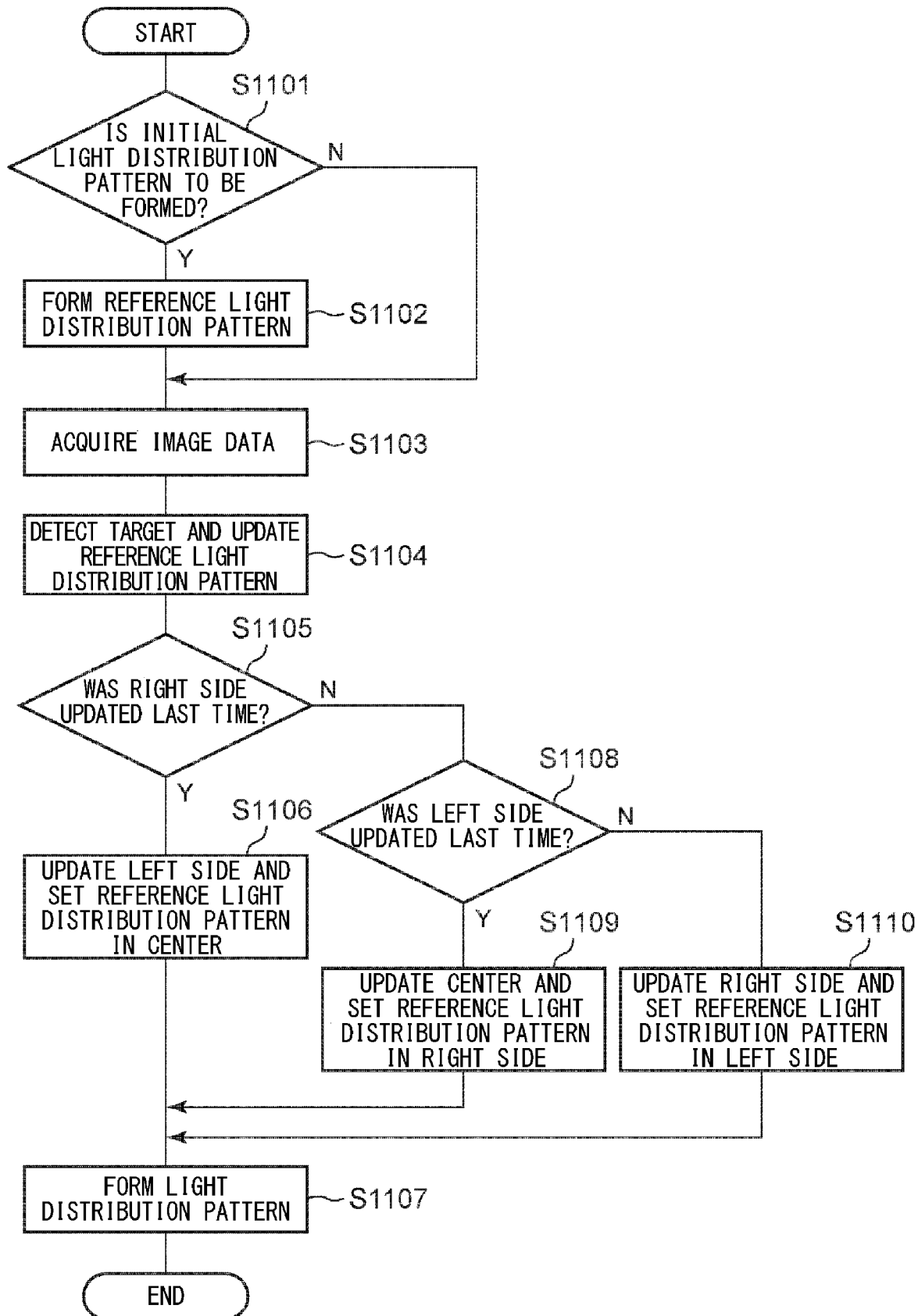
FIG. 16 is a flowchart illustrating an example of light distribution control executed by the light distribution controlling device.

FIG. 16 is a flowchart illustrating an example of light distribution control executed by the light distribution controlling device 1006. This flow is executed repeatedly at predetermined timings, for example, when the light distribution controlling device 1006 is instructed to execute the light distribution control via a light switch (not illustrated) and when the ignition is on.

The light distribution controlling device 1006 determines whether it is the timing for forming an initial light distribution pattern PTN (S1101). Whether it is the timing for forming an initial light distribution pattern PTN can be determined based on the presence or absence of, for example, an update flag described later. If it is the timing for forming an initial light distribution pattern PTN (Y at S1101), the light distribution controlling device 1006 controls the light distribution variable lamp 1002 so as to form a reference light distribution pattern PTNa (S1102). Then, the light distribution controlling device 1006 acquires image data from the imaging device 1004 (S1103). If it is not the timing for forming an initial light distribution pattern PTN (N at S1101), since this means that a light distribution pattern PTN has already been formed, the light distribution controlling device 1006 proceeds to step S1103.

The light distribution controlling device 1006 detects a target based on the image data and updates the reference light distribution pattern PTNa based on the detection result (S1104). Then, the light distribution controlling device 1006 determines whether the light distribution pattern updated in the last routine was the right partial light distribution pattern PTNR (S1105). Whether the updated light distribution pattern was the right partial light distribution pattern PTNR can be determined based on the presence or absence of, for example, an update flag for the right partial distribution pattern PTNR. If it was the right partial light distribution pattern PTNR that was updated last time (Y at S1105), the light distribution controlling device 1006 updates the left partial light distribution pattern PTNL and sets the center partial light distribution pattern PTNC to the reference light distribution pattern PTNa (S1106). The light distribution controlling device 1006 forms the light distribution pattern PTN determined at step S1106 (S1107), generates an update flag for the left partial light distribution pattern PTNL, stores the generated update flag into a memory, deletes the existing update flag, and terminates this routine. Update flags are deleted as the light distribution control stops.

If it was not the right partial light distribution pattern PTNR that was updated last time (N at S1105), the light distribution controlling device 1006 determines whether the light distribution pattern updated in the last routine was the left partial light distribution pattern PTNL (S1108). Whether the updated light distribution pattern was the left partial light distribution pattern PTNL can be determined based on the presence or absence of, for example, an update flag for the left partial light distribution pattern PTNL. If it was the left partial light distribution pattern PTNL that was updated last time (Y at S1108), the light distribution controlling device 1006 updates the center partial light distribution pattern PTNC and sets the right partial light distribution pattern PTNR to the reference light distribution pattern PTNa (S1109). The light distribution controlling device 1006 forms the light distribution pattern PTN determined at step S1109 (S1107), generates an update flag for the center partial light distribution pattern PTNC, stores the generated update flag into a memory, deletes the existing update flag, and terminates this routine.

If it was not the left partial light distribution pattern PTNL that was updated last time (N at S1108), this case indicates that the light distribution pattern to be updated is the right partial light distribution pattern PTNR. Therefore, the light distribution controlling device 1006 updates the right partial light distribution pattern PTNR and sets the left partial light distribution pattern PTNL to the reference light distribution pattern PTNa (S1110). The light distribution controlling device 1006 forms the light distribution pattern PTN determined at step S1110 (S1107), generates an update flag for the right partial light distribution pattern PTNR, stores the generated update flag into a memory, deletes the existing update flag, and terminates this routine.

As described above, the light distribution controlling device 1006 according to the present embodiment includes the luminance analyzing unit 1008 and the lamp controlling unit 1012. The luminance analyzing unit 1008 analyzes the luminance of each of a plurality of individual regions R arrayed ahead of the host vehicle based on information obtained from the imaging device 1004. The lamp controlling unit 1012 determines a light distribution pattern PTN to be formed in the region ahead of the host vehicle by setting the illuminance of light for illuminating each individual region R based on the analysis result of the luminance analyzing unit 1008 and controls the light distribution variable lamp 1002 so as to form the determined light distribution pattern PTN. The lamp controlling unit 1012 forms a reference light distribution pattern PTNa periodically at non-overlapping timings in a first individual region group and a second individual region group each included in the plurality of individual regions R, and the reference light distribution pattern PTNa includes at least in part a fixed illuminance region 1014 that is not dependent on the luminance of the region ahead of the vehicle. The lamp controlling unit 1012 updates a partial light distribution pattern to be formed in an individual region group where the reference light distribution pattern PTNa is formed based on the luminance held while the reference light distribution pattern PTNa is formed, and retains a partial light distribution pattern to be formed in an individual region group where the reference light distribution pattern PTNa is not formed.

The vehicle lamp system 1001 according to the present embodiment includes the light distribution variable lamp 1002, the imaging device 1004, and the light distribution controlling device 1006 according to the present embodiment. The light distribution variable lamp 1002 is capable of illuminating a region ahead of the host vehicle with a visible light beam L1 of a variable intensity distribution.

In this manner, according to the present embodiment, only a part of a light distribution pattern PTN is switched when the light distribution pattern PTN is switched. In other words, the light distribution pattern PTN is updated part by part. This configuration can reduce the amount of data that is sent from the lamp controlling unit 1012 to the light distribution variable lamp 1002 when the light distribution pattern PTN is switched, as compared to the case where the entirety of the light distribution pattern PTN is switched. Accordingly, the speed of switching the light distribution pattern PTN can be increased while keeping the cost from increasing. As a result, the light distribution pattern can be switched rapidly in ADB control.

The light distribution controlling device 1006 forms a reference light distribution pattern PTNa periodically in each individual region group and determines a light distribution pattern PTN based on image data obtained while the reference light distribution pattern PTNa is formed. Thus, even if the angle of view of the imaging device 1004 and the angle of emission from the light distribution variable lamp 1002 fail to match each other, the disparity between the light distribution pattern PTN to be formed and the light distribution pattern PTN actually formed can be kept from increasing. Accordingly, a decrease in the accuracy of forming a light distribution pattern PTN can be suppressed. Moreover, the decrease in the accuracy of forming a light distribution pattern PTN can be suppressed without positioning the imaging device 1004 and the light distribution variable lamp 1002 physically with high accuracy or without making a correction through an arithmetic operation process of the image data. Therefore, according to the present embodiment, the accuracy of forming a light distribution pattern PTN can be maintained while keeping the configuration of the vehicle lamp system 1001 from becoming complex.

The lamp controlling unit 1012 sets the illuminance of light for illuminating an individual region R having a luminance higher than a predetermined threshold lower than the illuminance of light for illuminating an individual region R having a luminance lower than the threshold. This configuration can keep the driver from experiencing glare caused by light from a reflective object located ahead of the host vehicle.

The light distribution controlling device 1006 includes the target analyzing unit 1010 that detects a predetermined target present ahead of the host vehicle based on information obtained from the imaging device 1004. The lamp controlling unit 1012 sets a specific illuminance value for a specific individual region R1 defined by the position where a target is present and forms a reference light distribution pattern PTNa that includes a specific illuminance region 1108 having the specific illuminance value. Thus, a target can be illuminated with light of a specific illuminance value even while the reference light distribution pattern PTNa is formed. Accordingly, in a case where the target is, for example, a front vehicle 1110, forming the reference light distribution pattern PTNa can reduce glare caused to the driver of the front vehicle 1110.

Thus far, Embodiment 2 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also effective as an aspect of the present invention. Hatching added along a section in the drawings does not limit the material of the component with hatching.

The following aspect can also be included in the present invention.

A light distribution controlling method of controlling a light distribution variable lamp (1002) capable of illuminating a region ahead of a vehicle with a visible light beam (L1) of a variable intensity distribution based on information obtained from an imaging device (1004) that captures an image of the region ahead of the vehicle, the light distribution controlling method comprising:

forming a reference light distribution pattern (PTNa) that is not dependent on a luminance of the region ahead of the vehicle periodically at non-overlapping timings in a first individual region group and a second individual region group each included in a plurality of individual regions (R) arrayed ahead of a host vehicle; and updating a partial light distribution pattern to be formed in an individual region group where the reference light distribution pattern (PTNa) is formed based on the luminance held while the reference light distribution pattern (PTNa) is formed and retaining a partial light distribution pattern to be formed in an individual region group where the reference light distribution pattern (PTNa) is not formed.

Embodiment 3

Figure 17:
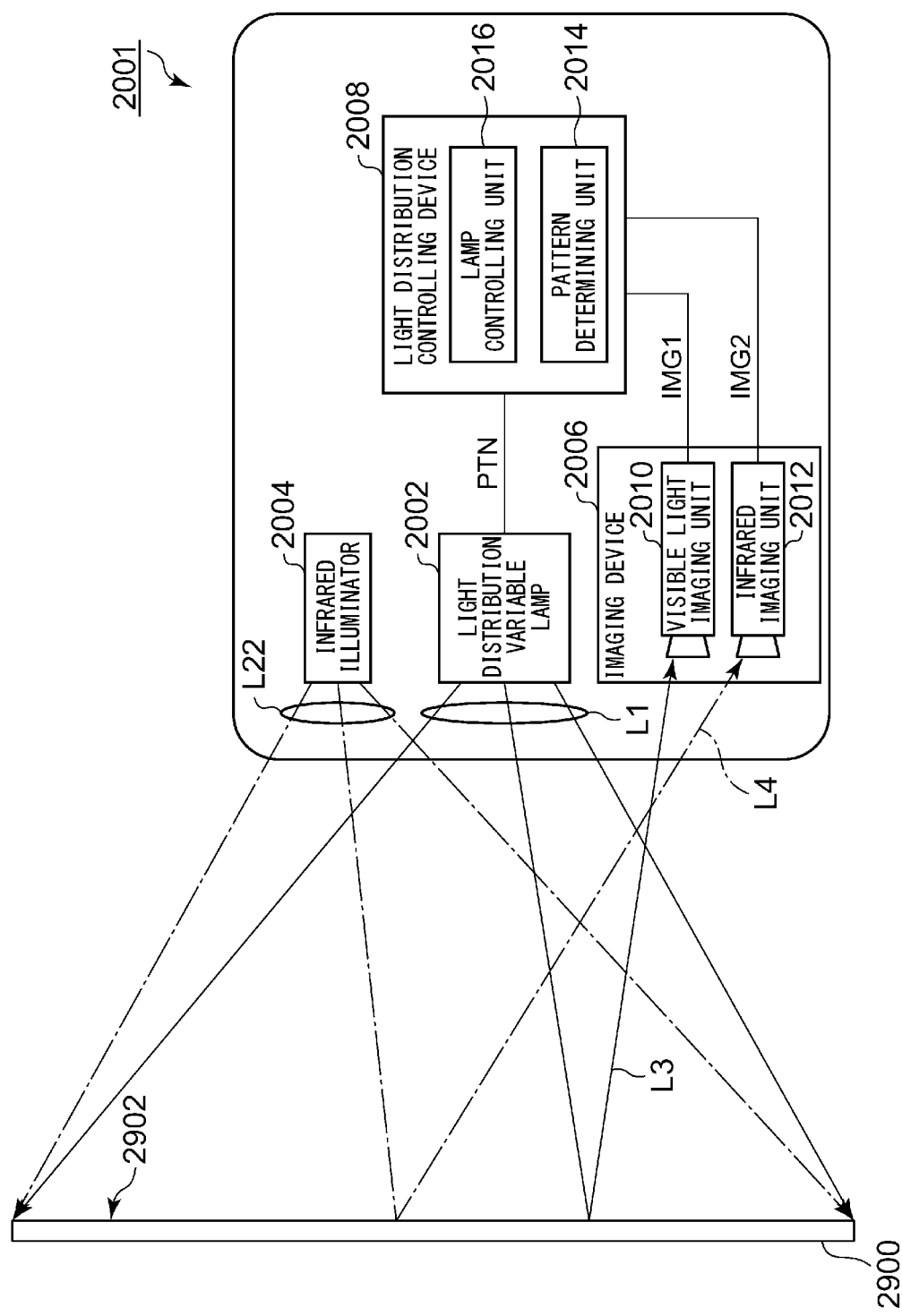
FIG. 17 is a block diagram of a vehicle lamp system according to Embodiment 3.

FIG. 17 is a block diagram of a vehicle lamp system according to Embodiment 3. FIG. 17 depicts some of the constituent elements of a vehicle lamp system 2001 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 2001 includes a light distribution variable lamp 2002, an infrared illuminator 2004, an imaging device 2006, and a light distribution controlling device 2008. These components may all be embedded within a single housing, or some of these components may be provided outside a housing, that is, provided in the vehicle.

The light distribution variable lamp 2002 is a light source unit that can illuminate a region ahead of the vehicle with a visible light beam L1 of a variable intensity distribution. The light distribution variable lamp 2002 can control the luminous intensity of light for illuminating each of a plurality of individual regions arrayed ahead of the host vehicle independently of each other. The light distribution variable lamp 2002 receives data pertaining to a light distribution pattern PTN from the light distribution controlling device 2008 and emits a visible light beam L1 having an intensity distribution corresponding to the light distribution pattern PTN. Thus, the light distribution pattern PTN is formed ahead of the vehicle. A light distribution pattern PTN can be regarded as a two-dimensional illuminance distribution of an illumination pattern 2902 that the light distribution variable lamp 2002 forms on an imaginary vertical screen 2900 located ahead of the host vehicle.

There is no particular limitation on the configuration of the light distribution variable lamp 2002, and the light distribution variable lamp 2002 includes, for example, a plurality of light sources arrayed in a matrix and a lighting circuit that drives the light sources to turn them on independently of each other. Some preferred examples of such a light source include a semiconductor light source, such as an LED, an LD, or an organic or inorganic EL device. The individual regions are mapped to the respective light sources, and each individual region is illuminated individually with the light from the corresponding light source.

In order to form an illuminance distribution corresponding to a given light distribution pattern PTN, the light distribution variable lamp 2002 may include, for example, a pattern forming device of a matrix type, such as a DMD or a liquid crystal device, or a pattern forming device of a scan optics type that scans a region ahead of the host vehicle with light from a light source. The resolving power (the resolution) of the light distribution variable lamp 2002 is, for example, from 1,000 pixels to 1,300,000 pixels.

The infrared illuminator 2004 is a light source unit capable of illuminating the region ahead of the vehicle with infrared radiation L22. The infrared radiation L22 may be near-infrared radiation or longer wavelength radiation. The infrared illuminator 2004 emits infrared radiation L22 having an intensity distribution corresponding to a predetermined infrared radiation pattern. The infrared illuminator 2004 according to the present embodiment forms an infrared radiation pattern of a generally uniform illuminance that illuminates the entire imaging range of an infrared imaging unit 2012 described later. The shape of the infrared radiation pattern may be fixed. The infrared illuminator 2004 emits infrared radiation L22 continuously. There is no particular limitation on the configuration of the infrared illuminator 2004, and the infrared illuminator 2004 may include, for example, a semiconductor light source, such as an LED or an LD, and a lighting circuit that drives the semiconductor light source to turn it on.

The imaging device 2006 includes a visible light imaging unit 2010 and the infrared imaging unit 2012. The visible light imaging unit 2010 has a sensitivity to a visible light range and captures an image of a region ahead of the vehicle. The visible light imaging unit 2010 captures an image of reflected light L3 of a visible light beam L1 reflected by an object located ahead of the vehicle. The visible light imaging unit 2010 is not sensitive to infrared radiation. A visible light image IMG1 acquired by the visible light imaging unit 2010 is sent to the light distribution controlling device 2008.

The infrared imaging unit 2012 has a sensitivity to an infrared range and captures an image of a region ahead of the vehicle. The infrared imaging unit 2012 captures an image of reflected radiation L4 of infrared radiation L22 reflected by an object located ahead of the vehicle. It suffices that the infrared imaging unit 2012 have a sensitivity to at least the wavelength range of the infrared radiation L22. An infrared image IMG2 acquired by the infrared imaging unit 2012 is sent to the light distribution controlling device 2008.

According to the present embodiment, the visible light imaging unit 2010 is formed by a visible light camera, and the infrared imaging unit 2012 is formed by an infrared camera separate from the visible light camera. This configuration, however, is not a limiting example. For example, within an image sensor of a single camera, the visible light imaging unit 2010 may be formed by some of the imaging elements provided with visible light transmissive filters, and the infrared imaging unit 2012 may be formed of the remaining imaging elements provided with infrared radiation transmissive filters.

The light distribution controlling device 2008 executes ADB control of controlling the light distribution variable lamp 2002 and dynamically and adaptively controlling a light distribution pattern PTN based on a visible light image IMG1 and an infrared image IMG2 obtained from the imaging device 2006. The light distribution controlling device 2008 can be formed by a digital processor. The light distribution controlling device 2008 may be formed, for example but not limited to, by a combination of a microcomputer including a CPU and a software program or by an FPGA or an ASIC.

The light distribution controlling device 2008 includes a pattern determining unit 2014 and a lamp controlling unit 2016. The pattern determining unit 2014 determines a light distribution pattern PTN based on a visible light image IMG1 obtained from the visible light imaging unit 2010 and an infrared image IMG2 obtained from the infrared imaging unit 2012. The lamp controlling unit 2016 controls the light distribution variable lamp 2002 so as to form the light distribution pattern PTN in a region ahead of the vehicle. For example, in a case where the light distribution variable lamp 2002 includes a DMD, the lamp controlling unit 2016 controls the on and off of the light source and the on/off switching of each mirror element forming the DMD. Thus, the light distribution pattern PTN is formed ahead of the host vehicle. These units each operate as an integrated circuit constituting the unit executes a program stored in a memory. In the following, an operation of each unit of the light distribution controlling device 2008 will be described.

Figure 18A:
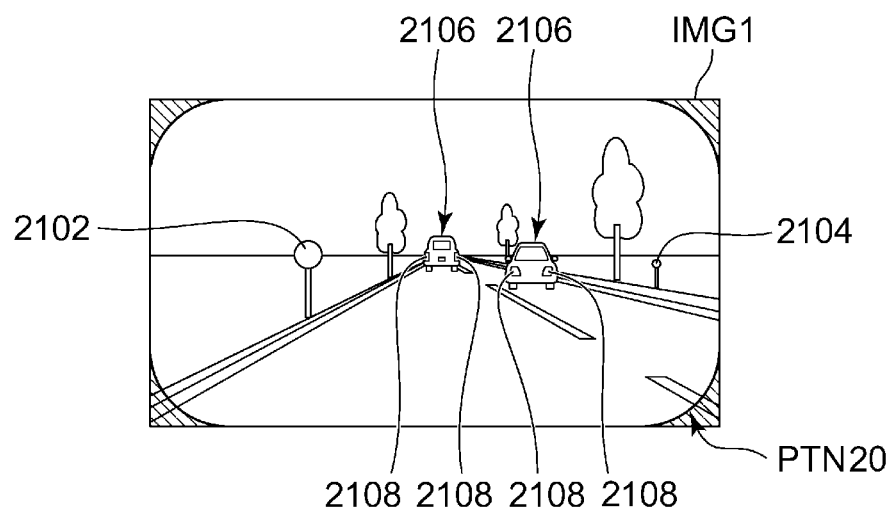
FIG. 18A and FIG. 18B are schematic diagrams for describing an operation of a light distribution controlling device.
Figure 18B:
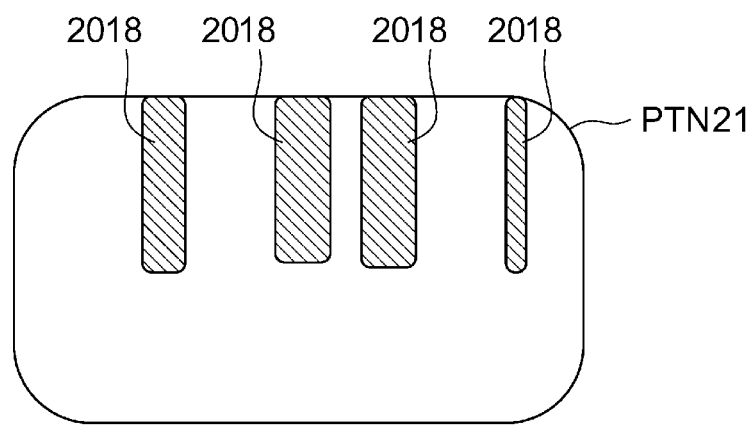
Figure 19A:
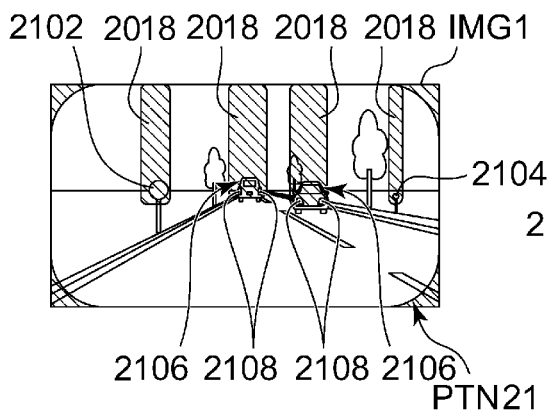
FIG. 19A to FIG. 19E are schematic diagrams for describing an operation of the light distribution controlling device.
Figure 19C:
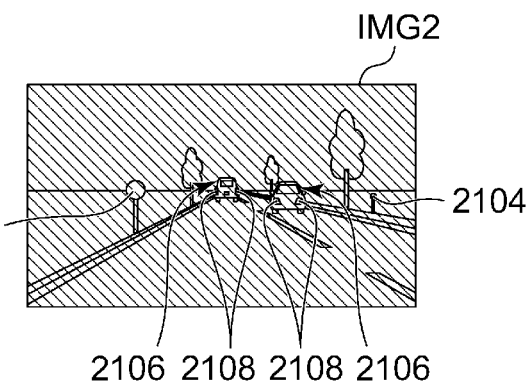
Figure 19B:
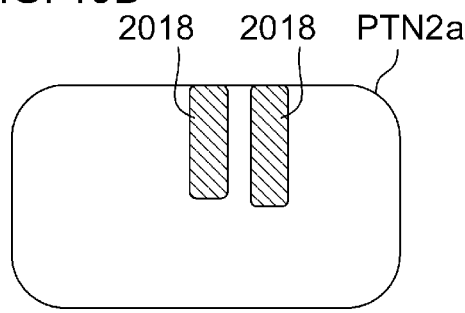
Figure 19D:
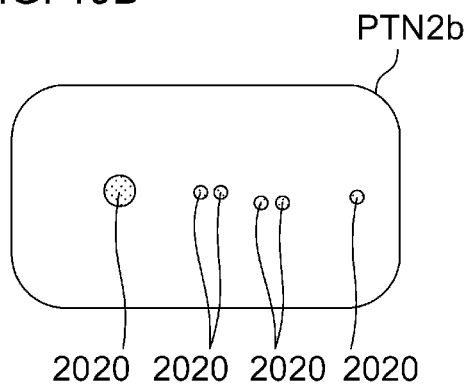
Figure 19E:
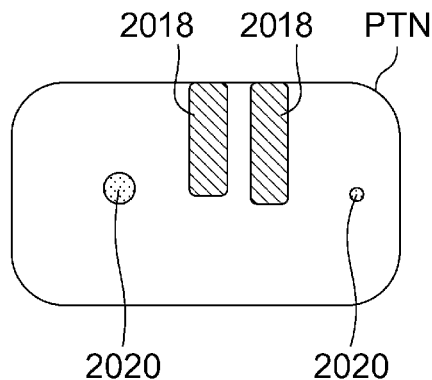
Figure 20A:
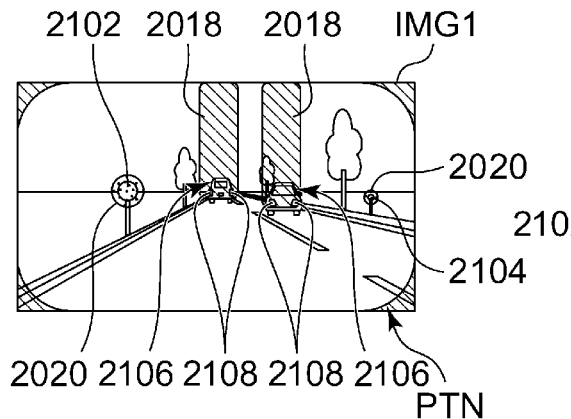
FIG. 20A to FIG. 20E are schematic diagrams for describing an operation of the light distribution controlling device.
Figure 20C:
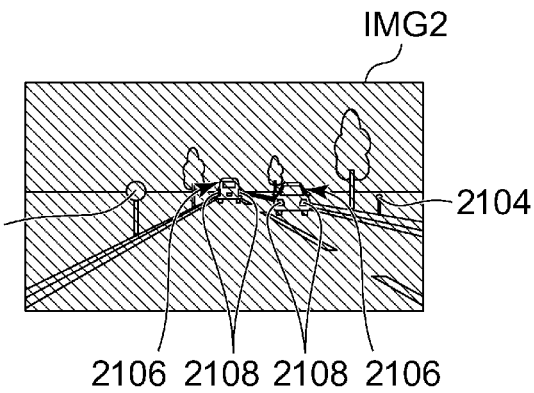
Figure 20B:
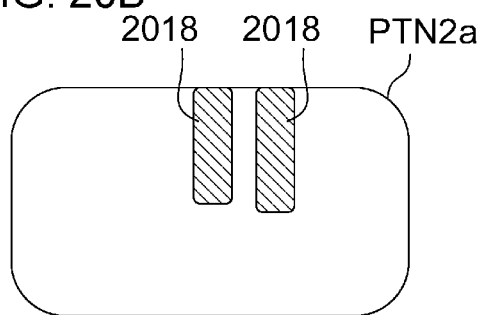
Figure 20D:
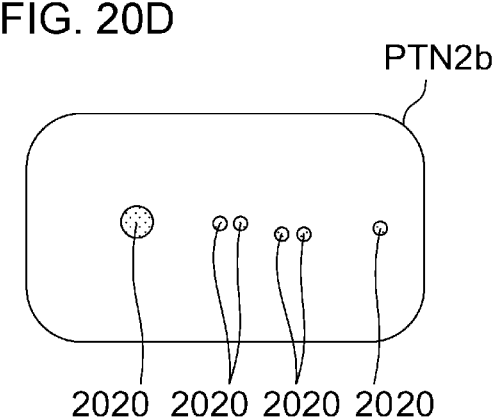
Figure 20E:
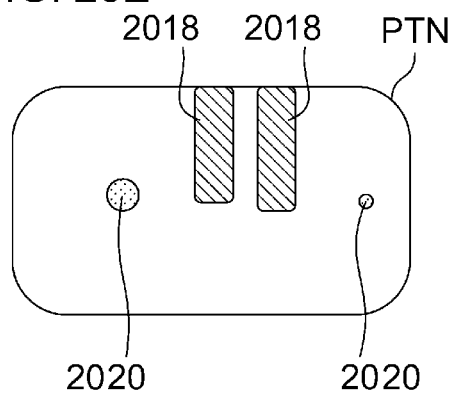

FIG. 18A and FIG. 18B, FIG. 19A to FIG. 19E, and FIG. 20A to FIG. 20E are schematic diagrams for describing an operation of the light distribution controlling device 2008. FIG. 18A, FIG. 19A, and FIG. 20A are each a visible light image IMG1 obtained from the visible light imaging unit 2010. FIG. 19B and FIG. 20B are each a first precursor pattern PTN2a generated by the pattern determining unit 2014. FIG. 19C and FIG. 20C are each an infrared image IMG2 obtained from the infrared imaging unit 2012. FIG. 19D and FIG. 20D are each a second precursor pattern PTN2b generated by the pattern determining unit 2014. FIG. 18B, FIG. 19E, and FIG. 20E are each a light distribution pattern PTN generated by the pattern determining unit 2014.

Upon starting the light distribution control (ADB control), the light distribution controlling device 2008 first executes a starting process. In the starting process, the lamp controlling unit 2016 controls the light distribution variable lamp 2002 so as to form a reference light distribution pattern PTN20. The reference light distribution pattern PTN20 is a pattern with a fixed illuminance that is not dependent on the luminance of the region ahead of the host vehicle. The lamp controlling unit 2016 holds in advance information regarding the reference light distribution pattern PTN20.

For example, the reference light distribution pattern PTN20 is formed of a light distribution pattern selected by the driver in accordance with the traveling environment of the host vehicle before the start of the light distribution control or selected by the vehicle lamp system 2001. In one example, the reference light distribution pattern PTN20 is formed of either a low beam light distribution pattern or a high beam light distribution pattern. If the host vehicle is traveling in a city area, a low beam light distribution pattern is often selected as a light distribution pattern formed while the light distribution control is not executed. In this case, the reference light distribution pattern PTN20 is a low beam light distribution pattern. Meanwhile, if the host vehicle is traveling in a suburb, a high beam light distribution pattern is often selected as a light distribution pattern formed while the light distribution control is not executed. In this case, the reference light distribution pattern PTN20 is a high beam light distribution pattern. FIG. 18A illustrates a high beam light distribution pattern as the reference light distribution pattern PTN20.

When the reference light distribution pattern PTN20 is formed, a visible light image IMG1 reflecting the situation ahead of the host vehicle observed while the starting light distribution pattern PTN20 is formed is generated by the visible light imaging unit 2010, as illustrated in FIG. 18A.

Then, as illustrated in FIG. 18B, the pattern determining unit 2014 generates a starting light distribution pattern PTN21 based on the obtained visible light image IMG1. For example, the pattern determining unit 2014 performs a binarization process on the luminance values of the visible light image IMG1 by use of a predetermined threshold. When the visible light image IMG1 includes a luminous point having a luminance higher than the threshold, this luminous point remains in the binary image of the visible light image IMG1. The threshold can be set as appropriate based on an experiment or a simulation conducted by the designer.

In the example illustrated in FIG. 18A, a sign 2102, a delineator 2104 and two front vehicles 2106 are present ahead of the host vehicle. The front vehicle 2106 on the left is a preceding vehicle traveling in the same direction as the host vehicle, and the front vehicle 2106 on the right is an oncoming vehicle traveling in the opposite direction from the host vehicle. The sign 2102 and the delineator 2104 illuminated with the reference light distribution pattern PTN20 are each captured as a high luminance object having a luminance higher than the threshold in the visible light image IMG1. Lamps 2108 of the front vehicles 2106, that is, the headlamps of the preceding vehicle and the tail lamps or the stop lamps of the oncoming vehicle are each a luminous point where the lamp itself emits light. Therefore, the lamps 2108 are each captured as a high luminance object having a luminance higher than the threshold in the visible light image IMG1. Thus, the binary image of the visible light image IMG1 includes the luminous points derived from the sign 2102, the delineator 2104, and the lamps 2108.

Next, the pattern determining unit 2014 performs a horizontal dilation process on the binary image by use of a first structuring element having a predetermined length in the widthwise direction of the vehicle and with the center pixel of the first structuring element mapped to a pixel of interest. Thus, when a set of two luminous points appearing side by side with a predetermined interval therebetween in the widthwise direction of the vehicle is present in the binary image, these luminous points become connected to each other, and a horizontal dilated portion is generated. The interval between the two luminous points to be coupled to each other through the horizontal dilation process is determined in accordance with the length of the first structuring element in the widthwise direction of the vehicle. For example, the length of the first structuring element in the widthwise direction of the vehicle is mapped to the interval between the two lamps 2108 of a front vehicle 2106. Thus, the two luminous points derived from the lamps 2108 included in the binary image are coupled to each other. The sign 2102 and the front vehicles 2106 are each a standalone luminous point, and such a luminous point remains as a standalone luminous point even after being subjected to the horizontal dilation process.

Next, the pattern determining unit 2014 generates an inverted image by inverting the luminance value of each pixel in the image subjected to the horizontal dilation process. In the inverted image, the luminous points derived from the sign 2102 and the delineator 2104 and the horizontal dilated portions derived from the lamps 2108 each have a low luminance value (a low pixel value), and the remaining portion of the image has a high luminance value (a high pixel value). The pattern determining unit 2014 performs a vertical erosion process on the inverted image by use of a second structuring element having a predetermined length in the up-down direction and with the upper end pixel of the second structuring element mapped to a pixel of interest. Thus, the portion having a high luminance value located over each portion having a low luminance value in the inverted image is eroded in the upward direction.

As a result, the starting light distribution pattern PTN21 having a plurality of vertically elongated first low illuminance portions 2018 is generated, as illustrated in FIG. 18B. The lower end portions of the respective first low illuminance portions 2018 overlap the sign 2102, the delineator 2104, and the lamps 2108, respectively. The first low illuminance portions 2018 are set based on the luminous points included in the visible light image IMG1 and are each a portion having an illuminance lower than that of the remaining portion of the starting light distribution pattern PTN21, that is, the portion other than the first low illuminance portions 2018.

In other words, the pattern determining unit 2014 determines a starting light distribution pattern PTN21 in which the illuminance of light for illuminating a specific region defined based on an individual region having a luminance higher than a threshold is lower than the illuminance of light for illuminating an individual region having a luminance lower than the threshold. The illuminance of the first low illuminance portions 2018 is, for example, zero. The illuminance of the remaining portion of the starting light distribution pattern PTN21 is comparable to that of the reference light distribution pattern PTN20. The image processing employed when determining a starting light distribution pattern PTN21 from a visible light image IMG1 is not limited to those described above. For example, the processes may be performed in order from the horizontal dilation process to the upward dilation process to the inversion process, or the processes may be performed in order from the upward dilation process to the horizontal dilation process to the inversion process.

The lamp controlling unit 2016 transfers data pertaining to the starting light distribution pattern PTN21 to the light distribution variable lamp 2002. Thus, the starting light distribution pattern PTN21 is formed ahead of the host vehicle, as illustrated in FIG. 19A. Then, a visible light image IMG1 reflecting the situation ahead of the host vehicle observed while the starting light distribution pattern PTN21 is formed is generated by the visible light imaging unit 2010.

Next, as illustrated in FIG. 19B, the pattern determining unit 2014 generates a first precursor pattern PTN2a based on the obtained visible light image IMG1. The pattern determining unit 2014 can generate the first precursor pattern PTN2a through the same generation procedures as in the case of the starting light distribution pattern PTN21 described above.

The starting light distribution pattern PTN21 includes the first low illuminance portions 2018 that overlap the sign 2102 and the delineator 2104. Neither the sign 2102 nor the delineator 2104 is a self-luminous object. Therefore, neither the sign 2102 nor the delineator 2104 is captured as a high luminance object in the obtained visible light image IMG1. Meanwhile, the starting light distribution pattern PTN21 includes the first low illuminance portions 2018 that overlap the front vehicles 2106. However, the lamps 2108 are self-luminous objects. Therefore, the lamps 2108 are each captured as a high luminance object in the obtained visible light image IMG1.

Hence, the generated first precursor pattern PTN2a includes the first low illuminance portions 2018 that overlap the front vehicles 2106 but includes neither the first low illuminance portion 2018 that overlaps the sign 2102 nor the first low illuminance portion 2018 that overlaps the delineator 2104. The first low illuminance portions 2018 are defined based on the luminous points derived from the lamps 2108 included in the visible light image IMG1. The first low illuminance portions 2018 at least in part overlap the drivers of the front vehicles 2106. The first low illuminance portions 2018 are each a portion having an illuminance lower than that of the remaining portion of the first precursor pattern PTN2a, that is, the portion other than the first low illuminance portions 2018.

As illustrated in FIG. 19C, an infrared image IMG2 reflecting the situation ahead of the host vehicle observed while the region ahead of the host vehicle is illuminated with the infrared radiation L22 is generated by the infrared imaging unit 2012. As illustrated in FIG. 19D, the pattern determining unit 2014 generates a second precursor pattern PTN2b based on the obtained infrared image IMG2. For example, the pattern determining unit 2014 performs a binarization process on the luminance values of the infrared image IMG2 by use of a predetermined threshold. Thus, when the infrared image IMG2 includes a luminous point having a luminance higher than the threshold, this luminous point remains in the binary image of the infrared image IMG2.

In the example illustrated in FIG. 19C, the sign 2102, the delineator 2104, and the two front vehicles 2106 are present ahead of the host vehicle. The sign 2102 and the delineator 2104 illuminated with the infrared radiation L22 are each captured as a high luminance object having a luminance higher than a threshold in the infrared image IMG2. The lamps 2108 of the front vehicles 2106 themselves emit infrared radiation if the light sources are halogen lamps or the like. Therefore, the lamps 2108 are each captured as a high luminance object having a luminance higher than a threshold in the infrared image IMG2. Thus, the binary image of the infrared image IMG2 includes luminous points derived from the sign 2102, the delineator 2104, and the lamps 2108.

Next, the pattern determining unit 2014 inverts the luminance value of each pixel in the binary image. Thus, the second precursor pattern PTN2b is generated. The second precursor pattern PTN2b includes second low illuminance portions 2020. The second low illuminance portions 2020 are defined based on the luminous points derived from the sign 2102, the delineator 2104, and the lamps 2108 included in the infrared image IMG2. The second low illuminance portions 2020 overlap the sign 2102, the delineator 2104, and the lamps 2108, respectively. The second low illuminance portions 2020 are each a portion having an illuminance lower than that of the remaining portion of the second precursor pattern PTN2b, that is, the portion other than the second low illuminance portions 2020. However, the second low illuminance portions 2020 have a higher illuminance than the first low illuminance portions 2018. For example, whereas the illuminance of the first low illuminance portions 2018 is zero, the illuminance of the second low illuminance portions 2020 is higher than zero. In one example, the illuminance of the second low illuminance portions 2020 is 25% to 75% of the illuminance of the portion other than the first low illuminance portions 2018 and the second low illuminance portions 2020.

In a case where the light source is an LED or the like, each lamp 2108 emits little infrared radiation. Therefore, the lamps 2108 may not be captured as a high luminance object in the infrared image IMG2. However, whether the luminous points derived from the lamps 2108 are included in the infrared image IMG2 is not particularly an issue in the light distribution control executed by the light distribution controlling device 2008.

Next, as illustrated in FIG. 19E, the pattern determining unit 2014 determines a light distribution pattern PTN by combining the first precursor pattern PTN2a and the second precursor pattern PTN2b. For example, the pattern determining unit 2014 generates the light distribution pattern PTN by combining the first precursor pattern PTN2a and the second precursor pattern PTN2b through, for example, an OR operation. Thus, the light distribution pattern PTN includes the first low illuminance portions 2018 and the second low illuminance portions 2020. The first low illuminance portions 2018 overlap the front vehicles 2106, and the second low illuminance portions 2020 overlap the sign 2102 and the delineator 2104.

If a first low illuminance portion 2018 included in a first precursor pattern PTN2a and a second low illuminance portion 2020 included in a second precursor pattern PTN2b overlap each other, the pattern determining unit 2014 sets the portion where the first low illuminance portion 2018 and the second low illuminance portion 2020 overlap each other in the light distribution pattern PTN as a first low illuminance portion 2018. According to the present embodiment, the first precursor pattern PTN2a includes the first low illuminance portions 2018 that overlap the front vehicles 2106. The second precursor pattern PTN2b includes the second low illuminance portions 2020 that overlap the lamps 2108 of the front vehicles 2106. Therefore, in the portions corresponding to the lamps 2108 in the light distribution pattern PTN, the first low illuminance portions 2018 and the second low illuminance portions 2020 overlap each other. As such, the pattern determining unit 2014 sets the portions that overlap the lamps 2108 as the first low illuminance portions 2018.

The lamp controlling unit 2016 transfers data pertaining to the light distribution pattern PTN to the light distribution variable lamp 2002. Thus, the light distribution pattern PTN is formed ahead of the host vehicle, as illustrated in FIG. 20A. Then, a visible light image IMG1 reflecting the situation ahead of the host vehicle observed while the light distribution pattern PTN is formed is generated by the visible light imaging unit 2010.

Then, as illustrated in FIG. 20B, the pattern determining unit 2014 generates a first precursor pattern PTN2a based on the obtained visible light image IMG1. The procedures for generating the first precursor pattern PTN2a are as described above.

The light distribution pattern PTN includes the second low illuminance portions 2020 that overlap the sign 2102 and the delineator 2104. Therefore, neither the sign 2102 nor the delineator 2104 is captured as a high luminance object in the obtained visible light image IMG1. Meanwhile, since the lamps 2108 are self-luminous objects, the lamps 2108 are each captured as a high luminance object in the obtained visible light image IMG1. Therefore, the generated first precursor pattern PTN2a includes the first low illuminance portions 2018 that overlap the front vehicles 2106 but includes neither the first low illuminance portion 2018 that overlaps the sign 2102 nor the first low illuminance portion 2018 that overlaps the delineator 2104.

For example, the threshold used in the binarization process performed when the first precursor pattern PTN2a is generated is set to a value that is higher than the luminance of the luminous points derived from the sign 2102 and the delineator 2104 illuminated with the light in the second low illuminance portions 2020 but lower than the luminance of the luminous points derived from the lamps 2108. Thus, in the binary image obtained in the process of generating the first precursor pattern PTN2a, the luminous points derived from the lamps 2108 remain, and the luminous points derived from the sign 2102 and the delineator 2104 are removed. In other words, the luminous points derived from the lamps 2108 in the visible light image IMG1 are each processed as a high-luminance portion, and the luminous points derived from the sign 2102 and the delineator 2104 are each processed as a low-luminance portion.

As illustrated in FIG. 20C, an infrared image IMG2 reflecting the situation ahead of the host vehicle observed while the region ahead of the host vehicle is illuminated with the infrared radiation L22 is generated by the infrared imaging unit 2012. The pattern determining unit 2014 generates a second precursor pattern PTN2b based on the obtained infrared image IMG2, as illustrated in FIG. 20D. The procedures for generating the second precursor pattern PTN2b are as described above. In the example illustrated in FIG. 20C, the sign 2102, the delineator 2104, and the two front vehicles 2106 are present ahead of the host vehicle. Therefore, the generated second precursor pattern PTN2b includes second low illuminance portions 2020 corresponding to the sign 2102, the delineator 2104, and the lamps 2108.

Next, as illustrated in FIG. 20E, the pattern determining unit 2014 determines a light distribution pattern PTN by combining the first precursor pattern PTN2a and the second precursor pattern PTN2b. The procedures for generating the light distribution pattern PTN are as described above. Thus, the light distribution pattern PTN includes the first low illuminance portions 2018 and the second low illuminance portions 2020. The first low illuminance portions 2018 overlap the respective front vehicles 2106, and the second low illuminance portions 2020 overlap the sign 2102 and the delineator 2104. The light distribution pattern PTN determined at this point is the same as the light distribution pattern PTN illustrated in FIG. 19E (the arrangement of the sign 2102, the delineator 2104, and the front vehicles 2106 is the same).

The lamp controlling unit 2016 transfers data pertaining to the light distribution pattern PTN to the light distribution variable lamp 2002. Thus, the light distribution pattern PTN is formed ahead of the host vehicle, as illustrated in FIG. 20A. Thereafter, the control illustrated in FIG. 20A to FIG. 20E is repeated.

In the light distribution control described above, the second low illuminance portions 2020 overlap such reflective objects as the sign 2102 and the delineator 2104. In other words, these reflective objects are illuminated with light having an illuminance lower than that of the light for illuminating the region excluding the first low illuminance portions 2018 and the second low illuminance portions 2020. This configuration can lower the intensity of reflected light from the reflective objects. Accordingly, glare caused to the driver of the host vehicle can be suppressed. The first low illuminance portions 2018 overlap the front vehicles 2106. In other words, the front vehicles 2106 are not illuminated with light or are illuminated with light having an illuminance lower than that of the light for illuminating the region excluding the first low illuminance portions 2018. Accordingly, glare caused to the drivers of the front vehicles 2106 can be suppressed.

Figure 21:
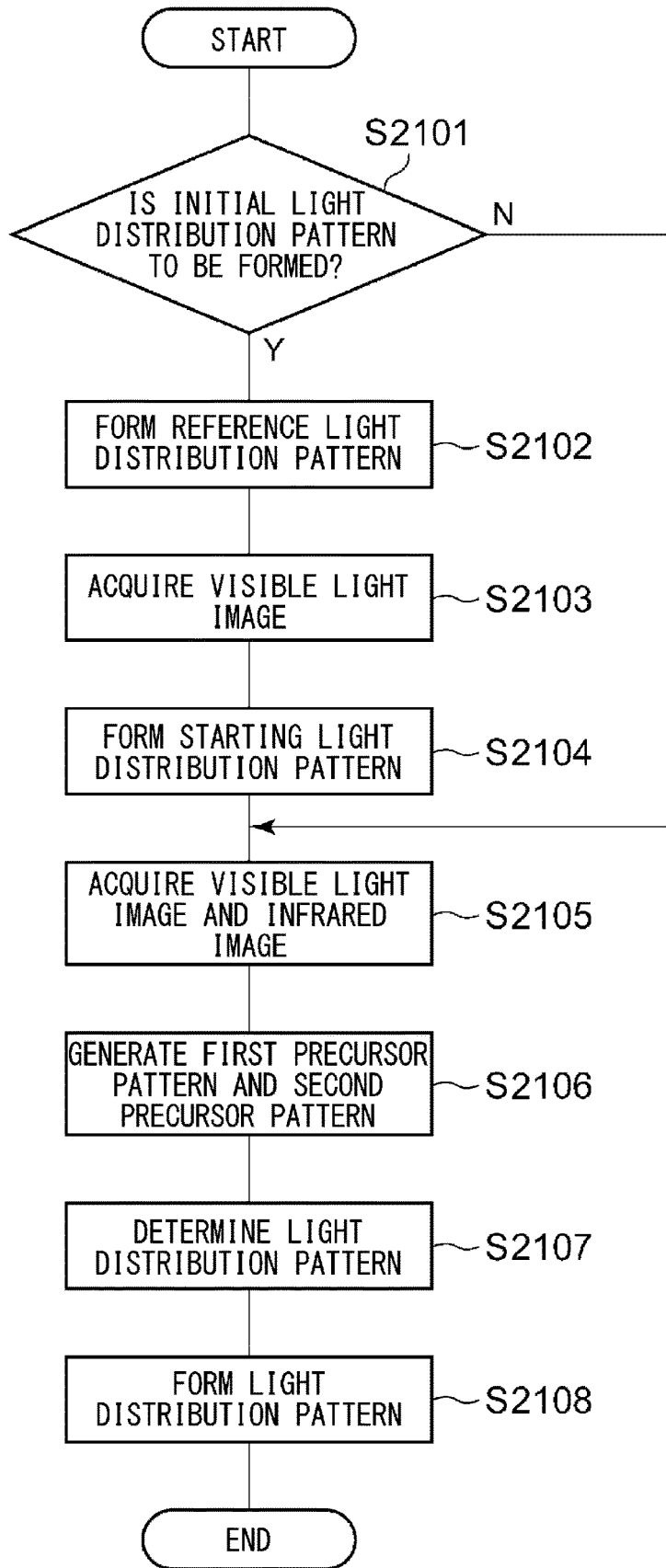
FIG. 21 is a flowchart illustrating an example of light distribution control executed by the light distribution controlling device.

FIG. 21 is a flowchart illustrating an example of light distribution control executed by the light distribution controlling device 2008. This flow is executed repeatedly at predetermined timings, for example, when the light distribution controlling device 2008 is instructed to execute the light distribution control via a light switch (not illustrated) and when the ignition is on.

The light distribution controlling device 2008 determines whether it is the timing for forming an initial light distribution pattern PTN (S2101). Whether it is the timing for forming an initial light distribution pattern PTN can be determined based on the presence or absence of, for example, a flag for forming a light distribution pattern PTN. If it is the timing for forming an initial light distribution pattern PTN (Y at S2101), the light distribution controlling device 2008 controls the light distribution variable lamp 2002 so as to form a reference light distribution pattern PTN20 (S2102). Then, the light distribution controlling device 2008 acquires a visible light image IMG1 that the visible light imaging unit 2010 has captured while the reference light distribution pattern PTN20 is formed (S2103).

The light distribution controlling device 2008 generates a starting light distribution pattern PTN21 based on the visible light image IMG1 and controls the light distribution variable lamp 2002 so as to form the starting light distribution pattern PTN21 (S2104). Then, the light distribution controlling device 2008 acquires a visible light image IMG1 that the visible light imaging unit 2010 has captured while the starting light distribution pattern PTN21 is formed and an infrared image IMG2 that the infrared imaging unit 2012 has captured while the region ahead of the vehicle is illuminated with infrared radiation L22 (S2105).

If it is not the timing for forming an initial light distribution pattern PTN (N at S2101), this means that the light distribution pattern PTN has already been formed. Therefore, the light distribution controlling device 2008 proceeds to step S2105 without forming a reference light distribution pattern PTN20 or a starting light distribution pattern PTN21. Then, the light distribution controlling device 2008 acquires a visible light image IMG1 that the visible light imaging unit 2010 has captured while the light distribution pattern PTN is formed and an infrared image IMG2 that the infrared imaging unit 2012 has captured while the region ahead of the vehicle is illuminated with infrared radiation L22 (S2105).

The light distribution controlling device 2008 generates a first precursor pattern PTN2a based on the acquired visible light image IMG1 and generates a second precursor pattern PTN2b based on the acquired infrared image IMG2 (S2106). Next, the light distribution controlling device 2008 determines a light distribution pattern PTN by combining the first precursor pattern PTN2a and the second precursor pattern PTN2b (S2107). Then, the light distribution controlling device 2008 controls the light distribution variable lamp 2002 so as to form the determined light distribution pattern PTN (S2108), generates a flag for forming the light distribution pattern PTN, stores the generated flag into a memory, and terminates this routine. The flag for forming the light distribution pattern PTN is deleted as the light distribution control stops.

As described above, the light distribution controlling device 2008 according to the present embodiment includes the pattern determining unit 2014 and the lamp controlling unit 2016. The pattern determining unit 2014 determines a light distribution pattern PTN based on a visible light image IMG1 and an infrared image IMG2. The visible light image IMG1 is obtained from the visible light imaging unit 2010 that has a sensitivity to a visible light range and captures an image of a region ahead of the vehicle. The infrared image IMG2 is obtained from the infrared imaging unit 2012 that has a sensitivity to an infrared range and captures an image of the region ahead of the vehicle. The lamp controlling unit 2016 controls the light distribution variable lamp 2002 so as to form the light distribution pattern PTN in the region ahead of the vehicle, and the light distribution variable lamp 2002 is capable of illuminating the region ahead of the vehicle with a visible light beam L1 of a variable intensity distribution.

The pattern determining unit 2014 sets a first low illuminance portion 2018 having an illuminance lower than that of the remaining portion of the visible light image IMG1 based on a luminous point included in the visible light image IMG1 and generates a first precursor pattern PTN2*a* that includes the first low illuminance portion 2018. The pattern determining unit 2014 sets a second low illuminance portion 2020 having an illuminance that is lower than that of the remaining portion of the infrared image IMG2 but higher than that of the first low illuminance portion 2018 based on a luminous point included in the infrared image IMG2 captured while the region ahead of the vehicle is illuminated with infrared radiation L22 from the infrared illuminator 2004, and generates a second precursor pattern PTN2*b* that includes the second low illuminance portion 2020. Then, the pattern determining unit 2014 determines a light distribution pattern PTN that includes the first low illuminance portion 2018 and the second low illuminance portion 2020 by combining the first precursor pattern PTN2*a* and the second precursor pattern PTN2*b*.

The vehicle lamp system 2001 according to the present embodiment includes the light distribution variable lamp 2002, the infrared illuminator 2004 capable of illuminating a region ahead of the vehicle with infrared radiation, the imaging device 2006 that includes the visible light imaging unit 2010 and the infrared imaging unit 2012, and the light distribution controlling device 2008 according to the present embodiment.

As the first low illuminance portion 2018 is set based on the luminous point in the visible light image IMG1, the first low illuminance portion 2018 can be made to overlap a front vehicle 2106 having lamps 2108, which are self-luminous objects, when the light distribution pattern PTN is formed. As the second low illuminance portion 2020 is set based on the luminous point in the infrared image IMG2, the second low illuminance portion 2020 can be made to overlap a reflective object, such as a sign 2102 or a delineator 2104, when the light distribution pattern PTN is formed. As the second low illuminance portion 2020 is formed so as to overlap a reflective object, the reflective object can be excluded from targets for which a first low illuminance portion 2018 is formed.

The first low illuminance portion 2018 is a portion having an illuminance lower than that of the portion other than the first low illuminance portion 2018 in the light distribution pattern PTN. The second low illuminance portion 2020 is a portion having an illuminance that is higher than the illuminance of the first low illuminance portion 2018 in the light distribution pattern PTN but lower than the illuminance of the portion other than the first low illuminance portion 2018 or the second low illuminance portion 2020. This configuration can suppress glare that the driver of the front vehicle 2106 could experience when the light distribution pattern PTN is formed and can also suppress glare that the driver of the host vehicle could experience by reflected light from the reflective object.

In one conceivable method of lowering the intensity of reflected light from a reflective object, the reflective object is illuminated intermittently with a visible light beam L1, and thus the amount of illuminating light on the reflective object can be reduced. In this case, however, the state in which the reflective object is bright and the state in which the reflective object is dark are repeated, and if the speed of switching the light distribution pattern PTN is low, the driver may sense the flicker. Therefore, the light distribution pattern needs to be switched rapidly. However, if the communication speed of the vehicle lamp system is increased in order to achieve the rapid switching of the light distribution pattern, this leads to a higher cost needed for ADB control.

In contrast, according to the present embodiment, the second low illuminance portion 2020 is made to overlap a reflective object continuously. In other words, a reflective object is illuminated continuously with light having a low illuminance. This configuration can suppress any flicker that the driver may experience due to the reflective object, without increasing the speed of switching the light distribution pattern. Moreover, the dimming rate on the reflective object can be adjusted with ease by adjusting the illuminance of the second low illuminance portion 2020.

The first precursor pattern PTN2*a* that includes the first low illuminance portion 2018 is generated from the visible light image IMG1, and the second precursor pattern PTN2*b* that includes the second low illuminance portion 2020 is generated from the infrared image IMG2. Therefore, the first low illuminance portion 2018 can be mapped to the front vehicle 2106, and the second low illuminance portion 2020 can be mapped to the sign 2102 or the like, without differentiating between the front vehicle 2106 and a reflective object such as the sign 2102 in the visible light image IMG1. Thus, according to the present embodiment, any advanced image analysis including, for example, algorithm recognition or deep learning for identifying the front vehicle 2106 can be omitted. Accordingly, ADB control can be simplified.

The pattern determining unit 2014 sets the portion where the first low illuminance portion 2018 and the second low illuminance portion 2020 overlap each other in the light distribution pattern PTN as the first low illuminance portion 2018. This configuration can suppress glare caused to the driver of the front vehicle 2106 more reliably.

According to the present embodiment, the illuminance of the first low illuminance portion 2018 is zero, and the illuminance of the second low illuminance portion 2020 is higher than zero. This configuration can further suppress glare caused to the driver of the front vehicle 2106.

Thus far, Embodiment 3 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also effective as an aspect of the present invention. Hatching added along a section in the drawings does not limit the material of the component with hatching.

The following aspect can also be included in the present invention.

A light distribution controlling method, comprising:
determining a light distribution pattern (PTN) based on a visible light image (IMG1) and an infrared image (IMG2), the visible light image (IMG1) obtained from a visible light imaging unit (2010) that has a sensitivity to a visible light range and captures an image of a region ahead of a vehicle, the infrared image (IMG2) obtained from an infrared imaging unit (2012) that has a sensitivity to an infrared range and captures an image of the region ahead of the vehicle; and
controlling a light distribution variable lamp (2002) so as to form the light distribution pattern (PTN) in the region ahead of the vehicle, the light distribution variable lamp (2002) being capable of illuminating the region ahead of the vehicle with a visible light beam (L1) of a variable intensity distribution, wherein
the determining of the light distribution pattern (PTN) includes
setting a first low illuminance portion (2018) having an illuminance lower than that of a remaining portion based on a luminous point included in the visible light image (IMG1) and generating a first precursor pattern (PTN2a) that includes the first low illuminance portion (2018),
setting a second low illuminance portion (2020) having an illuminance that is lower than that of a remaining portion but higher than that of the first low illuminance portion (2018) based on a luminous point included in an infrared image (IMG2) captured while the region ahead of the vehicle is illuminated with infrared radiation (L22) from an infrared illuminator (2004) and generating a second precursor pattern (PTN2b) that includes the second low illuminance portion (2020), and
determining a light distribution pattern (PTN) that includes the first low illuminance portion (2018) and the second low illuminance portion (2020) by combining the first precursor pattern (PTN2a) and the second precursor pattern (PTN2b).

Embodiment 4

Figure 22:
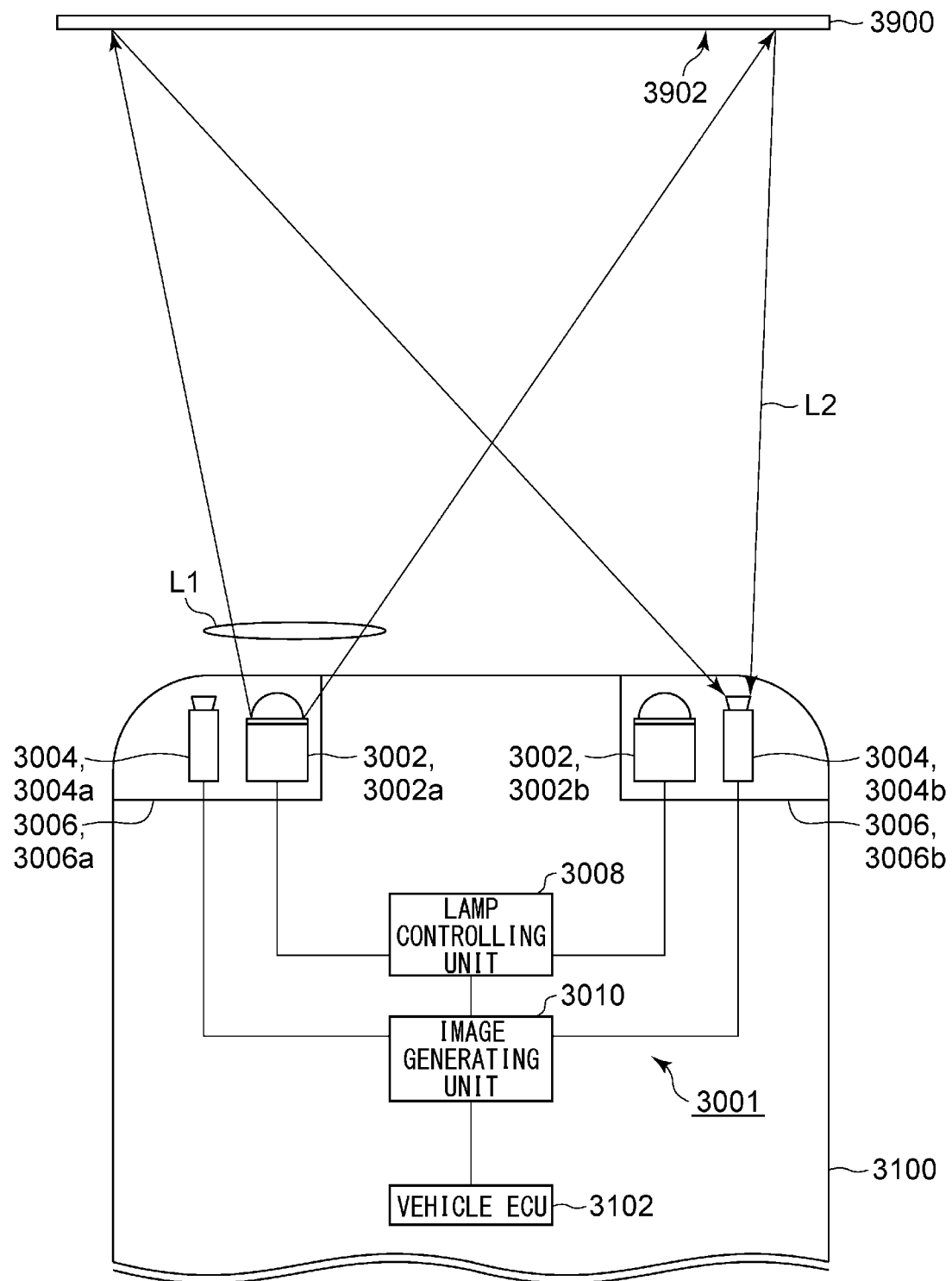
FIG. 22 is a block diagram of a vehicle lamp system according to Embodiment 4.

FIG. 22 is a block diagram of a vehicle lamp system according to Embodiment 4. FIG. 22 depicts some of the constituent elements of a vehicle lamp system 3001 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software. For example, a lamp controlling unit 3008 or an image generating unit 3010 can be formed by a digital processor. The lamp controlling unit 3008 or the image generating unit 3010 may be formed, for example but not limited to, by a combination of a microcomputer including a CPU and a software program or by an FPGA or an ASIC.

The vehicle lamp system 3001 includes a vehicle lamp 3002, an imaging device 3004, a housing 3006, a lamp controlling unit 3008, and an image generating unit 3010.

The vehicle lamp 3002 is a device that illuminates a region ahead of a vehicle 3100 with light. The vehicle lamp 3002 is, for example, a light distribution variable lamp that can form a predetermined light distribution pattern by illuminating a region ahead of the vehicle 3100 with a visible light beam L1 of a variable intensity distribution. The vehicle lamp 3002 receives data pertaining to a light distribution pattern from the lamp controlling unit 3008 and emits a visible light beam L1 having an intensity distribution corresponding to the light distribution pattern. Thus, the light distribution pattern is formed ahead of the vehicle. A light distribution pattern can be regarded as a two-dimensional illuminance distribution of an illumination pattern 3902 that the vehicle lamp 3002 forms on an imaginary vertical screen 3900 located ahead of the host vehicle.

There is no particular limitation on the configuration of the vehicle lamp 3002, and the vehicle lamp 3002 includes, for example, a plurality of light sources arrayed in a matrix and a lighting circuit that drives the light sources to turn them on independently of each other. Some preferred examples of such a light source include a semiconductor light source, such as an LED, an LD, or an organic or inorganic EL device.

In order to form an illuminance distribution corresponding to a given light distribution pattern, the vehicle lamp 3002 may include, for example, a pattern forming device of a matrix type, such as a DMD or a liquid crystal device, or a pattern forming device of a scan optics type that scans a region ahead of the host vehicle with light from a light source. The resolving power (the resolution) of the vehicle lamp 3002 is, for example, from 1,000 pixels to 1,300,000 pixels. The time required for the vehicle lamp 3002 to form a single light distribution pattern is, for example, from 0.1 ms to 5 ms. The vehicle lamp 3002 may emit a visible light beam of a fixed intensity distribution.

The imaging device 3004 captures an image of a region ahead of the vehicle 3100. The imaging device 3004 is formed by a known camera having a sensitivity to, for example, the wavelength range of the light that the vehicle lamp 3002 emits and captures an image of reflected light L2 of a visible light beam L1 reflected by an object located ahead of the vehicle. The imaging device 3004 according to the present embodiment captures an image of a region ahead of the vehicle repeatedly at predetermined timings.

The housing 3006 houses the vehicle lamp 3002 and the imaging device 3004. There is no particular limitation on the structure of the housing 3006. For example, the housing 3006 includes a lamp body having an opening that opens toward the front of the vehicle and a light transmissive cover attached so as to cover the opening of the lamp body. The vehicle lamp 3002 and the imaging device 3004 are housed in the lamp room defined by the lamp body and the light transmissive cover.

The vehicle lamp 3002 according to the present embodiment includes a first lamp 3002a and a second lamp 3002b. The first lamp 3002a and the second lamp 3002b are switched on or off independently of each other by the lamp controlling unit 3008. The imaging device 3004 according to the present embodiment includes a first imaging device 3004*a* and a second imaging device 3004*b*. The housing 3006 according to the present embodiment includes a first housing 3006*a* that houses the first lamp 3002*a* and the first imaging device 3004*a* and a second housing 3006*b* that houses the second lamp 3002*b* and the second imaging device 3004*b*. The first housing 3006*a* that houses the first lamp 3002*a* and the first imaging device 3004*a* is disposed at a front left end portion of the vehicle 3100, and the second housing 3006*b* that houses the second lamp 3002*b* and the second imaging device 3004*b* is disposed at a front right end portion of the vehicle 3100. There is no particular limitation on the arrangement of these housings.

Figure 23:
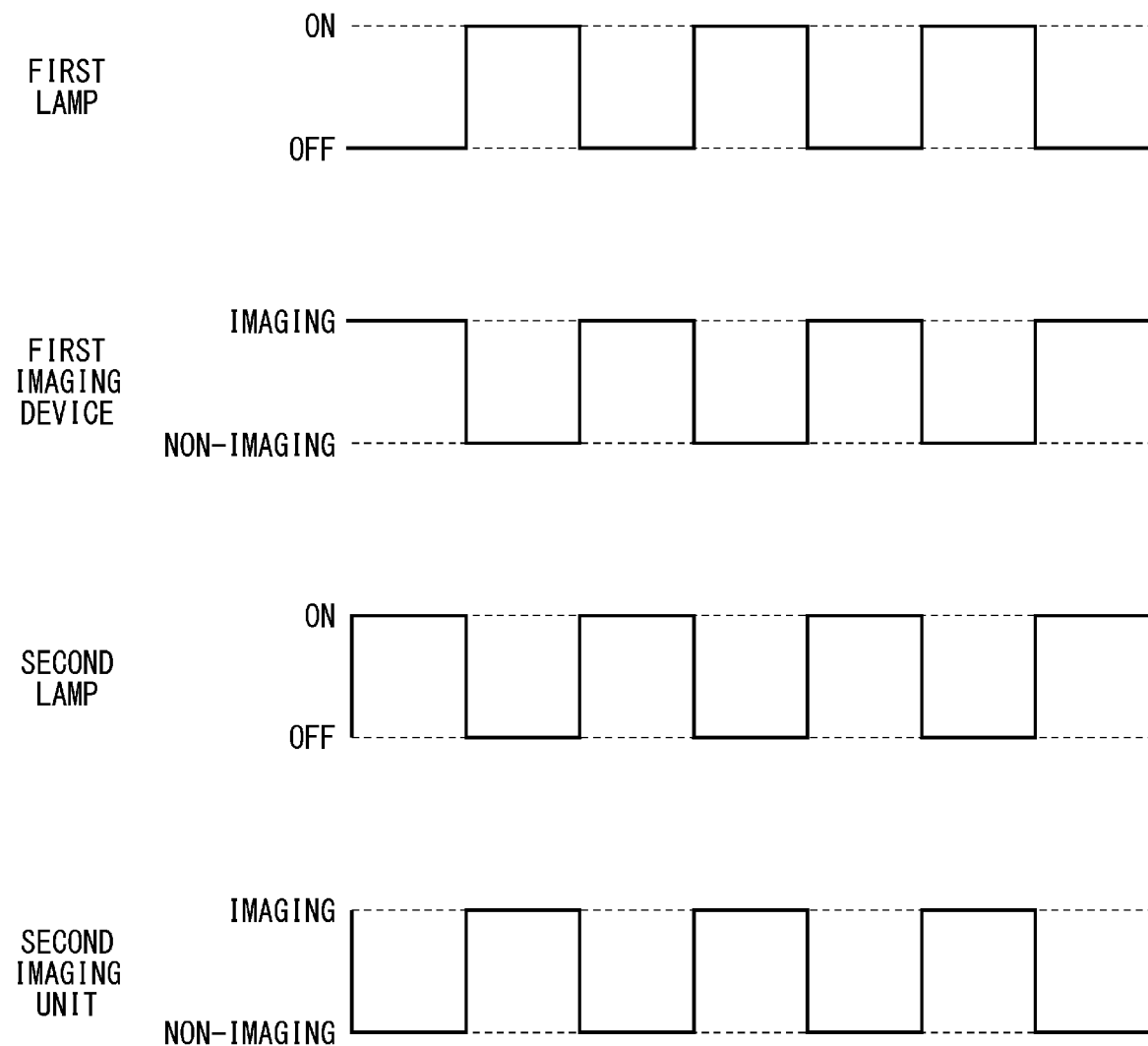
FIG. 23 is a waveform diagram for describing an on/off timing of a vehicle lamp and an imaging timing of an imaging device.

The lamp controlling unit 3008 controls the on and off of the vehicle lamp 3002. The lamp controlling unit 3008 may be provided in the vehicle 3100 or within the housing 3006. FIG. 23 is a waveform diagram for describing an on/off timing of the vehicle lamp 3002 and an imaging timing of the imaging device 3004. As illustrated in FIG. 23, with regard to the vehicle lamp 3002 and the imaging device 3004 housed in the same housing 3006, the lamp controlling unit 3008 turns off the vehicle lamp 3002 while the imaging device 3004 is capturing an image and turns on the vehicle lamp 3002 while the imaging device 3004 is not capturing an image. In other words, the timing at which the vehicle lamp 3002 emits light and the timing at which the imaging device 3004 performs an exposure do not overlap each other.

When the vehicle lamp 3002 is turned on, some of the light emitted from the vehicle lamp 3002 may be reflected by the light transmissive cover of the housing 3006 and return into the housing 3006. When the imaging device 3004 is embedded into the housing 3006 that houses the vehicle lamp 3002, reflected light may be mixed into the image data that the imaging device 3004 generates when the imaging device 3004 captures an image of the region ahead of the host vehicle. If such reflected light is mixed into the image data, this makes it difficult to grasp the situation of the region ahead of the vehicle with high accuracy. In this respect, the lamp controlling unit 3008 turns off the vehicle lamp 3002 embedded in the same housing 3006 in synchronization with the exposure timing of the imaging device 3004. This control can keep the reflected light from being mixed into the image data. The turning off of the vehicle lamp 3002 herein includes a state in which the vehicle lamp 3002 emits light to an extent that does not interfere with the determining of the situation of the region ahead of the vehicle in ADB control, ADAS, automatic driving technologies, or the like.

According to the present embodiment, the first imaging device 3004*a* and the second imaging device 3004*b* have different imaging timings. In other words, the second imaging device 3004*b* is in a non-imaging state while the first imaging device 3004*a* is capturing an imaging, and the first imaging device 3004*a* is in a non-imaging state while the second imaging device 3004*b* is capturing an image. The first imaging device 3004*a* and the second imaging device 3004*b* repeat imaging in an alternating manner. Then, the lamp controlling unit 3008 turns off the first lamp 3002*a* and turns on the second lamp 3002*b* while the first imaging device 3004*a* is capturing an image. Meanwhile, the lamp controlling unit 3008 turns on the first lamp 3002*a* and turns off the second lamp 3002*b* while the second imaging device 3004*b* is capturing an image.

The first lamp 3002*a* housed in the same first housing 3006*a* is turned off when the first imaging device 3004*a* captures an image, and thus mixing of reflected light can be suppressed. Meanwhile, the second lamp 3002*b* housed in the different second housing 3006*b* is turned on when the first imaging device 3004*a* captures an image, and thus the first imaging device 3004*a* can capture an image of the region ahead of the vehicle brightened by the second lamp 3002*b*.

In a similar manner, the first lamp 3002*a* housed in the same second housing 3006*b* is turned off when the second imaging device 3004*b* captures an image, and thus mixing of reflected light can be suppressed. Meanwhile, the first lamp 3002*a* housed in the different first housing 3006*a* is turned on when the second imaging device 3004*b* captures an image, and thus the second imaging device 3004*b* can capture an image of the region ahead of the vehicle brightened by the first lamp 3002*a*.

When the first imaging device 3004*a* and the second imaging device 3004*b* capture an image in an alternating manner, an image of the region ahead of the vehicle can be captured continuously. This enables the following of a change in the situation in the region ahead of the vehicle with higher accuracy in ADB control, ADAS, automatic driving technologies, or the like. Image data generated by the first imaging device 3004*a* and the second imaging device 3004*b* is sent to the image generating unit 3010.

The image generating unit 3010 generates combined image data by combining a plurality of pieces of image data obtained from the imaging device 3004. The image generating unit 3010 may be provided in the vehicle 3100, provided inside the housing 3006, or embedded in the imaging device 3004.

For example, the image generating unit 3010 generates a combined image by additively combining N images obtained from the imaging device 3004. This can generate a combined image having a lightness that is N times the lightness of the images combined. As described above, the imaging device 3004 repeats imaging at predetermined timings, and the lamp controlling unit 3008 causes the vehicle lamp 3002 to emit light while the imaging device 3004 is not capturing an image. Therefore, if the imaging time or the exposure time of the imaging device 3004 in one instance of imaging is long, a change in the lightness of the region ahead of the vehicle or the blinking of the vehicle lamp 3002 may be visually recognized by the driver of the host vehicle or other participants in the traffic (the drivers of other vehicles, pedestrians, etc.).

This change in the lightness or the blinking can cause discomfort to the drivers and so on, and thus the imaging time of the imaging device 3004 in a single instance of imaging needs to be short. However, if the imaging time is short, an image having a sufficient lightness may not be generated. In this respect, when a combined image is generated by additively combining a plurality of images, a combined image having a lightness necessary for various types of control can be generated. For example, when the imaging time of a single instance of imaging is 1 ms, additively combining five images can produce a combined image corresponding to the imaging time of 5 ms. The number of images to be combined can be set as appropriate based on an experiment or a simulation conducted by the designer.

When an image obtained in a single instance of imaging has a sufficient lightness, the image generating unit 3010 may generate a combined image by performing additive averaging combining of N images obtained from the imaging device 3004. This configuration can generate a combined image with an improved S/N ratio. The image generating unit 3010 may combine images from both the image data from the first imaging device 3004*a* and the image data from the second imaging device 3004*b* or may combine images separately from the image data from the first imaging device 3004*a* and from the image data from the second imaging device 3004*b*.

The image generating unit 3010 sends the generated combined image data to a vehicle ECU 3102 provided in the vehicle 3100. The vehicle ECU 3102 can use the acquired combined image in ADAS, automatic driving technologies, or the like. The image generating unit 3010 sends the combined image data to the lamp controlling unit 3008.

The lamp controlling unit 3008 determines a light distribution pattern to be formed in the region ahead of the vehicle based on the image data (including the combined image data) obtained from the imaging device 3004. Then, the lamp controlling unit 3008 controls the vehicle lamp 3002 so as to form the determined light distribution pattern. In other words, the lamp controlling unit 3008 controls the vehicle lamp 3002 based on the image data obtained from the imaging device 3004 and executes the ADB control of dynamically and adaptively controlling the light distribution pattern.

For example, the lamp controlling unit 3008 detects a predetermined target present ahead of the host vehicle based on the combined image data obtained from the imaging device 3004. A predetermined target to be detected is, for example, a self-luminous object, and specific examples include a front vehicle, such as an oncoming vehicle or a preceding vehicle. The lamp controlling unit 3008 can detect a target by use of a known method, including algorithm recognition or deep learning. For example, the lamp controlling unit 3008 holds in advance feature points indicating a front vehicle. Then, when the image data captured by the imaging device 3004 includes data that includes feature points indicating a front vehicle, the lamp controlling unit 3008 recognizes the position of the front vehicle. "A feature point indicating a front vehicle" mentioned above is, for example, a luminous point having a luminous intensity no lower than a predetermined luminous intensity that appears in a region where the headlamps of an oncoming vehicle, the tail lamps of a preceding vehicle, or the stop lamps of a preceding vehicle are estimated to appear.

The lamp controlling unit 3008 determines a light distribution pattern to be formed in the region ahead of the vehicle based on the result of detecting the target. For example, the lamp controlling unit 3008 determines a light distribution pattern having a non-illumination portion that overlaps the detected front vehicle. Then, the lamp controlling unit 3008 sends data pertaining to the determined light distribution pattern to the vehicle lamp 3002 and controls the vehicle lamp 3002 so as to form the light distribution pattern. For example, in a case where the vehicle lamp 3002 includes a DMD, the lamp controlling unit 3008 controls the on and off of the light source and the on/off switching of each mirror element forming the DMD. Thus, the light distribution pattern is formed ahead of the host vehicle.

Figure 24:
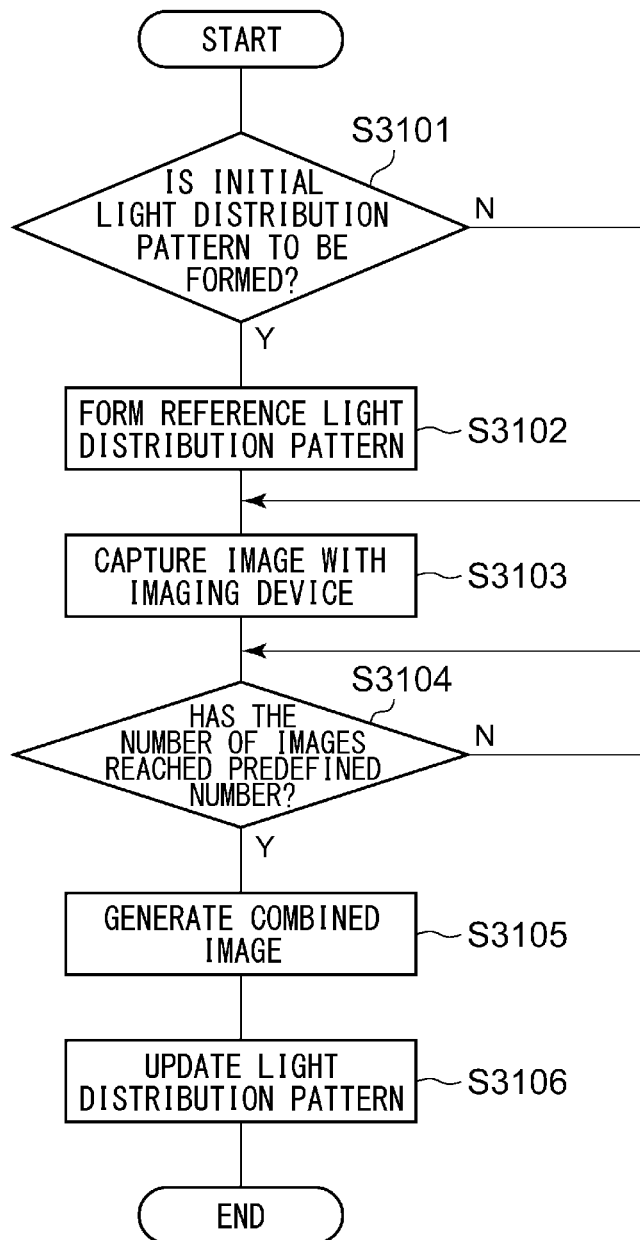
FIG. 24 is a flowchart illustrating an example of light distribution control executed by the vehicle lamp system.

FIG. 24 is a flowchart illustrating an example of light distribution control executed by the vehicle lamp system 3001. This flow is executed repeatedly at predetermined timings, for example, when the vehicle lamp system 3001 is instructed to execute the light distribution control via a light switch (not illustrated) and when the ignition is on.

The lamp controlling unit 3008 determines whether it is the timing for forming an initial light distribution pattern (S3101). Whether it is the timing for forming an initial light distribution pattern can be determined based on the presence or absence of, for example, an update flag described later. If it is the timing for forming an initial light distribution pattern (Y at S3101), the lamp controlling unit 3008 controls the vehicle lamp 3002 so as to form a reference light distribution pattern (S3102). The lamp controlling unit 3008 holds in advance information regarding the reference light distribution pattern. The reference light distribution pattern is a pattern of a fixed illuminance that is not dependent on the luminance of the region ahead of the vehicle and is formed, for example, by either a low beam light distribution pattern or a high beam light distribution pattern. If it is not the timing for forming an initial light distribution pattern (N at S3101), since this means that the light distribution pattern has already been formed, the lamp controlling unit 3008 proceeds to step S3103.

The imaging device 3004 repeatedly captures an image of the region ahead of the vehicle while the light distribution pattern is formed and generates image data (S3103). The imaging device 3004 is switched on or off in accordance with, for example, an execution instruction for the light distribution control. The image generating unit 3010 determines whether the number of generated images has reached a predefined number (S3104). If the number of images has not reached the predefined number (N at S3104), this determination is repeated. If the number of images has reached the predefined number (Y at S3104), the image generating unit 3010 generates combined image data (S3105). The lamp controlling unit 3008 determines a new light distribution pattern based on the generated combined image data and controls the vehicle lamp 3002 so as to form the determined light distribution pattern. Thus, the light distribution pattern is updated (S3106). The lamp controlling unit 3008 generates an update flag for the light distribution pattern, stores the generated update flag into a memory, and terminates this routine. Update flags are deleted as the light distribution control stops.

As described above, the vehicle lamp system 3001 according to the present embodiment includes the vehicle lamp 3002, the imaging device 3004, the housing 3006, and the lamp controlling unit 3008. The vehicle lamp 3002 illuminates a region ahead of the vehicle 3100 with light. The imaging device 3004 captures an image of the region ahead of the vehicle 3100. The housing 3006 houses the vehicle lamp 3002 and the imaging device 3004. The lamp controlling unit 3008 controls the on and off of the vehicle lamp 3002. The lamp controlling unit 3008 turns off the vehicle lamp 3002 while the imaging device 3004 is capturing an image and turns on the vehicle lamp 3002 while the imaging device 3004 is not capturing an image.

Thus, in the configuration in which the vehicle lamp 3002 and the imaging device 3004 are housed in the same housing 3006, light emitted from the vehicle lamp 3002 can be kept from being reflected by the inner surface of the housing 3006 and being mixed into an image. As a result, the imaging accuracy of the imaging device 3004 can be increased, and the accuracy of ADB control, ADAS, automatic driving technologies, or the like can be increased. Moreover, the above configuration renders it unnecessary to attach a lens hood to the imaging device 3004 or work out the position where the imaging device 3004 is attached in order to keep reflected light from being mixed into an image. Accordingly, the flexibility in the arrangement of the vehicle lamp 3002 or the imaging device 3004 can be increased, and this eases design constraints.

The vehicle lamp system 3001 includes the image generating unit 3010 that generates combined image data by combining a plurality of pieces of image data obtained from the imaging device 3004. This configuration can obtain an image of a higher lightness or an image with an improved S/N ratio. Accordingly, the accuracy of ADB control, ADAS, automatic driving technologies, or the like can be further increased.

The vehicle lamp 3002 according to the present embodiment includes the first lamp 3002a and the second lamp 3002b. The imaging device 3004 includes the first imaging device 3004a and the second imaging device 3004b. The housing 3006 includes the first housing 3006a that houses the first lamp 3002a and the first imaging device 3004a and the second housing 3006b that houses the second lamp 3002b and the second imaging device 3004b. The first imaging device 3004a and the second imaging device 3004b have different imaging timings. Then, the lamp controlling unit 3008 turns off the first lamp 3002a and turns on the second lamp 3002b while the first imaging device 3004a is capturing an image, and turns on the first lamp 3002a and turns off the second lamp 3002b while the second imaging device 3004b is capturing an image. Thus, the brightness of the region ahead of the vehicle can be maintained while keeping reflected light from being mixed into an image when the first imaging device 3004a and the second imaging device 3004b each capture an image. Since images of the region ahead of the vehicle can be captured continuously, this enables the following of a change in the situation of the region ahead of the vehicle with higher accuracy.

The vehicle lamp 3002 according to the present embodiment can form a predetermined light distribution pattern by illuminating a region ahead of the vehicle with a visible light beam L1 of a variable intensity distribution. The lamp controlling unit 3008 determines a light distribution pattern to be formed in the region ahead of the vehicle based on image data obtained from imaging device 3004 and controls the vehicle lamp 3002 so as to form the determined light distribution pattern. This configuration can form a light distribution pattern suitable for the situation of the region ahead of the vehicle with higher accuracy.

Thus far, Embodiment 4 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also effective as an aspect of the present invention. Hatching added along a section in the drawings does not limit the material of the component with hatching.

(Variation 2)

The vehicle lamp system 3001 according to Embodiment 4 includes two imaging devices 3004 (the first imaging device 3004a and the second imaging device 3004b). Meanwhile, a vehicle lamp system 3001 according to the present variation includes one imaging device 3004. In other words, according to the present variation, a vehicle lamp 3002 includes a first lamp 3002a and a second lamp 3002b. A housing 3006 includes a first housing 3006a that houses the first lamp 3002a and a second housing 3006b that houses the second lamp 3002b. The imaging device 3004 is housed in the first housing 3006a. A lamp controlling unit 3008 according to the present variation turns off the first lamp 3002a while the imaging device 3004 is capturing an image, turns on the first lamp 3002a while the imaging device 3004 is not capturing an image, and turns on the second lamp 3002b both while the imaging device 3004 is capturing an image and while the imaging device 3004 is not capturing an image.

In other words, according to the present variation, the second lamp 3002b continues to emit light both while the imaging device 3004 is capturing an image and while the imaging device 3004 is not capturing an image. This configuration can reduce a change in the brightness of the region ahead of the vehicle. This can reduce any discomfort that the driver of the host vehicle or other participants in the traffic may feel due to a change in the brightness of the region ahead of the vehicle. Moreover, the imaging time of the imaging device 3004 in a single instance of imaging can be extended. Therefore, image data of a high lightness can be obtained, and the number of images to be combined when generating combined image data can be reduced. Moreover, reducing the number of imaging devices 3004 can reduce the installation cost of the vehicle lamp system 3001.

What is claimed is:

1. A light distribution controlling device, comprising:
    a pattern determining unit that determines a light distribution pattern based on a visible light image and an infrared image, the visible light image obtained from a visible light imaging unit that has a sensitivity to a visible light range and captures an image of a region ahead of a vehicle, the infrared image obtained from an infrared imaging unit that has a sensitivity to an infrared range and captures an image of the region ahead of the vehicle; and
    a lamp controlling unit that controls the light distribution variable lamp so as to form the light distribution pattern in the region ahead of the vehicle, the light distribution variable lamp being capable of illuminating the region ahead of the vehicle with a visible light beam of a variable intensity distribution, wherein
    the pattern determining unit
        sets a first low illuminance portion having an illuminance lower than an illuminance of a remaining portion based on a luminous point included in the visible light image, and generates a first precursor pattern that includes the first low illuminance portion,
        sets a second low illuminance portion having an illuminance that is lower than an illuminance of a remaining portion but higher than the illuminance of the first low illuminance portion based on a luminous point included in the infrared image captured while the region ahead of the vehicle is illuminated with infrared radiation from an infrared illuminator, and generates a second precursor pattern that includes the second low illuminance portion, and
        determines the light distribution pattern that includes the first low illuminance portion and the second low illuminance portion by combining the first precursor pattern and the second precursor pattern.

2. The light distribution controlling device according to claim 1, wherein
    the pattern determining unit sets a portion where the first low illuminance portion and the second low illuminance portion overlap each other in the light distribution pattern as the first low illuminance portion.

3. The light distribution controlling device according to claim 1, wherein
the first low illuminance portion overlaps a front vehicle, and
the second low illuminance portion overlaps a sign or a delineator.

4. The light distribution controlling device according to claim 1, wherein
the illuminance of the first low illuminance portion is zero, and
the illuminance of the second low illuminance portion is greater than zero.

5. A vehicle lamp system, comprising:
a light distribution variable lamp capable of illuminating a region ahead of a vehicle with a visible light beam of a variable intensity distribution;
an infrared illuminator capable of illuminating the region ahead of the vehicle with infrared radiation;
an imaging device that includes a visible light imaging unit and an infrared imaging unit, the visible light imaging unit having a sensitivity to a visible light range and capturing an image of the region ahead of the vehicle, the infrared imaging unit having a sensitivity to an infrared range and capturing an image of the region ahead of the vehicle; and
the light distribution controlling device according to claim 1.

6. A light distribution controlling method, comprising:
determining a light distribution pattern based on a visible light image and an infrared image, the visible light image obtained from a visible light imaging unit that has a sensitivity to a visible light range and captures an image of a region ahead of a vehicle, the infrared image obtained from an infrared imaging unit that has a sensitivity to an infrared range and captures an image of the region ahead of the vehicle; and
controlling a light distribution variable lamp so as to form the light distribution pattern in the region ahead of the vehicle, the light distribution variable lamp being capable of illuminating the region ahead of the vehicle with a visible light beam of a variable intensity distribution, wherein
the determining of the light distribution pattern includes
setting a first low illuminance portion having an illuminance lower than an illuminance of a remaining portion based on a luminous point included in the visible light image, and generating a first precursor pattern that includes the first low illuminance portion,
setting a second low illuminance portion having an illuminance that is lower than an illuminance of a remaining portion but higher than the illuminance of the first low illuminance portion based on a luminous point included in the infrared image captured while the region ahead of the vehicle is illuminated with infrared radiation from an infrared illuminator, and generating a second precursor pattern that includes the second low illuminance portion, and
determining the light distribution pattern that includes the first low illuminance portion and the second low illuminance portion by combining the first precursor pattern and the second precursor pattern.

* * * * *